US012647064B2

(12) United States Patent
Chen et al.

(10) Patent No.: US 12,647,064 B2
(45) Date of Patent: Jun. 2, 2026

(54) MOUNTING RAILS

(71) Applicant: ARRAY TECH, INC., Albuquerque, NM (US)

(72) Inventors: Shuo Chen, Chandler, AZ (US); Benjamin C. DeFresart, Chandler, AZ (US); Nathan Schuknecht, Golden, CO (US); Cody Norman, Atascadero, CA (US)

(73) Assignee: ARRAY TECH, INC., Albuquerque, NM (US)

( * ) Notice: Subject to any disclaimer, the term of this patent is extended or adjusted under 35 U.S.C. 154(b) by 0 days.

(21) Appl. No.: 19/073,825

(22) Filed: Mar. 7, 2025

(65) Prior Publication Data

US 2025/0286500 A1    Sep. 11, 2025

Related U.S. Application Data

(60) Provisional application No. 63/563,183, filed on Mar. 8, 2024.

(51) Int. Cl.
*H02S 20/30* (2014.01)
*F16B 5/06* (2006.01)

(52) U.S. Cl.
CPC ............ *H02S 20/30* (2014.12); *F16B 5/0685* (2013.01)

(58) Field of Classification Search
None
See application file for complete search history.

(56) References Cited

U.S. PATENT DOCUMENTS

| | | | |
|---|---|---|---|
| 1,826,133 | A | 10/1931 | Hatch |
| 2,105,706 | A | 1/1938 | Stamy |
| 2,201,335 | A | 5/1940 | Bart |
| 2,598,776 | A | 6/1952 | Flora |
| 2,689,027 | A | 9/1954 | Flora |
| 3,160,280 | A | 12/1964 | Burch |

(Continued)

FOREIGN PATENT DOCUMENTS

| | | |
|---|---|---|
| CA | 2877819 | 1/2019 |
| CA | 2507828 | 7/2024 |

(Continued)

OTHER PUBLICATIONS

SnapNRack; RL Universal, Component Detail, Mount; May 1, 2019 (1 pg).

(Continued)

*Primary Examiner* — Steven M Marsh
(74) *Attorney, Agent, or Firm* — MASCHOFF BRENNAN

(57) ABSTRACT

A mounting rail may be configured to couple to a first photovoltaic (PV) module and a second PV module. The mounting rail may include a hooked mechanism and an attachment feature. The hooked mechanism may at least partially define an aperture configured to receive a portion of a first module frame associated with the first PV module. The hooked mechanism may also physically engage with a surface of the first module frame to couple the first module frame to the mounting rail and to prevent the first module frame from unintentionally uncoupling from the mounting rail. The attachment feature may interface with a second module frame associated with the second PV module to couple the second module frame to the mounting rail.

20 Claims, 32 Drawing Sheets

(56) References Cited

U.S. PATENT DOCUMENTS

| | | | |
|---|---|---|---|
| 3,685,863 A | 8/1972 | Oetiker | |
| 3,797,194 A | 3/1974 | Ekstein | |
| 3,898,728 A | 8/1975 | Rousseau | |
| 4,047,349 A | 9/1977 | Aguilar, Jr. | |
| 4,111,188 A | 9/1978 | Murphy, Jr. | |
| 4,112,693 A | 9/1978 | Collin | |
| 4,192,624 A | 3/1980 | Bucci | |
| 4,371,139 A | 2/1983 | Clark | |
| 4,421,943 A | 12/1983 | Withjack | |
| 4,429,872 A | 2/1984 | Capachi | |
| 4,452,021 A | 6/1984 | Anderson | |
| 4,479,737 A | 10/1984 | Bergh | |
| 4,637,752 A | 1/1987 | Centa | |
| 4,744,187 A | 5/1988 | Tripp | |
| 4,760,981 A | 8/1988 | Hodges | |
| 4,763,456 A | 8/1988 | Giannuzzi | |
| 4,896,992 A | 1/1990 | Muhlethaler | |
| 4,899,507 A | 2/1990 | Mairlot | |
| 4,945,699 A | 8/1990 | Murphy | |
| 4,966,631 A | 10/1990 | Matlin | |
| 5,102,275 A | 4/1992 | Hulsey | |
| 5,111,632 A | 5/1992 | Turner | |
| 5,143,556 A | 9/1992 | Matlin | |
| 5,164,020 A | 11/1992 | Wagner | |
| 5,228,644 A | 7/1993 | Garriott | |
| 5,255,887 A | 10/1993 | Schumacher | |
| 5,289,356 A | 2/1994 | Winston | |
| 5,344,496 A | 9/1994 | Stern | |
| 5,409,198 A | 4/1995 | Roick | |
| 5,497,587 A | 3/1996 | Hirai | |
| 5,505,788 A | 4/1996 | Dinwoodie | |
| 5,537,991 A | 7/1996 | Winston | |
| 5,571,338 A | 11/1996 | Kadonome | |
| 5,706,617 A | 1/1998 | Hirai | |
| 5,746,029 A | 5/1998 | Ullman | |
| 5,746,839 A | 5/1998 | Dinwoodie | |
| 5,930,969 A | 8/1999 | Mayle | |
| 6,058,930 A | 5/2000 | Shingleton | |
| 6,093,884 A | 7/2000 | Toyomura | |
| 6,105,317 A | 8/2000 | Tomiuchi et al. | |
| 6,111,189 A | 8/2000 | Garvison | |
| 6,134,754 A | 10/2000 | Hansson | |
| 6,201,180 B1 | 3/2001 | Meyer | |
| 6,207,889 B1 | 3/2001 | Toyomura | |
| 6,233,889 B1 | 5/2001 | Hulsey | |
| 6,250,034 B1 | 6/2001 | Hulsey | |
| 6,269,596 B1 | 8/2001 | Ohtsuka | |
| 6,282,857 B1 | 9/2001 | Rubenacker | |
| 6,360,491 B1 | 3/2002 | Ullman | |
| 6,405,494 B1 | 6/2002 | Wismeth | |
| 6,465,724 B1 | 10/2002 | Garvison | |
| 6,467,916 B2 | 10/2002 | Winston | |
| 6,489,566 B1 | 12/2002 | Durin | |
| 6,501,013 B1 | 12/2002 | Dinwoodie | |
| 6,526,701 B2 | 3/2003 | Stearns | |
| 6,534,703 B2 | 3/2003 | Dinwoodie | |
| 6,550,577 B1 | 4/2003 | Allgire | |
| 6,670,541 B2 | 12/2003 | Nagao | |
| 6,672,018 B2 | 1/2004 | Shingleton | |
| 6,745,869 B2 | 6/2004 | Garrett | |
| 6,784,360 B2 | 8/2004 | Nakajima | |
| 6,809,251 B2 | 10/2004 | Dinwoodie | |
| D510,315 S | 10/2005 | Shugar | |
| 6,958,868 B1 | 10/2005 | Pender | |
| 6,959,517 B2 | 11/2005 | Poddany | |
| 6,987,604 B2 | 1/2006 | Rabinowitz | |
| RE38,988 E | 2/2006 | Dinwoodie | |
| D519,444 S | 4/2006 | Mascolo | |
| 7,043,884 B2 | 5/2006 | Moreno | |
| 7,156,088 B2 | 1/2007 | Luconi | |
| 7,297,866 B2 | 11/2007 | Aschenbrenner | |
| D565,505 S | 4/2008 | Shugar | |
| 7,386,922 B1 | 6/2008 | Taylor | |
| 7,388,146 B2 | 6/2008 | Fraas | |
| 7,406,800 B2 | 8/2008 | Cinnamon | |
| 7,413,392 B2 | 8/2008 | Nebesnak | |
| 7,475,513 B2 | 1/2009 | Parker | |
| 7,631,468 B2 | 12/2009 | Gong | |
| 7,779,593 B2 | 8/2010 | Jahn | |
| 7,789,365 B2 | 9/2010 | Durig | |
| 7,806,620 B1 | 10/2010 | Brochez | |
| 7,935,202 B2 | 5/2011 | Stanley | |
| 8,099,922 B2 | 1/2012 | Kellerman | |
| 8,122,648 B1 | 2/2012 | Liu | |
| 8,166,720 B2 | 5/2012 | Garrigus | |
| 8,250,829 B2 | 8/2012 | McPheeters | |
| 8,307,606 B1 | 11/2012 | Rego | |
| 8,316,617 B2 | 11/2012 | Krovats | |
| 8,316,618 B1 | 11/2012 | Rodowca | |
| 8,316,619 B1 | 11/2012 | Rego | |
| 8,336,227 B2 | 12/2012 | Bae | |
| 8,371,076 B2 | 2/2013 | Jones | |
| 8,438,893 B2 | 5/2013 | Durney | |
| 8,443,558 B2 | 5/2013 | Buller | |
| 8,495,997 B1 | 7/2013 | Laubach | |
| 8,505,248 B1 | 8/2013 | Leong | |
| 8,522,490 B1 | 9/2013 | Stancel | |
| 8,522,491 B2 | 9/2013 | Kneip | |
| 8,536,442 B2 | 9/2013 | Stancel | |
| 8,549,800 B2 | 10/2013 | Reyal | |
| 8,590,223 B2 | 11/2013 | Kilgore | |
| 8,623,158 B2 | 1/2014 | Stanley | |
| 8,631,614 B2 | 1/2014 | Livsey | |
| 8,683,751 B2 | 4/2014 | Stearns | |
| 8,701,372 B2 | 4/2014 | Nuernberger | |
| 8,713,881 B2 | 5/2014 | DuPont | |
| 8,726,587 B2 | 5/2014 | Nuernberger | |
| 8,733,718 B2 | 5/2014 | Corsi | |
| 8,745,935 B2 | 6/2014 | DuPont | |
| 8,752,343 B2 | 6/2014 | Kuan | |
| 8,782,983 B2 | 7/2014 | Stearns | |
| 8,826,618 B2 | 9/2014 | Stearns | |
| 8,832,938 B2 | 9/2014 | Gies | |
| 8,870,139 B1 | 10/2014 | Port | |
| 8,894,424 B2 | 11/2014 | DuPont | |
| 8,955,259 B2 | 2/2015 | Hemingway | |
| 8,984,818 B2 | 3/2015 | McPheeters | |
| 8,987,584 B2 | 3/2015 | Rawlings | |
| 9,010,696 B2 | 4/2015 | Siddiqui | |
| 9,109,814 B2 | 8/2015 | Patton | |
| 9,147,785 B2 | 9/2015 | Haddock et al. | |
| 9,184,324 B2 | 11/2015 | Wares et al. | |
| 9,188,365 B2 | 11/2015 | Kuan | |
| 9,249,925 B2 | 2/2016 | Roensch | |
| 9,276,521 B2 | 3/2016 | Reed et al. | |
| 9,353,546 B2 | 5/2016 | Garza Montemayor | |
| 9,370,120 B2 | 6/2016 | Chen | |
| 9,447,917 B1 | 9/2016 | Wronski | |
| 9,479,110 B2 | 10/2016 | Patton | |
| 9,543,888 B2 | 1/2017 | Au | |
| 9,571,030 B2 | 2/2017 | Kube | |
| 9,647,607 B2 | 5/2017 | Patton | |
| 9,947,818 B2 | 4/2018 | Tsujimoto et al. | |
| 9,998,064 B2 | 6/2018 | Wares et al. | |
| 9,998,066 B2 | 6/2018 | West | |
| 10,069,455 B2 | 9/2018 | Corio et al. | |
| 10,720,877 B2 | 7/2020 | Haas et al. | |
| 10,797,635 B2 | 10/2020 | Watson et al. | |
| 10,917,039 B2 | 2/2021 | Corio | |
| 11,271,518 B2 | 3/2022 | Ballentine et al. | |
| 11,356,053 B2 | 6/2022 | Gong et al. | |
| 11,502,638 B2 | 11/2022 | Watson et al. | |
| 11,527,988 B2 * | 12/2022 | Schuknecht | H02S 30/00 |
| 11,689,152 B2 | 6/2023 | de Fresart | |
| 11,824,490 B2 | 11/2023 | Annibale et al. | |
| 11,962,269 B2 | 4/2024 | Creasy et al. | |
| 11,973,460 B2 | 4/2024 | Schuknecht et al. | |
| 11,996,802 B2 | 5/2024 | Patton et al. | |
| 12,009,777 B2 | 6/2024 | Jacobs | |
| 12,031,750 B2 | 7/2024 | Schuknecht et al. | |
| 12,074,559 B2 | 8/2024 | Schuknecht et al. | |
| 12,395,117 B2 | 8/2025 | Schuknecht et al. | |
| 2002/0066235 A1 | 6/2002 | Stearns | |
| 2002/0096395 A1 | 7/2002 | Garrett | |

(56)  References Cited

U.S. PATENT DOCUMENTS

| | | | |
|---|---|---|---|
| 2003/0015637 | A1 | 1/2003 | Liebendorfer |
| 2003/0033780 | A1 | 2/2003 | Hasan |
| 2003/0070368 | A1 | 4/2003 | Shingleton |
| 2003/0230451 | A1 | 12/2003 | Garrett |
| 2004/0007260 | A1 | 1/2004 | Dinwoodie |
| 2004/0148888 | A1 | 8/2004 | Kuhn |
| 2004/0163338 | A1 | 8/2004 | Liebendorfer |
| 2004/0261955 | A1 | 12/2004 | Shingleton |
| 2005/0115176 | A1 | 6/2005 | Russell |
| 2005/0144870 | A1 | 7/2005 | Dinwoodie |
| 2006/0054212 | A1 | 3/2006 | Fraas |
| 2006/0151199 | A1* | 7/2006 | Uchizono ............. F16B 5/0685 |
| | | | 174/138 R |
| 2006/0185289 | A1 | 8/2006 | Gong |
| 2007/0102036 | A1 | 5/2007 | Cinnamon |
| 2007/0144575 | A1 | 6/2007 | Mascolo |
| 2007/0151594 | A1 | 7/2007 | Mascolo |
| 2007/0157963 | A1 | 7/2007 | Metten |
| 2007/0272234 | A1 | 11/2007 | Allen |
| 2007/0295392 | A1 | 12/2007 | Cinnamon |
| 2007/0295393 | A1 | 12/2007 | Cinnamon |
| 2008/0105489 | A1 | 5/2008 | Garrett |
| 2008/0121273 | A1 | 5/2008 | Plaisted |
| 2008/0152849 | A1 | 6/2008 | Lenhardt |
| 2008/0216440 | A1 | 9/2008 | Kobayashi |
| 2008/0302407 | A1 | 12/2008 | Kobayashi |
| 2009/0050194 | A1 | 2/2009 | Noble |
| 2009/0078299 | A1 | 3/2009 | Cinnamon |
| 2009/0114271 | A1 | 5/2009 | Stancel |
| 2009/0194098 | A1 | 8/2009 | Placer |
| 2009/0199846 | A1 | 8/2009 | Collins |
| 2009/0242014 | A1 | 10/2009 | Leary |
| 2009/0266352 | A1 | 10/2009 | Wetmore |
| 2009/0320907 | A1 | 12/2009 | Botkin |
| 2010/0000605 | A1 | 1/2010 | Comert |
| 2010/0043781 | A1 | 2/2010 | Jones |
| 2010/0065108 | A1 | 3/2010 | West |
| 2010/0132766 | A1 | 6/2010 | Jenkins |
| 2010/0162641 | A1 | 7/2010 | Reyal |
| 2010/0163015 | A1 | 7/2010 | Potter |
| 2010/0192505 | A1 | 8/2010 | Schaefer |
| 2010/0236610 | A1 | 9/2010 | Stancel |
| 2010/0243023 | A1 | 9/2010 | Patton |
| 2010/0275974 | A1 | 11/2010 | Chan |
| 2011/0194886 | A1 | 8/2011 | Wu |
| 2011/0203637 | A1 | 8/2011 | Patton |
| 2011/0214713 | A1 | 9/2011 | Hou |
| 2011/0240207 | A1 | 10/2011 | Stanley |
| 2011/0250011 | A1 | 10/2011 | Schwarze |
| 2011/0259404 | A1 | 10/2011 | Jang |
| 2011/0260027 | A1 | 10/2011 | Farnham, Jr. |
| 2011/0265861 | A1 | 11/2011 | Näbauer |
| 2011/0272372 | A1 | 11/2011 | Peter |
| 2011/0296773 | A1 | 12/2011 | Kellerman |
| 2012/0085394 | A1 | 4/2012 | McPheeters |
| 2012/0097816 | A1 | 4/2012 | Tamm |
| 2012/0107043 | A1 | 5/2012 | Kellerman |
| 2012/0145227 | A1 | 6/2012 | Jun |
| 2012/0160787 | A1 | 6/2012 | Schummlochner |
| 2012/0186169 | A1 | 7/2012 | Tomaso |
| 2012/0240489 | A1 | 9/2012 | Rivera |
| 2012/0273029 | A1 | 11/2012 | Bragagna |
| 2012/0312355 | A1 | 12/2012 | Patton |
| 2012/0318322 | A1 | 12/2012 | Lanyon |
| 2013/0091786 | A1 | 4/2013 | DuPont |
| 2013/0136528 | A1 | 5/2013 | Kellerman |
| 2013/0136531 | A1 | 5/2013 | Kobayashi |
| 2013/0210008 | A1 | 8/2013 | Feitsma |
| 2013/0312812 | A1 | 11/2013 | Meyer |
| 2013/0320161 | A1 | 12/2013 | Merhar |
| 2014/0008312 | A1 | 1/2014 | Durney |
| 2014/0014158 | A1 | 1/2014 | Wildes |
| 2014/0020308 | A1 | 1/2014 | Heisler |
| 2014/0037373 | A1 | 2/2014 | Cui |
| 2014/0060625 | A1 | 3/2014 | Beuke |
| 2014/0066751 | A1 | 3/2014 | Weiss |
| 2014/0102518 | A1 | 4/2014 | Chihlas |
| 2014/0102997 | A1 | 4/2014 | West |
| 2014/0352763 | A1 | 12/2014 | Chen |
| 2014/0360951 | A1 | 12/2014 | Ilzhoefer |
| 2015/0034355 | A1 | 2/2015 | Patton |
| 2015/0040967 | A1 | 2/2015 | West |
| 2015/0052834 | A1 | 2/2015 | Gies |
| 2015/0069198 | A1 | 3/2015 | West |
| 2015/0222219 | A1 | 8/2015 | Kouyanagi |
| 2015/0244308 | A1 | 8/2015 | Patton |
| 2015/0326171 | A1 | 11/2015 | Patton |
| 2016/0020722 | A1 | 1/2016 | Patton |
| 2016/0054030 | A1 | 2/2016 | Ilzhöfer |
| 2017/0104445 | A1 | 4/2017 | Depauw |
| 2017/0163210 | A1 | 6/2017 | Gorny |
| 2017/0222599 | A1 | 8/2017 | West |
| 2017/0244354 | A1 | 8/2017 | Patton |
| 2018/0127984 | A1* | 5/2018 | Langeveld ............ F16B 5/0685 |
| 2018/0191290 | A1 | 7/2018 | Guthrie |
| 2018/0212556 | A1 | 7/2018 | Wegert |
| 2018/0226916 | A1 | 8/2018 | Neuhauser et al. |
| 2019/0154306 | A1 | 5/2019 | Rothschild |
| 2020/0037092 | A1 | 1/2020 | Bai |
| 2020/0116191 | A1* | 4/2020 | Uppu ...................... H02S 20/00 |
| 2020/0389124 | A1 | 12/2020 | Lyford |
| 2021/0159850 | A1 | 5/2021 | Shakir |
| 2021/0313926 | A1 | 10/2021 | Cavieres |
| 2021/0399680 | A1* | 12/2021 | Crook ..................... H02S 20/23 |
| 2022/0103117 | A1 | 3/2022 | Gong |
| 2022/0271706 | A1 | 8/2022 | Creasy et al. |
| 2022/0302872 | A1 | 9/2022 | Patton |
| 2023/0402963 | A1 | 12/2023 | Yadlapalli et al. |
| 2024/0088824 | A1 | 3/2024 | Feng |
| 2024/0186945 | A1 | 6/2024 | Patton |
| 2024/0266994 | A1 | 8/2024 | Patton |
| 2024/0297614 | A1 | 9/2024 | Hafter |
| 2025/0067290 | A1* | 2/2025 | Maddulapalli ........ F24S 25/634 |
| 2025/0385636 | A1 | 12/2025 | Pedlar et al. |

FOREIGN PATENT DOCUMENTS

| | | |
|---|---|---|
| CN | 1818400 | 8/2006 |
| CN | 200989673 | 12/2007 |
| CN | 102089601 | 6/2011 |
| CN | 102282326 A | 12/2011 |
| CN | 102332481 | 1/2012 |
| CN | 202120931 U | 1/2012 |
| CN | 102569465 A | 7/2012 |
| CN | 102709362 | 10/2012 |
| CN | 102760782 | 10/2012 |
| CN | 202651163 | 1/2013 |
| CN | 202662629 | 1/2013 |
| CN | 202749391 | 2/2013 |
| CN | 103137728 A | 6/2013 |
| CN | 105977884 | 9/2016 |
| CN | 106452305 | 2/2017 |
| CN | 107634714 | 1/2018 |
| CN | 207069991 | 3/2018 |
| CN | 107959466 | 4/2018 |
| CN | 108599701 | 9/2018 |
| CN | 108649883 | 10/2018 |
| CN | 108649884 | 10/2018 |
| CN | 208272919 | 12/2018 |
| CN | 110086412 | 8/2019 |
| CN | 111064426 | 4/2020 |
| CN | 111147012 | 5/2020 |
| CN | 111371397 | 7/2020 |
| CN | 112165298 | 1/2021 |
| CN | 212969542 | 4/2021 |
| CN | 213072550 U | 4/2021 |
| CN | 112953379 | 6/2021 |
| CN | 214315129 U | 9/2021 |
| CN | 214315179 U | 9/2021 |
| CN | 214337863 U | 10/2021 |
| CN | 214626901 U | 11/2021 |
| CN | 114375543 | 4/2022 |
| CN | 217721118 U | 11/2022 |
| CN | 218276594 U | 1/2023 |

(56)     References Cited

FOREIGN PATENT DOCUMENTS

| | | | |
|---|---|---|---|
| CN | 218633820 U | 3/2023 | |
| CN | 218633826 | 3/2023 | |
| CN | 219351632 U | 7/2023 | |
| CN | 219812116 U | 10/2023 | |
| CN | 220043329 U | 11/2023 | |
| CN | 221127205 U | 6/2024 | |
| CN | 221784102 U | 9/2024 | |
| CN | 113783516 B | 11/2024 | |
| CN | 118971771 | 11/2024 | |
| DE | 3625119 | 1/1988 | |
| DE | 29703481 | 11/1997 | |
| DE | 19652568 | 6/1998 | |
| DE | 20117716 | 3/2002 | |
| DE | 102008055937 | 5/2010 | |
| DE | 102009059232 | 6/2011 | |
| DE | 102010022556 | 6/2011 | |
| DE | 202012101023 | 6/2013 | |
| DK | 2867541 | 1/2018 | |
| EP | 0612428 | 8/1994 | |
| EP | 1568950 | 8/2005 | |
| EP | 1584521 | 10/2005 | |
| EP | 2146160 A1 | 1/2010 | |
| EP | 2193277 | 6/2010 | |
| EP | 2315982 | 5/2011 | |
| EP | 2979039 | 2/2016 | |
| EP | 3981071 | 4/2022 | |
| ES | 2421177 | 8/2013 | |
| ES | 2432752 | 12/2013 | |
| ES | 2441402 | 2/2014 | |
| ES | 2475098 | 7/2014 | |
| ES | 2539606 | 7/2015 | |
| FR | 2981738 | 4/2013 | |
| GB | 803743 | 10/1958 | |
| IN | 202117057281 | 10/2022 | |
| JP | H10308522 | 11/1998 | |
| JP | H10339008 | 12/1998 | |
| JP | 3359021 | 12/2002 | |
| JP | 2006278672 | 10/2006 | |
| JP | 4017995 B2 | 12/2007 | |
| JP | 4895745 B2 | 3/2012 | |
| JP | 2013118236 | 6/2013 | |
| JP | 2014075419 | 4/2014 | |
| JP | 2014122544 | 7/2014 | |
| JP | 2014519195 | 8/2014 | |
| JP | 2015528074 | 9/2015 | |
| JP | 2015528865 | 10/2015 | |
| KR | 20140036105 A | 3/2014 | |
| KR | 20150129842 | 11/2015 | |
| RU | 2698337 | 8/2019 | |
| WO | 2006089770 | 8/2006 | |
| WO | 2007038760 | 4/2007 | |
| WO | 2009043368 | 4/2009 | |
| WO | 2009137809 | 11/2009 | |
| WO | 2011139648 | 11/2011 | |
| WO | 2013082125 | 6/2013 | |
| WO | 2013143178 | 10/2013 | |
| WO | 2014004161 | 1/2014 | |
| WO | 2015077526 | 5/2015 | |
| WO | 2015182417 | 12/2015 | |
| WO | 2017005239 | 1/2017 | |
| WO | 2019041845 | 3/2019 | |
| WO | 2019069396 | 4/2019 | |
| WO | 2020252091 | 12/2020 | |
| WO | 2021036273 | 3/2021 | |
| WO | 2021156645 | 8/2021 | |
| WO | 2022183204 | 9/2022 | |
| WO | 2022225961 | 10/2022 | |
| WO | 2022271656 | 12/2022 | |
| WO | 2023196530 | 10/2023 | |
| WO | 2024044096 | 2/2024 | |
| WO | 2024097312 A1 | 5/2024 | |
| WO | 2024206135 | 10/2024 | |
| WO | WO-2025034979 A1 * | 2/2025 | ............ H02S 30/00 |

OTHER PUBLICATIONS

Rockit Complete Rail-Less Racking System Installation Guide v3.6; Mar. 15, 2024 (31 pgs).

European Patent Office; International Search Report and Written Opinion issued in Int'l Application No. PCT/US2025/018941 dated Jun. 3, 2025, 8 pages.

Written Opinion of the International Searching Authority dated May 24, 2022 as received in Application No. PCT/US2022/070827.

U.S. Appl. No. 10/063,183, filed Aug. 28, 2018, John C. Patton.

U.S. Appl. No. 10/158,323, filed Dec. 18, 2018, Elizabeth Dix Schulte.

U.S. Appl. No. 10/256,768, filed Apr. 9, 2019, Todd Owen.

U.S. Appl. No. 10/505,492, filed Dec. 10, 2019, Tyrus Hawkes Hudson.

U.S. Appl. No. 10/631,472, filed Apr. 28, 2020, Neil Clarke.

U.S. Appl. No. 10/651,783, filed May 12, 2020, Heiko Molitor.

U.S. Appl. No. 10/749,459, filed Aug. 18, 2020, Jun Liu.

U.S. Appl. No. 10/931,225, filed Feb. 23, 2021, Hanghai Yang.

U.S. Appl. No. 10/935,282, filed Mar. 2, 2021, Lee J. Gorny.

U.S. Appl. No. 11/118,721, filed Sep. 14, 2021, Barry Schmitt.

U.S. Appl. No. 11/221,034, filed Jan. 11, 2022, David Katz.

U.S. Appl. No. 11/245,356, filed Feb. 8, 2022, Lien-Feng Hsueh.

U.S. Appl. No. 11/431,288, filed Aug. 30, 2022, Lee Gorny.

U.S. Appl. No. 11/527,988, filed Dec. 13, 2022, Nathan SCHUKNECHT.

U.S. Appl. No. 11/870,387, filed Jan. 9, 2024, Sang Chae Chung YOO.

U.S. Appl. No. 11/962,270, filed Apr. 16, 2024, Conor MILLER.

U.S. Appl. No. 12/237,806, filed Feb. 25, 2025, Lee J. Gorny.

U.S. Appl. No. 12/237,807, filed Feb. 25, 2025, Hendrik Oldenkamp.

U.S. Appl. No. 12/381,509, filed Aug. 5, 2025, John C. Patton.

U.S. Appl. No. 12/388,394, filed Aug. 12, 2025, Eric L. Hafter.

U.S. Appl. No. 12/483,187, filed Nov. 25, 2025, Eric L. Hafter.

Global Sources, Solar Border, Aluminum Solar Panel Frame. Retrieved Feb. 13, 2026. 3 pages.

OMG Roofing Products; PowerGrip Roof Mount System pamphlet. Aug. 2020.

Tti, Moving Energy Forward. Flush Mount Rail System. 2 pages @ 2008.

www.quickmountpv.com/products.php; Quick Mount PV Products, Manufacturer of Waterproof Mounts for the PC Industry; 1 Page. @ 2009; retrieved Oct. 2, 2009. 3 pages.

www.ttisolar.com/products/flatjack_order.html; Flat Jack Roof Mount Order Form; 2 pages @ 2008 Thompson Technology Industries, Inc.

Solar Power System Installation Manual; SRS Mountain System, Rectangular Modules; Sharp Electronics Corp., 44 pp. Jun. 5, 2007.

SnapNrack Solar Mounting Solutions; RL Universal Railless Residential Roof Mount System Installation Manual v.2.2; 2023 (37 pgs).

Rockit Complete Rail-Less Racking System Installation Guide v3.6; Retrieved Feb. 17, 2026. (48 pgs).

Flat Jack Roof Mount TTI. Flat Jack Roof Mount order form 2 pages, Retrieved Feb. 17, 2026.

U.S. Appl. No. 63/399,711; filed Aug. 21, 2022.

U.S. Appl. No. 62/921,310; filed Jun. 10, 2019.

* cited by examiner

MOUNTING RAILS

CROSS-REFERENCE TO RELATED APPLICATION

This patent application claims the benefit of and priority to U.S. Provisional App. No. 63/563,183 filed Mar. 8, 2024, titled "MOUNTING RAILS," which is incorporated in the present disclosure by reference in its entirety.

FIELD

The embodiments discussed in the present disclosure are related to solar installations and, more particularly, to mounting rails for use in a solar installation.

BACKGROUND

Solar installations including solar farms, photovoltaic (PV) plants, solar tracking systems, fixed solar systems, and other PV systems include large numbers of PV modules that collect sunlight and generate energy. During installation, the PV modules may be coupled to corresponding mounting rails to position the PV modules within the solar installations. In particular, the PV modules may be coupled to the corresponding mounting rails via module frames of the PV modules and module mounting systems.

Some module mounting systems use fasteners such as nuts, bolts, and clips to couple the PV modules to the mounting rails. During installation, installers will pass the fasteners through the module frames and the mounting rails on multiple sides of the PV modules and then secure the fasteners. The installation of the fasteners may require a significant amount of time during the installation of the solar installations. For example, some module mounting systems use four or more bolts per PV module with each fastener needing to be passed through the mounting rail and the module frame and then secured. In addition, some module mounting systems cause the installers to manually position the PV modules and hold the PV modules in place during installation of the PV modules and/or the fasteners, which may require multiple installers. For instance, one or more installers may maintain the position of the PV module while one or more other installers install the fasteners.

Therefore, there is a need to ease the installation process of coupling the PV modules to the mounting rails and/or permit installation without installers manually positioning and maintaining the position of the PV modules.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used to limit the scope of the claimed subject matter.

Exemplary embodiments of the present disclosure address the problems experienced in solar installations, including problems associated with coupling the PV modules to the mounting rails. Disclosed embodiments include one or more mounting rails that are configured to couple to PV modules via a tooled process and/or a toolless process. One embodiment includes a mounting rail that includes a hooked mechanism that couples a first PV module to the mounting rail and an attachment feature that couples a second PV module to the mounting rail. The hooked mechanism at least partially defines an aperture that receives a portion of a first module frame of the first PV module. The hooked mechanism also physically engages with a surface of the first module frame to couple the first module frame to the mounting rail. In this manner, the first the PV module is coupled to the mounting rail via the hooked mechanism (e.g., the toolless process).

The attachment feature may interface with a second module frame to couple the second PV module to the mounting rail. In some embodiments, the attachment feature may include fasteners and openings defined by the mounting rail. During installation, the openings of the attachment feature may be aligned with openings defined by the second module frame to permit the fasteners pass through the openings to couple the second PV module to the mounting rail. In this manner, the second PV module is coupled to the mounting rail via the attachment feature (e.g., the tooled process).

Therefore, the mounting rail may couple to the first PV module via a different process than how it couples to the second PV module. The toolless process may reduce a complexity of installing the PV modules and/or reduce an amount of time to install the PV modules. In addition, the omission of the fasteners to couple the first PV module to the mounting rail reduces the cost to install the solar installations.

One embodiment may include hooked mounting rails and attachment mounting rails that are positioned in an asymmetrical arrangement (e.g., an alternating pattern). The hooked mounting rails and the attachment mounting rails may couple to PV modules in different ways. For example, the hooked mounting rails may include multiple instances of the hooked mechanism to couple corresponding PV modules to the hooked mounting rail (e.g., the toolless process). As another example, the attachment mounting rails may include the attachment feature configured to couple corresponding PV modules to the attachment mounting rail using fasteners (e.g., the tooled process).

Therefore, the hooked mounting rails and the attachment mounting rails couple to the PV modules via different processes. The toolless process may reduce a complexity of installing the PV modules and/or reduce an amount of time to install the PV modules. In addition, the omission of the fasteners to couple the PV modules to the hooked mounting rails reduces the cost to install the solar installations.

The object and advantages of the embodiments will be realized and achieved at least by the elements, features, and combinations particularly pointed out in the claims. Both the foregoing summary and the following detailed description are exemplary and explanatory and are not restrictive.

BRIEF DESCRIPTION OF THE DRAWINGS

Example embodiments will be described and explained with additional specificity and detail through the use of the accompanying drawings in which.

all according to at least one embodiment described in the present disclosure.

DETAILED DESCRIPTION

Embodiments of the present disclosure will be explained with reference to the accompanying figures. It is to be understood that the figures are diagrammatic and schematic representations of such example embodiments, and are not limiting, nor are they necessarily drawn to scale. In the figures, features with like numbers indicate like structure and function unless described otherwise.

Figure 1A:
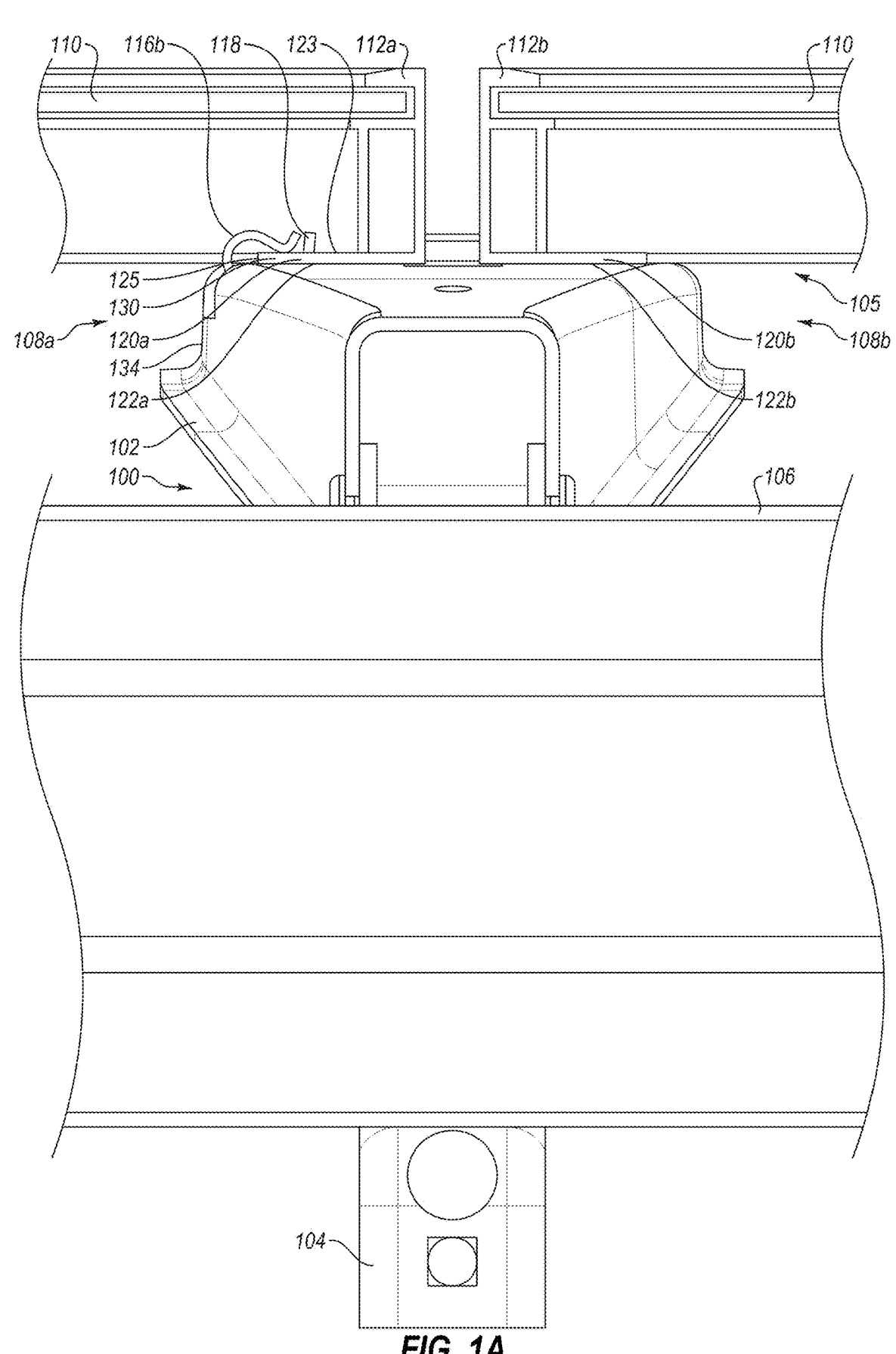
FIGS. 1A-1C illustrate a front cross-sectional view, a back cross-sectional view, and a top view of a torque tube interface including an example mounting rail and an example mounting clamp to couple example PV modules to a torque tube.
Figure 1B:
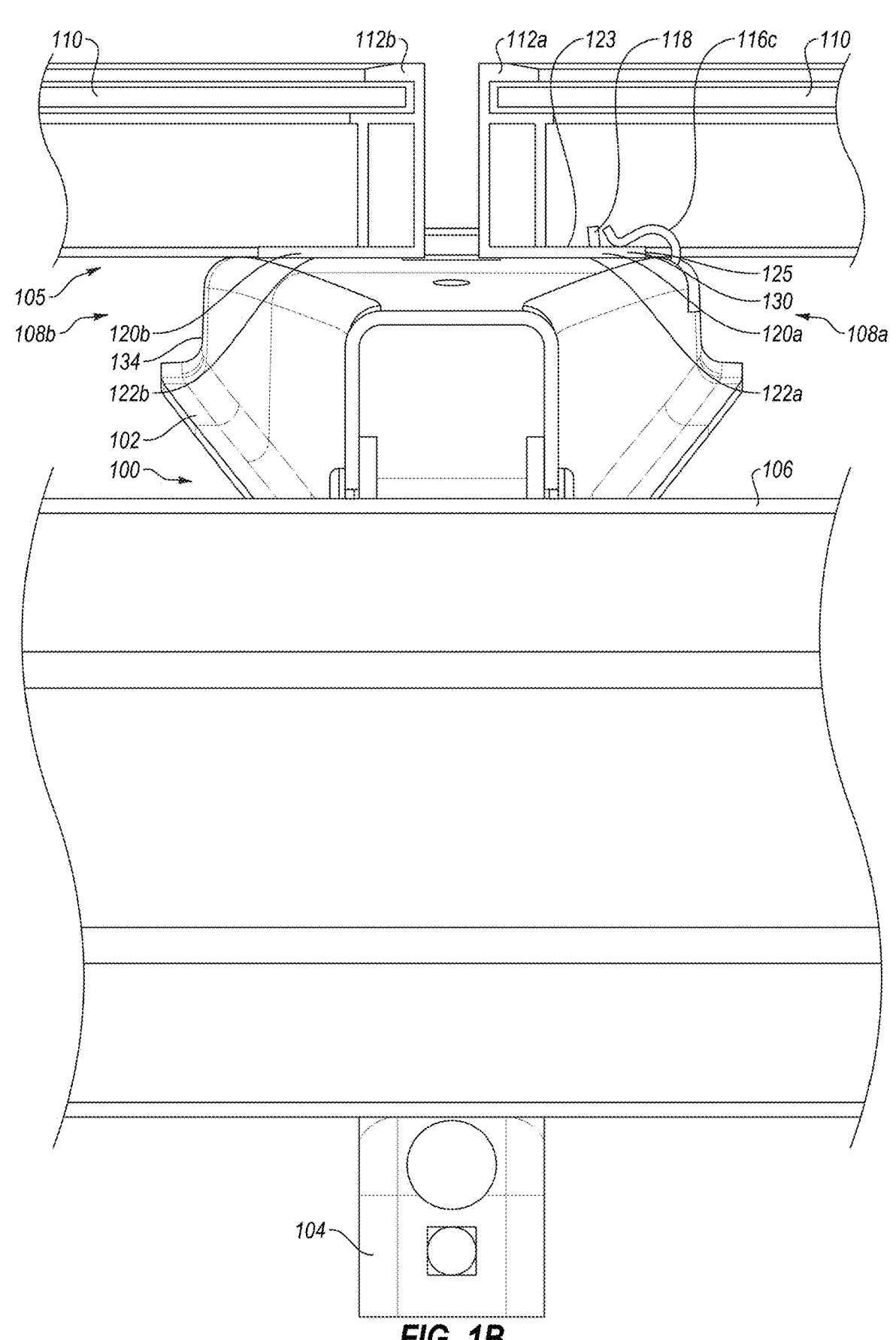
Figure 1C:
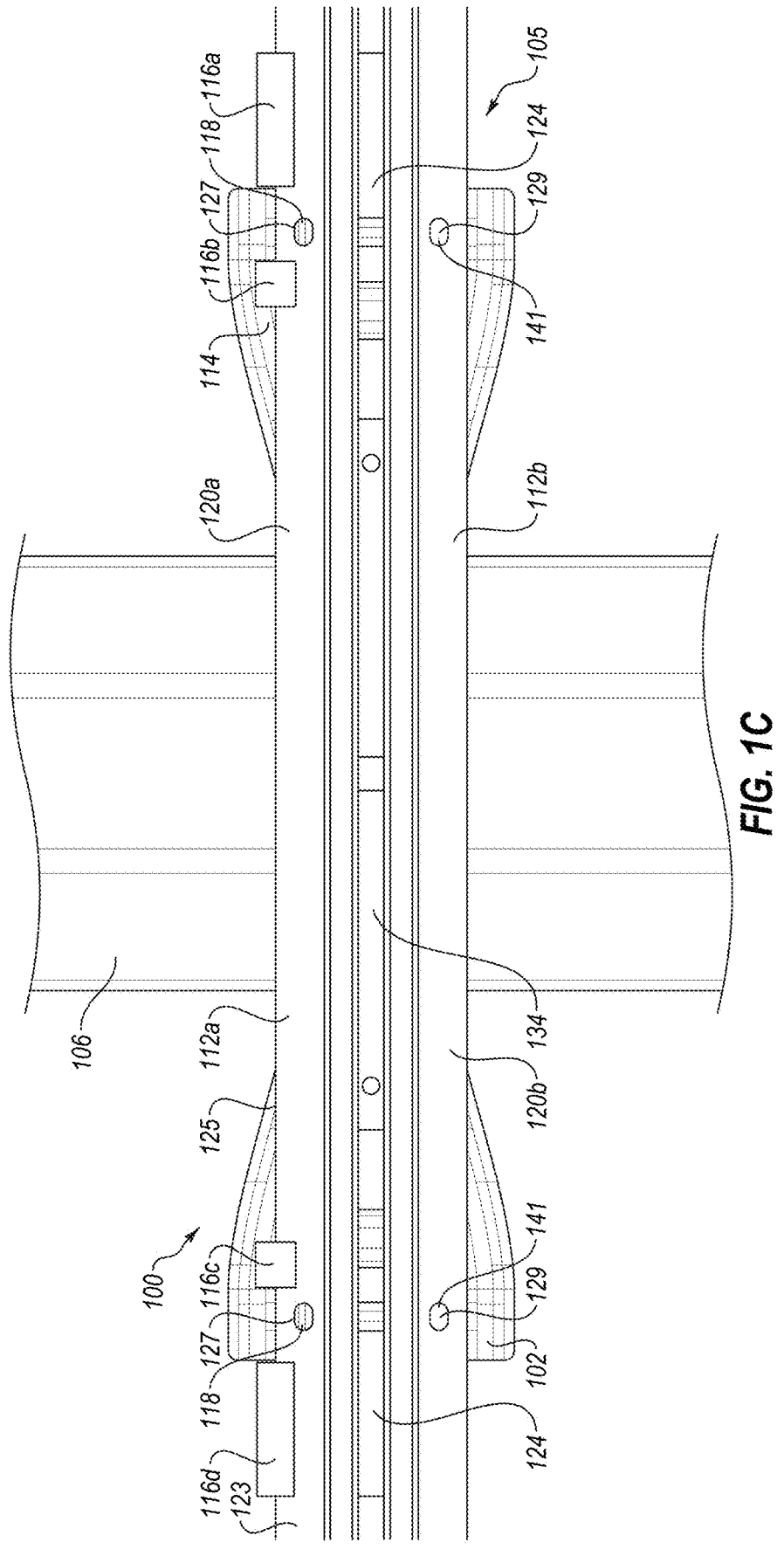
Figure 2A:
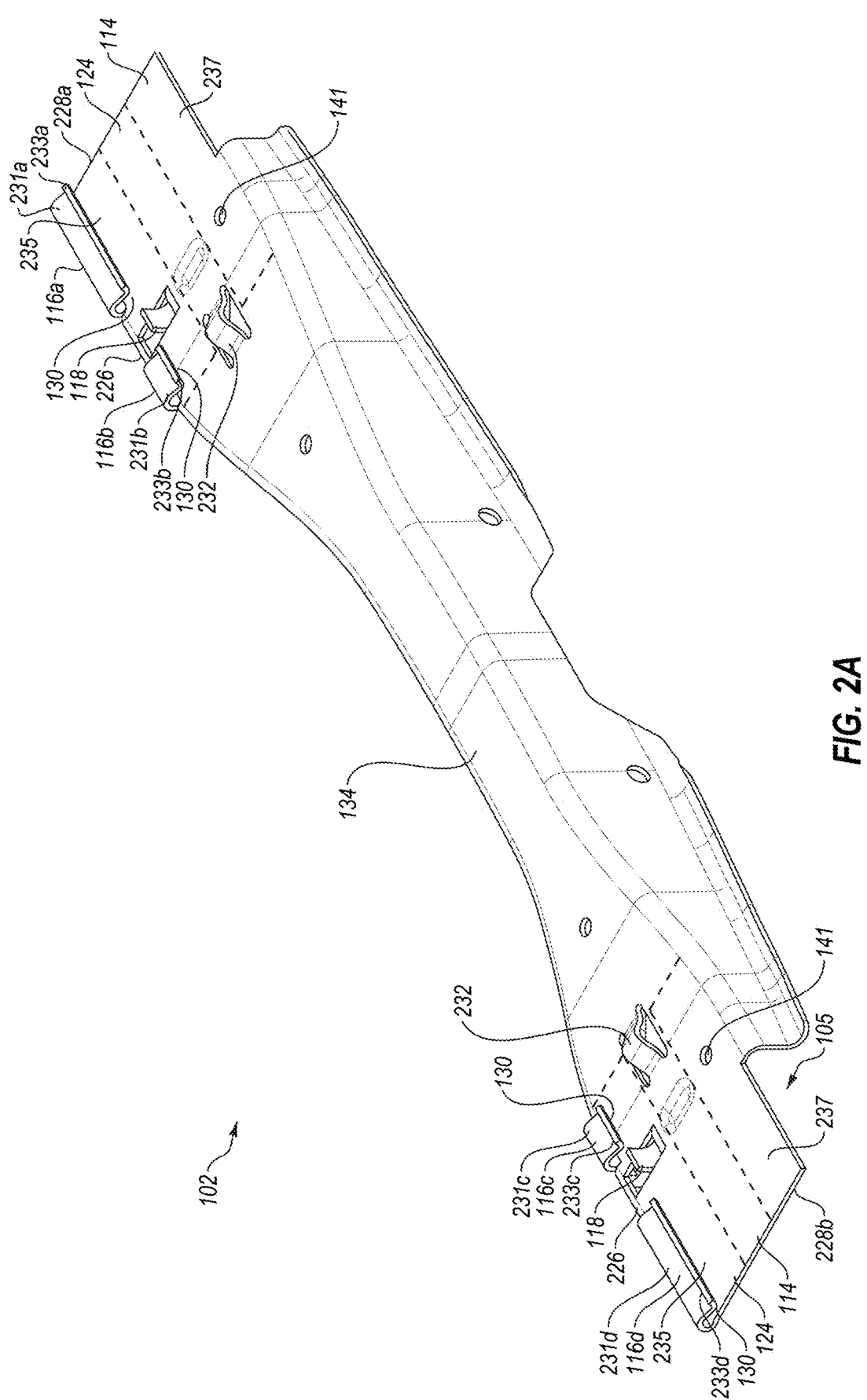
FIGS. 2A-2G illustrate a perspective view, a first side view, a second side view, a top view, a bottom view, a front view, and a back view of one example of the mounting rail of FIGS. 1A-1C.
Figure 2B:
Figure 2B:
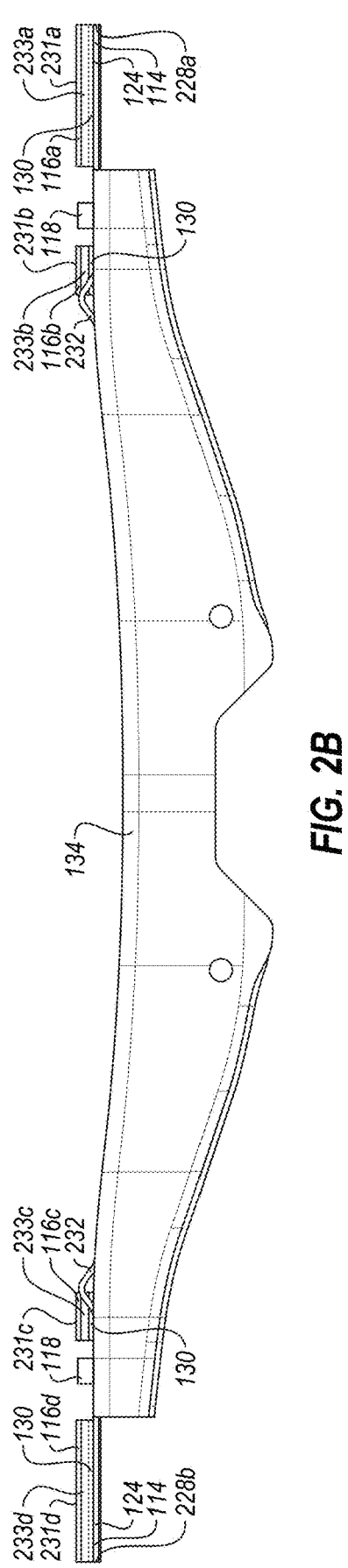
Figure 2C:
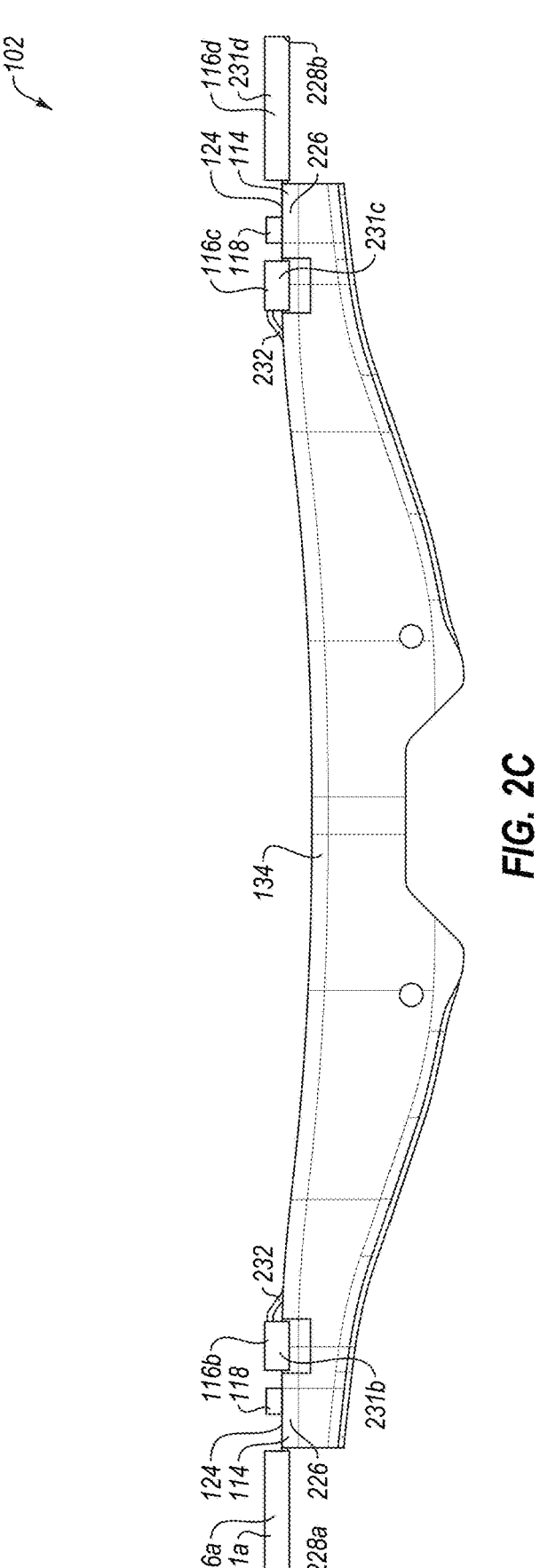
Figure 2D:
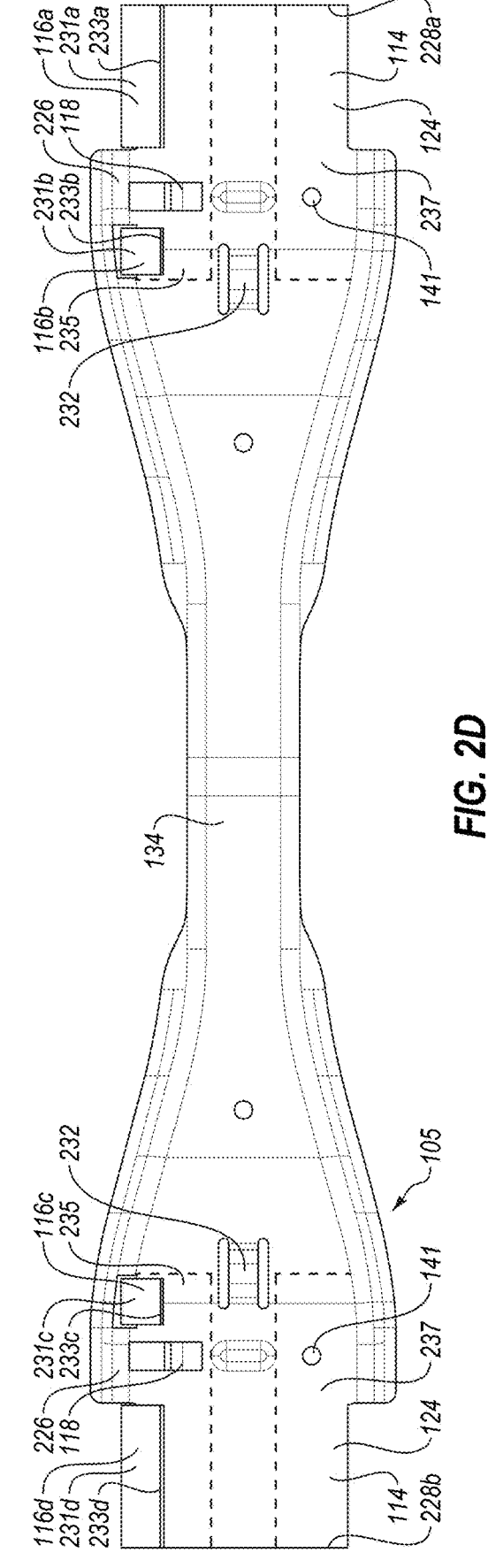
Figure 2E:
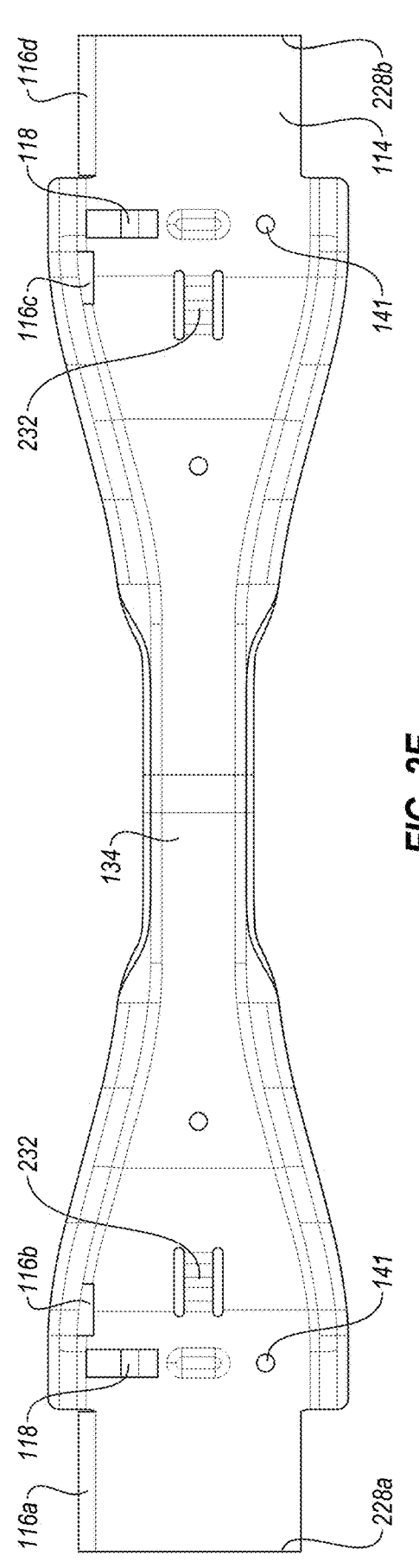
Figure 2F:
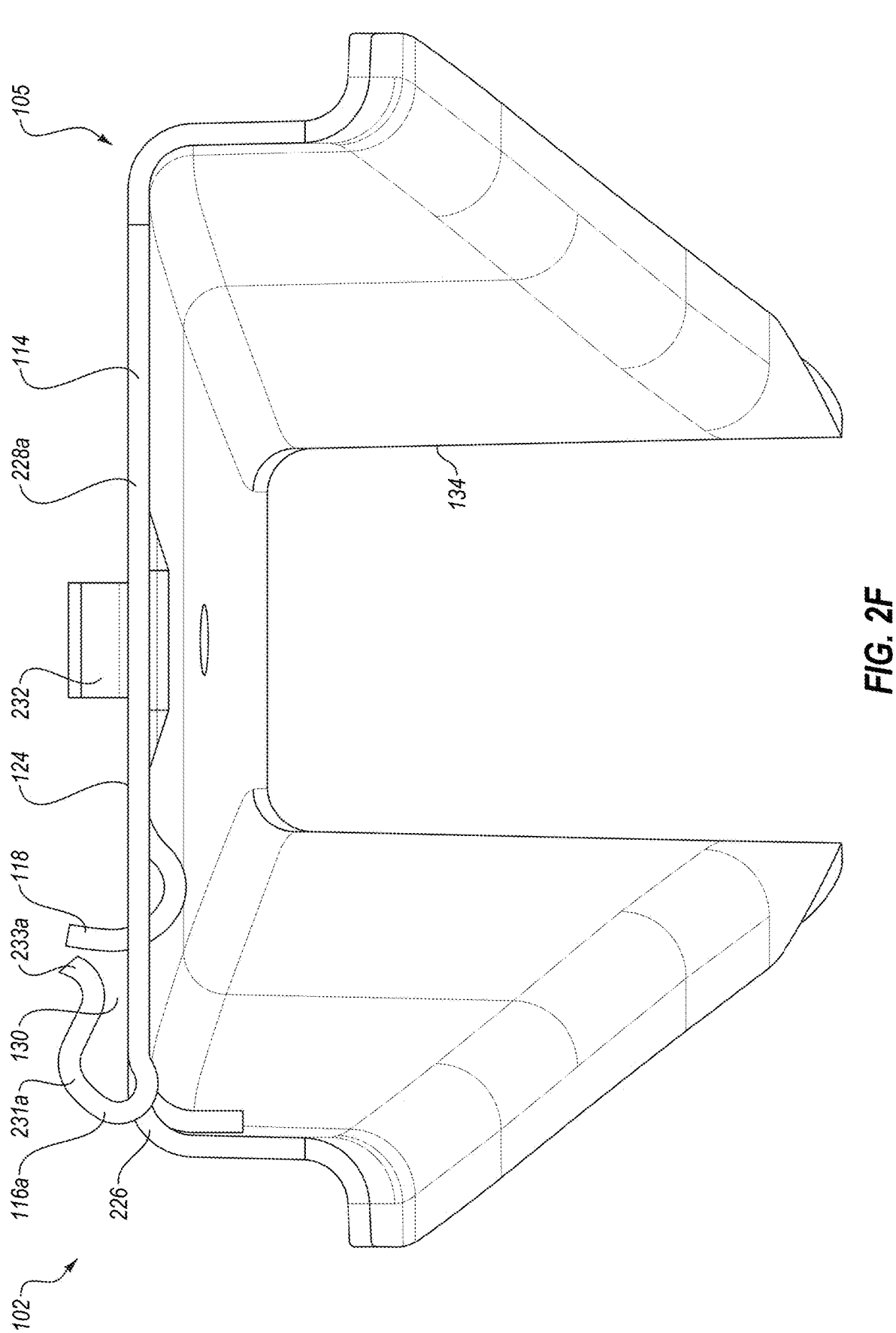
Figure 2G:
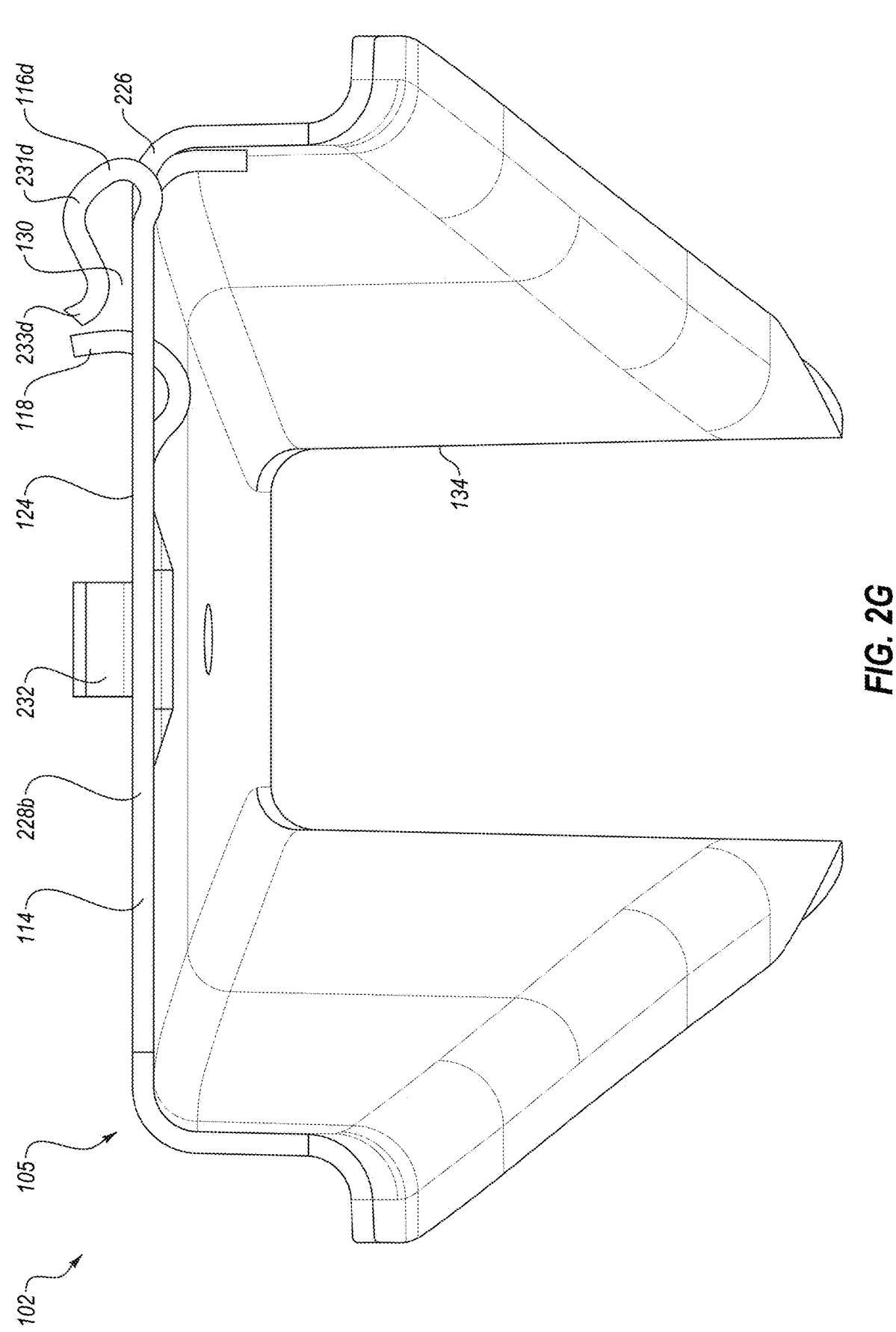

Referring to FIGS. 1A-1C, an example of one torque tube interface 100 including an example mounting rail 102 and an example mounting clamp 104 to couple example PV modules 108a-b to a torque tube 106 is shown. FIG. 1A illustrates a front cross-sectional view of the torque tube interface 100 and the torque tube 106 with sidewalls of the PV modules 108a-b omitted. FIG. 1B illustrates a back cross-sectional view of the torque tube interface 100 and the torque tube 106 with sidewalls of the PV modules 108a-b omitted. FIG. 1C illustrates a top view of the torque tube interface 100 and the torque tube 106 with PV panels 110 of the PV modules 108a-b omitted. Although the mounting rail 102 is illustrated and described as coupling the PV modules 108a-b to the torque tube 106, it is appreciated that the embodiments described in the present disclosure may be implemented to couple the PV modules 108a-b to any appropriate solar component.

In the example shown, each of the PV modules 108a-b includes a PV panel 110. Each of the PV panels 110 may be coupled to corresponding module frames 112a-b. In addition, the module frames 112a-b are coupled to the torque tube interface 100 to couple the PV modules 108a-b to the torque tube 106. In particular, the mounting rail 102 is coupled to the mounting clamp 104 and the torque tube 106 and the PV modules 108a-b are coupled to the mounting rail 102.

In some embodiments, the mounting rail 102 may include an asymmetrical configuration to couple to the PV modules 108a-b in different ways. For example, as discussed in more detail below, the mounting rail 102 may couple to the module frame 112a of the PV module 108a via one or more hooked mechanisms 116a-d (each of the hooked mechanisms 116a-d are shown in FIG. 1C), one or more retention members 118 (each of the retention members 118 are shown in FIG. 1C), or both. As another example, as discussed in more detail below, the mounting rail 102 may couple to the PV module 108b via an attachment feature 105.

The mounting rail 102 may include an upper portion 114 that is connected to a connecting portion 134. The upper portion 114 may engage with a bottom surface 122a of the module frame 112a. In addition, the hooked mechanisms 116a-d (generally referred to in the present disclosure as hooked mechanism 116), the upper portion 114, or both may at least partially define one or more apertures 130 configured to receive a return flange 120a of the module frame 112a. The apertures 130 may receive an edge 125 of the return flange 120a to position a portion of the return flange 120a between the hooked mechanism 116 and the upper portion 114.

The apertures 130 may receive the return flange 120a to couple the module frame 112a to the mounting rail 102. In addition, the hooked mechanism 116 may physically engage with a top surface 123 of the return flange 120a to couple the module frame 112a to the mounting rail 102. The apertures 130 may receive the return flange 120a to prevent the bottom surface 122a from unintentionally disengaging from the upper portion 114. Further, the hooked mechanism 116 may engage with the top surface 123 of the return flange 120a to maintain the engagement between the upper portion 114 and the bottom surface 122a. In other words, the hooked mechanism 116 and the upper portion 114 may sandwich part of the return flange 120a between the hooked mechanism 116 and the upper portion 114 to prevent the module frame 112a from moving away from a surface 124 of the upper portion 114 (e.g., moving in an upward direction in FIG. 1A).

During installation, the PV module 108a may be positioned such that the bottom surface 122a physically engages with the upper portion 114. In addition, the PV module 108a may be positioned such that the edge 125 of the return flange 120a is proximate to the apertures 130. The PV module 108a may be moved such that the module frame 112a moves along a width of the mounting rail 102 (e.g., along a left direction in FIG. 1A) to cause the edge 125 to enter the apertures and the hooked mechanism 116 to engage with the return flange 120a. In particular, the hooked mechanism 116 may engage with the top surface 123 to urge the return flange 120a towards the upper portion 114. In addition, the return flange 120a may be sandwiched between the hooked mechanism 116 and the upper portion 114. In some embodiments, the hooked mechanism 116 may prevent the module frame 112a from moving too far along the width of the mounting rail 102 (e.g., moving too far left in FIG. 1A) to prevent the return flange 120a from falling off the upper portion 114. In this manner, the mounting rail 102 couples to the PV module 108a via the module frame 112a and the hooked mechanism 116 without the use of any fasteners or tools (e.g. a toolless process). Sequences of movements to interface an example PV module with example mounting rails are described in more detail below in relation to FIG. 11.

In some embodiments, the mounting rail 102 may include the one or more retention members 118 (generally referred to in the present disclosure as the retention member 118). In other embodiments, the retention member 118 may be omitted. The retention member 118 may facilitate a position of the module frame 112a. In addition, the retention member 118 may support and prevent movement of the module frame 112a when coupled to the mounting rail 102. The retention member 118 may interface with openings 127 (shown in FIG. 1C) defined by the module frame 112a to prevent movement of the module frame 112a in one or more directions. For example, the retention member 118, when interfaced with the openings 127, may prevent the module frame 112a from moving along a length of the mounting rail 102 (e.g., moving into or out of the page of FIG. 1A), the width of the mounting rail 102 (e.g., moving left or right in FIG. 1A), or both.

During installation, the PV module 108a may be moved along the width of the mounting rail 102 (e.g., along the left direction in FIG. 1A) to cause the edge 125 and/or the bottom surface 122a to engage with the retention member 118. The edge 125 engaging with retention member 118 may cause the retention member 118 to selectively deform or move to transition from a first position (e.g., an equilibrium position as shown in FIGS. 1A-1C and FIGS. 2A-2G) to a second position. In other words, the edge 125 engaging with the retention member 118 may cause the retention member to move out of the way of the return flange 120a and permit the edge 125 to enter the apertures 130. The bottom surface 122a engaging with the retention member 118 may cause the retention member 118 to remain in the second position.

When in the second position, the retention member 118 may experience a spring force (e.g., a restoring force) urging the retention member 118 back to the first position. However, the bottom surface 122a, when engaged with the retention member 118, may prevent the retention member 118 from returning to the first position. The PV module 108a may be moved along the upper portion 114 until the retention member 118 is aligned with the corresponding opening 127. When the retention member 118 is aligned with the corresponding opening 127, the spring force may cause the retention member 118 to return to the first position or partially to the first position and be received by the corresponding opening 127. In this manner, the retention member 118 may interface with the module frame 112a to support and prevent movement of the module frame 112a.

The attachment feature 105 may couple the PV module 108b to the mounting rail 102 using fasteners (not shown in FIGS. 1A-1C) (e.g., a tooled process). In some embodiments, the attachment feature 105 may couple the PV module 108b to the mounting rail 102 in a way that is different than how the hooked mechanism 116 couples the PV module 108a to the mounting rail 102.

In some embodiments, the attachment feature 105 may include one or more openings 141 (shown in FIG. 1C) defined by the upper portion 114. The openings 141 of the attachment feature 105 may align with openings 129 defined by a return flange 120b of the module frame 112b. The openings 141 of the attachment feature 105 and the openings 129 of the return flange 120b may receive the fasteners of the attachment feature 105 to couple the PV module 108b to the mounting rail 102.

During installation, the PV module 108b may be positioned such that a bottom surface 122b of the module frame 112b physically engages with the upper portion 114. In addition, during installation, the PV module 108b may be positioned such that the openings 141 of the attachment feature 105 are aligned with the openings 129 of the return flange 120b. The openings 141 of the attachment feature 105 and the openings 129 of the return flange 120b may receive the fasteners. The fasteners may draw the module frame 112b towards the upper portion 114 and couple the module frame 112b to the mounting rail 102. For example, the fasteners may include bolts and nuts, which interface with each other to draw the module frame 112b towards the upper portion 114. In this manner, the mounting rail 102 couples to the PV module 108b via the module frame 112b and the fasteners. In some embodiments, the fasteners of the attachment feature 105 may include bolts, nuts, threaded fasteners, thru-bolts, clips, top-down clamps, rivets, or some combination thereof.

With further reference to FIGS. 1A-1C and FIGS. 2A-2G, the upper portion 114 includes the surface 124 that physically engages with the bottom surface 122a of the module frame 112a and the bottom surface 122b of the module frame 112b. In some embodiments, the surface 124 may include a first part 235 (shown in FIGS. 2A and 2D) and a second part 237 (shown in FIGS. 2A and 2D). The first part 235 may physically engage with the bottom surface 122a of the module frame 112a. The second part 237 may physically engage with the bottom surface 122b of the module frame 112b.

As shown, the hooked mechanism 116 overlaps a portion of the surface 124 to at least partially define the apertures 130. In particular, each of the hooked mechanisms 116a-d may include a first curved portion 231a-d (generally referred to in the present disclosure as the first curved portion 231), a second curved portion 233a-d (generally referred to in the present disclosure as the second curved portion 233), or both that at least partially overlap the surface 124. The first curved portion 231 may extend from an edge 226 of the upper portion 114 and curve back toward the upper portion 114 such that the first curved portion 231 includes a first radius of curvature. The second curved portion 233 may extend from the first curved portion 231 away from the surface 124 such that the second curved portion 233 includes a second radius of curvature. The first curved portion 231, the second curved portion 233, or both may define the apertures 130. The second curved portion 233 may extend in a direction away from the surface 124 such that a size of the apertures 130 varies to accommodate a variety of heights of the return flange 120a.

The apertures 130 may be defined to receive different portions of the edge 125 to couple the module frame 112a to the mounting rail 102 as discussed above. The hooked mechanism 116, when engaged with the return flange 120a, may apply a force on the top surface 123 to urge the return flange 120a towards the upper portion 114. For example, the return flange 120a entering the apertures 130 may cause the hooked mechanism 116 to selectively deform or move to cause the hooked mechanism 116 to apply the force on the top surface 123. In this way, the hooked mechanism 116 may prevent the bottom surface 122a from unintentionally disengaging from the upper portion 114.

In the example shown, the hooked mechanism 116 includes multiple hooked mechanisms 116a-d connected to the edge 226 of the upper portion 114 and positioned at different locations along the edge 226. The hooked mechanisms 116a-d may be positioned at the different locations to interface with different portions of the return flange 120a. In addition, in the example shown, the hooked mechanism 116 includes the hooked mechanism 116a positioned at a longitudinal end 228a of the upper portion 114 and the hooked mechanism 116d positioned at a longitudinal end 228b of the upper portion 114. Alternatively, one or more of the hooked mechanisms 116a or 116d may be positioned a distance from the longitudinal ends 228a-b. For example, the hooked mechanism 116a may be a distance from the longitudinal end 228a, the hooked mechanism 116d may be a distance from the longitudinal end 228b, or both.

The hooked mechanism 116 is illustrated in FIGS. 1A-2G as including four hooked mechanisms 116a-d for example purposes. It is understood that the hooked mechanism 116 may include any appropriate number of hooked mechanisms. For example, the hooked mechanism 116 may include one, two, or more hooked mechanisms.

The retention member 118 may include a portion that extends in a direction away from the surface 124 such that the portion of the retention member 118 is positioned above the surface 124 when in the first position. In some embodiments, the retention member 118 may include one or more bent pieces of material that are configured to interface with the module frame 112a to maintain a position of the module frame 112a relative to the upper portion 114. The retention member 118 may be connected to the upper portion 114 to create a spring tension such that transitioning from the first position to the second position causes the retention member 118 to experience the spring force.

The retention member 118 may engage with the edge 125 and/or the bottom surface 122a such that an end of the retention member 118 is flush with the surface 124 when in the second position. Additionally or alternatively, at least a portion of the retention member 118 may be disposed in an opening defined by the upper portion to permit the edge 125 to be received by the apertures 130.

In the example shown, the retention member 118 includes two retention members 118 connected to the upper portion 114. However, it is understood that the retention member 118 may include any appropriate number of retention members. For example, the retention member 118 may include one, two, three or more retention members. The retention member 118 is illustrated as including two bent clips for example purposes. It is understood that the retention member 118 may include any appropriate device. For example, the retention member 118 may include a tab, a clip, a stud, a spring-loaded tab, a spring-loaded clip, a spring-loaded tab, or any other appropriate device. In addition, each of the retention members 118 are illustrated as being positioned between two hooked mechanisms 116a-d for example purposes.

In some embodiments, the mounting rail 102 may include one or more alignment members 232 (generally referred to in the present disclosure as the alignment member 232) that extend away from the surface 124. The alignment member 232 may physically engage with sidewalls (such as denoted 438 in FIG. 9) of the module frames 112a-b to align the PV modules 108a-b relative to the upper portion 114. In addition, the alignment member 232 may be sized to prevent the PV modules 108a-b from contacting each other. Further, the alignment member 232 may physically engage with the sides of the module frames 112a-b to prevent the module frames 112a-b from moving too far along the width of the mounting rail 102.

As discussed above, the attachment feature 105 may include the openings 141 to receive the fasteners to couple the module frame 112b to the mounting rail 102. In some embodiments, the fasteners may include bolts that traverse the openings 141 of the attachment feature 105 to interface with the module frame 112b and/or nuts (not illustrated) to couple the module frame 112b to the mounting rail 102. For example, the bolts may traverse the openings 141 of the attachment feature 105 and the nuts may thread onto ends of the bolts. Heads of the bolts may be oversized compared to the openings 141 defined by the surface 124 to prevent the bolts from passing through the openings defined by the surface 124 and/or the openings 129. In some embodiments, the openings 141 defined by the surface 124 may include threaded portions configured to interface with threaded portions of the bolts.

In some embodiments, the mounting rail 102 may include a single unitary piece of material in which the hooked mechanism 116, the retention member 118, the alignment member 232, or some combination thereof are punched or otherwise formed from. In other embodiments, the mounting rail 102 may include multiple pieces of material. The hooked mechanism 116 may be connected to the mounting rail 102 via a weld, a rivet, a threaded fastener, an adhesive, a clinch joint, or a snap-in feature. In these and other embodiments, the mounting rail 102 may include aluminum, steel, or any other appropriate material. In some embodiments, the mounting rail 102 may be formed using an extrusion process.

Although the mounting rail 102 is illustrated as including the hooked mechanism 116 and the retention member 118 only on one side of the mounting rail 102 (e.g., along the edge 226), the mounting rail 102 may include additional hooked mechanisms, retention members, or both along the opposite side to couple the module frame 112b to the mounting rail 102.

Figure 3:
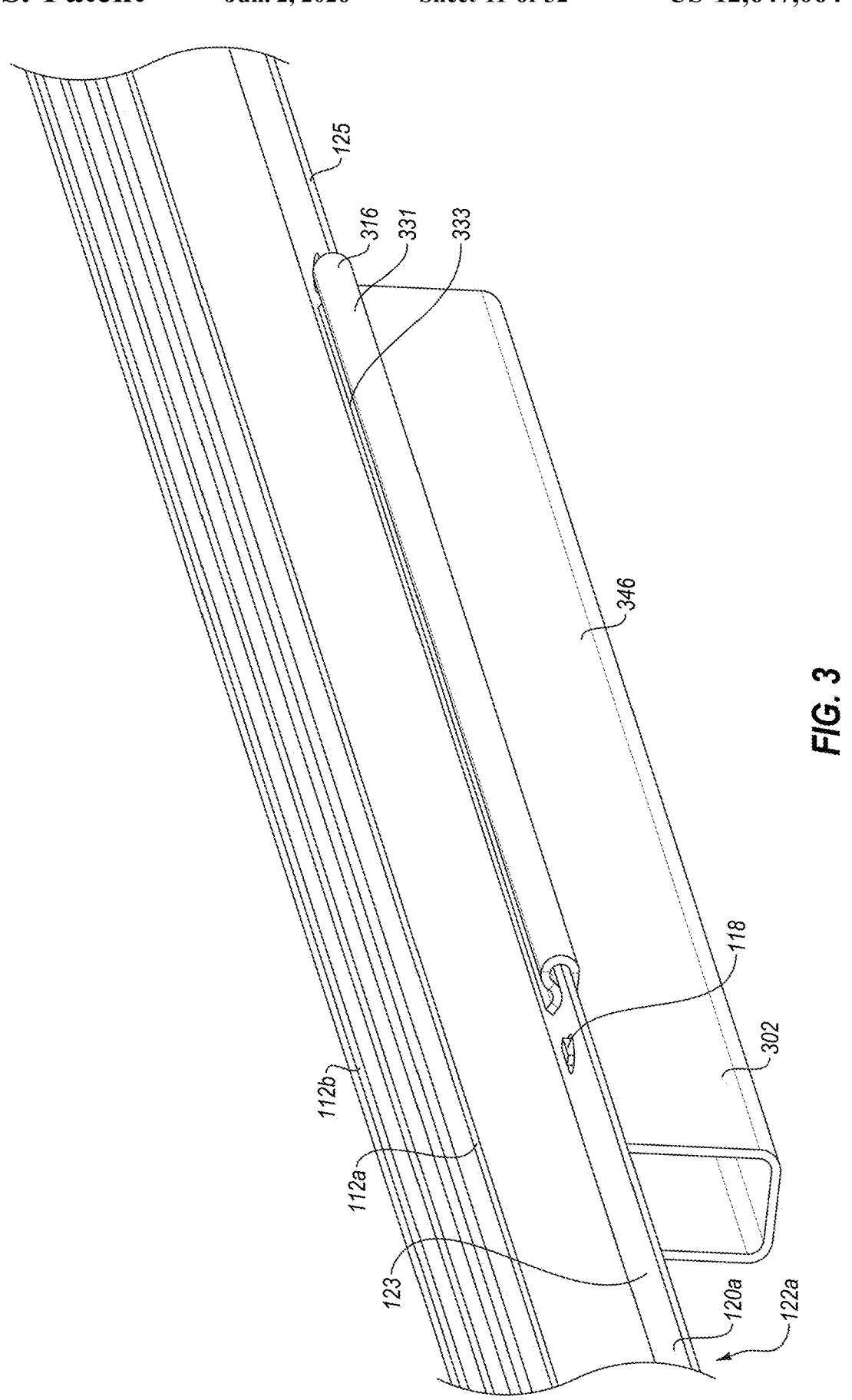
FIG. 3 illustrates a perspective view of one example of a mounting rail coupled to the example module frames.

With reference to FIG. 3, an example mounting rail 302 coupled to the module frames 112a-b is shown. The mounting rail 302 may couple the module frames 112a-b to a torque tube, a mounting clip, or any other appropriate solar component.

In some embodiments, the mounting rail 302 may include an asymmetrical configuration to couple the mounting rail 302 to the module frames 112a-b in different ways. For example, as discussed in more detail below, the mounting rail 302 may couple to the module frame 112a via an elongated hooked mechanism 316 (generally referred to in the present disclosure as the hooked mechanism 316), the one or more retention members 118, or both. As another example, as discussed in more detail below, the mounting rail 302 may couple to the module frame 112b via an attachment feature (not shown in FIG. 3).

The mounting rail 302 may include an upper portion (not shown in FIG. 3) connected to a connecting portion 346. The upper portion may engage with the bottom surface 122a of the module frame 112a. In addition, the hooked mechanism 316, the upper portion, or both may at least partially define an aperture (not shown in FIG. 3) configured to receive the return flange 120a of the module frame 112a. The aperture may receive the edge 125 of the return flange 120a to position a portion of the return flange 120a between the hooked mechanism 316 and the upper portion. The aperture of the mounting rail 302 may operate the same or similar to the apertures 130 of FIGS. 1A-2G.

The aperture may receive the return flange 120a to couple the module frame 112a to the mounting rail 302. In addition, the hooked mechanism 316 may physically engage with the top surface 123 of the return flange 120a to couple the module frame 112a to the mounting rail 302. The aperture may receive the return flange 120a to prevent the bottom surface 122a from unintentionally disengaging from the upper portion. Further, the hooked mechanism 316 may engage with the top surface 123 of the return flange 120a to maintain the engagement between the upper portion and the bottom surface 122a. In other words, the hooked mechanism 316 and the upper portion may sandwich part of the return flange 120a between the hooked mechanism 316 and the upper portion to prevent the module frame 112a from moving away from a surface of the upper portion (e.g., moving in an upward direction in FIG. 3).

During installation, the module frame 112a may be positioned such that the bottom surface 122a physically engages with the upper portion of the mounting rail 302. In addition, the module frame 112a may be positioned such that the edge 125 of the return flange 120a is proximate to the aperture. The module frame 112a may be moved such that the module frame 112a moves along a width of the mounting rail 302 to cause the edge 125 to enter the aperture and the hooked mechanism 316 to engage with the return flange 120a. In particular, the hooked mechanism 316 may engage with the top surface 123 to urge the return flange 120a towards the upper portion. In addition, the return flange 120a may be sandwiched between the hooked mechanism 316 and the upper portion of the mounting rail 302. In some embodiments, the hooked mechanism 316 may prevent the module frame 112a from moving too far along the width of the mounting rail 302 to prevent the return flange 120a from falling off the upper portion. In this manner, the mounting rail 302 couples to the module frame 112a and the hooked mechanism 316 without the use of any fasteners or tools (e.g., the toolless process). Sequences of movements to interface an example PV module with example mounting rails are described in more detail below in relation to FIG. 11.

The attachment feature may couple the PV module 108b to the mounting rail 302 using fasteners (not shown in FIG. 4) (e.g., the tooled process). In some embodiments, the attachment feature may couple the PV module 108b to the mounting rail 302 in a way that is different than how the hooked mechanism 316 couples the PV module 108a to the mounting rail 302. The attachment feature of the mounting rail 302 may operate the same as or similar to the attachment feature 105 discussed above in relation to FIGS. 1A-2G.

In some embodiments, the attachment feature may include one or more openings (not shown in FIG. 4) defined by the upper portion. The openings of the attachment feature may align with the openings 129 defined by the module frame 112b. The openings of the attachment feature and the openings 129 may receive the fasteners of the attachment feature to couple the module frame 112b to the mounting rail 402.

The surface of the upper portion may physically engage with the bottom surface 122a of the module frame 112a and the bottom surface 122b of the module frame 112b. In some embodiments, the surface of the upper portion may include a first part (not shown in FIG. 3) and a second part (not shown in FIG. 3). The first part may physically engage with the bottom surface 122a of the module frame 112a. The second part may physically engage with the bottom surface 122b of the module frame 112b.

The hooked mechanism 316 overlaps a portion of the surface of the upper portion to at least partially define the aperture. In particular, the hooked mechanism 316 may include a first curved portion 331, a second curved portion 333, or both that at least partially overlap the surface of the upper portion. The first curved portion 331 may extend from an edge (not shown in FIG. 3) of the upper portion and curve back toward the upper portion. The second curved portion 333 may extend from the first curved portion 331 away from the surface of the upper portion. The first curved portion 331, the second curved portion 333, or both may define the aperture. The second curved portion 333 may extend in a direction away from the surface of the upper portion such that a size of the aperture varies to accommodate a variety of heights of the return flange 120a.

The hooked mechanism 316, when engaged with the return flange 120a, may apply a force on the top surface 123 to urge the return flange 120a towards the upper portion. For example, the return flange 120a entering the aperture may cause the hooked mechanism 316 to selectively deform or move to cause the hooked mechanism 316 to apply the force on the top surface 123. In this way, the hooked mechanism 316 may prevent the bottom surface 122a from unintentionally disengaging from the upper portion of the mounting rail 302.

In the example shown, the hooked mechanism 316 includes a single elongated hooked mechanism connected to the edge of the upper portion and positioned at least proximate a center of the edge of the upper portion. The hooked mechanism 316 may extend continuously along at least part of a length of the edge of the upper portion. In the example shown, the hooked mechanism 316 extends along a part of a distance between the retention member 118.

In some embodiments, the mounting rail 302 may include the retention member 118. In other embodiments, the retention member 118 may be omitted. Additionally or alternatively, the mounting rail 302 may include the alignment member 232 (not shown in FIG. 3).

In some embodiments, the mounting rail 302 may include a single unitary piece of material in which the hooked mechanism 316, the retention member 118, or both are punched or otherwise formed from. In other embodiments, the mounting rail 302 may include multiple pieces of material. The hooked mechanism 316 may be connected to the mounting rail 302 via a weld, a rivet, a threaded fastener, an adhesive, a clinch joint, or a snap-in feature. In these and other embodiments, the mounting rail 302 may include aluminum, steel, or any other appropriate material. In some embodiments, the mounting rail 302 may be formed using an extrusion process.

Although the mounting rail 302 is described as including the hooked mechanism 316 and the retention member 118 only on one side of the mounting rail 302, the mounting rail 302 may include additional hooked mechanisms, retention members 118, or both along the opposite side to couple the module frame 112b to the mounting rail 302.

Figure 4A:
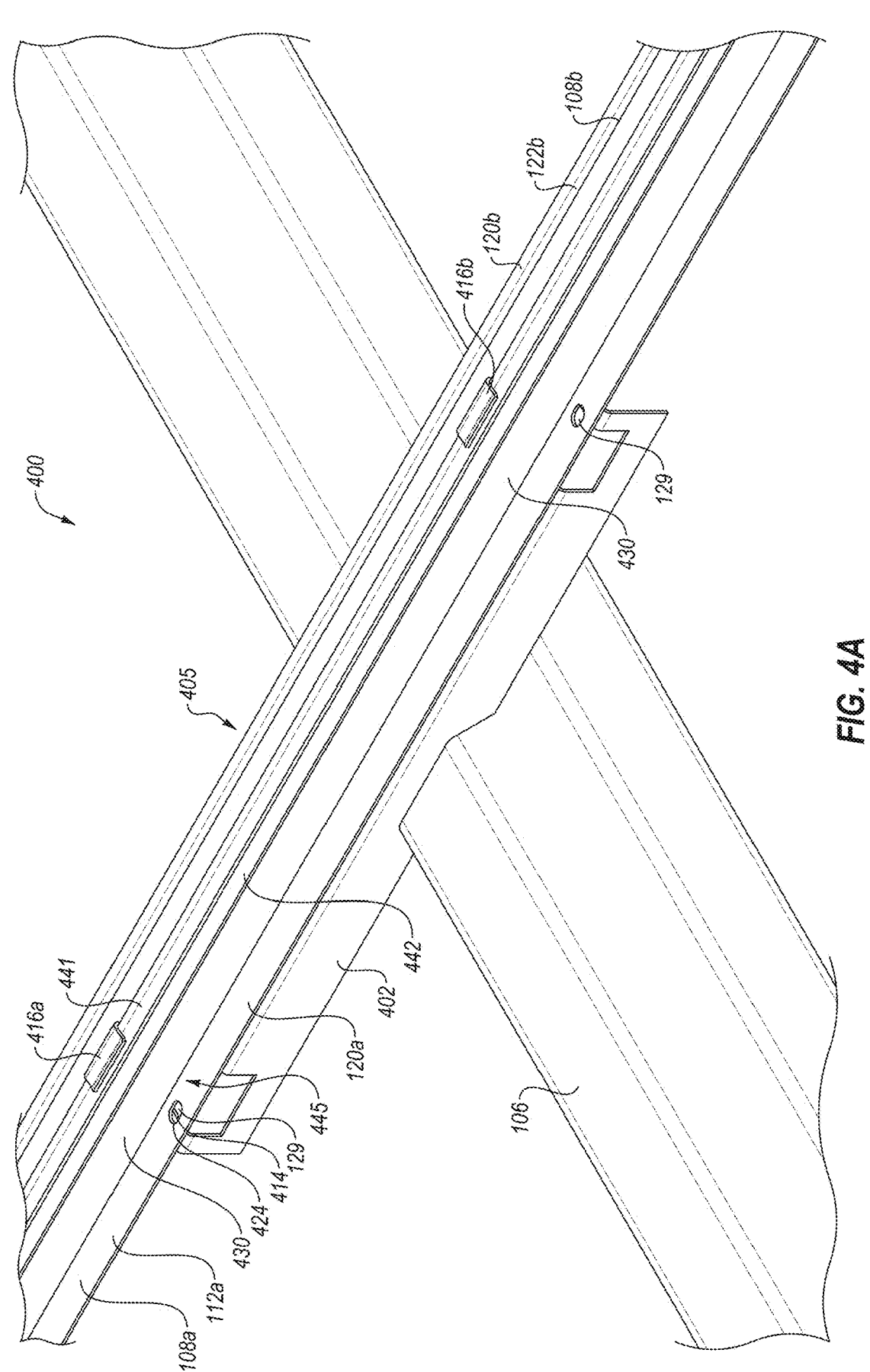
FIGS. 4A-4C illustrate a left perspective view, a right perspective view, and a front view of a torque tube interface including an example mounting rail coupling example PV modules to a torque tube.
Figure 4B:
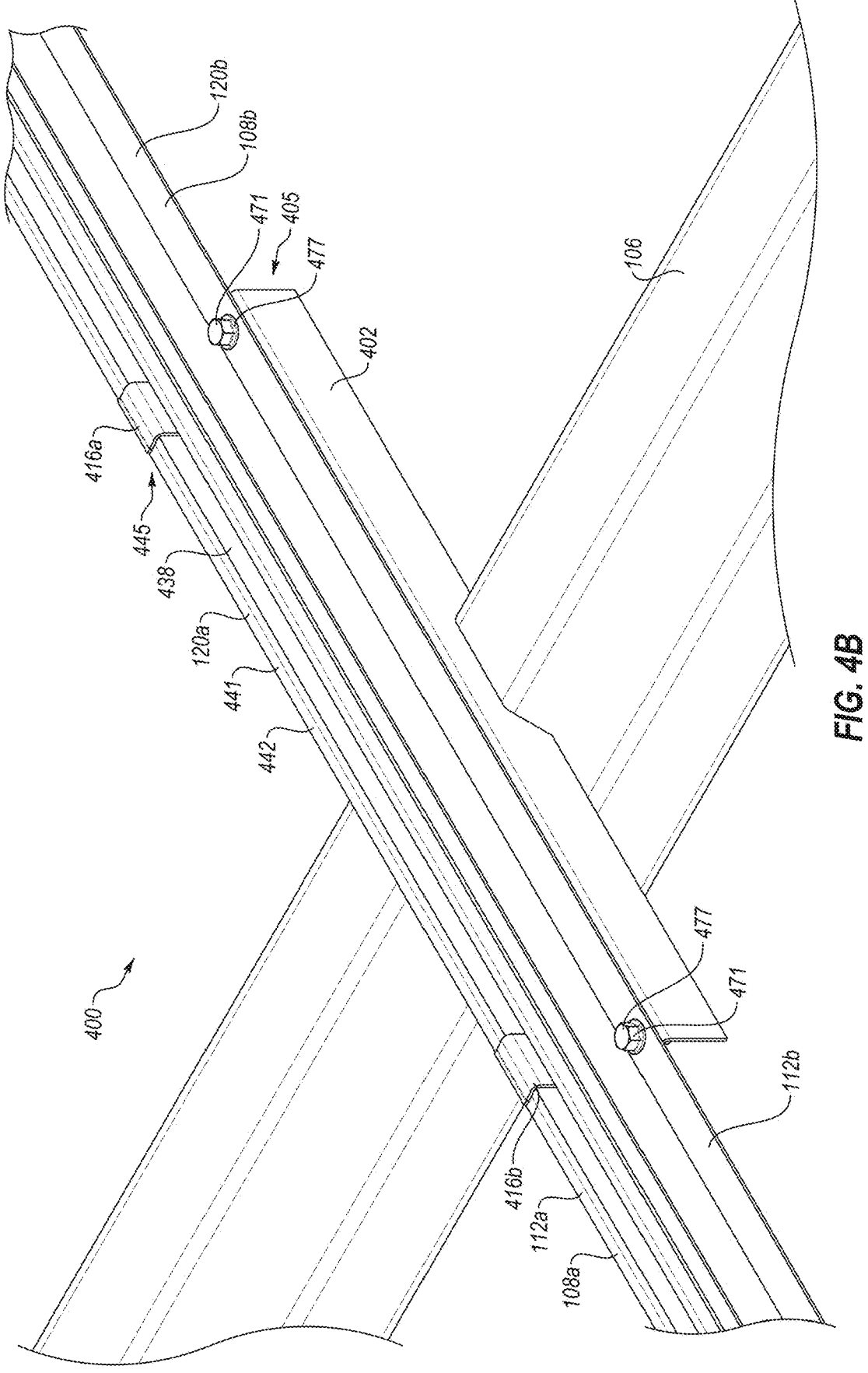
Figure 4C:
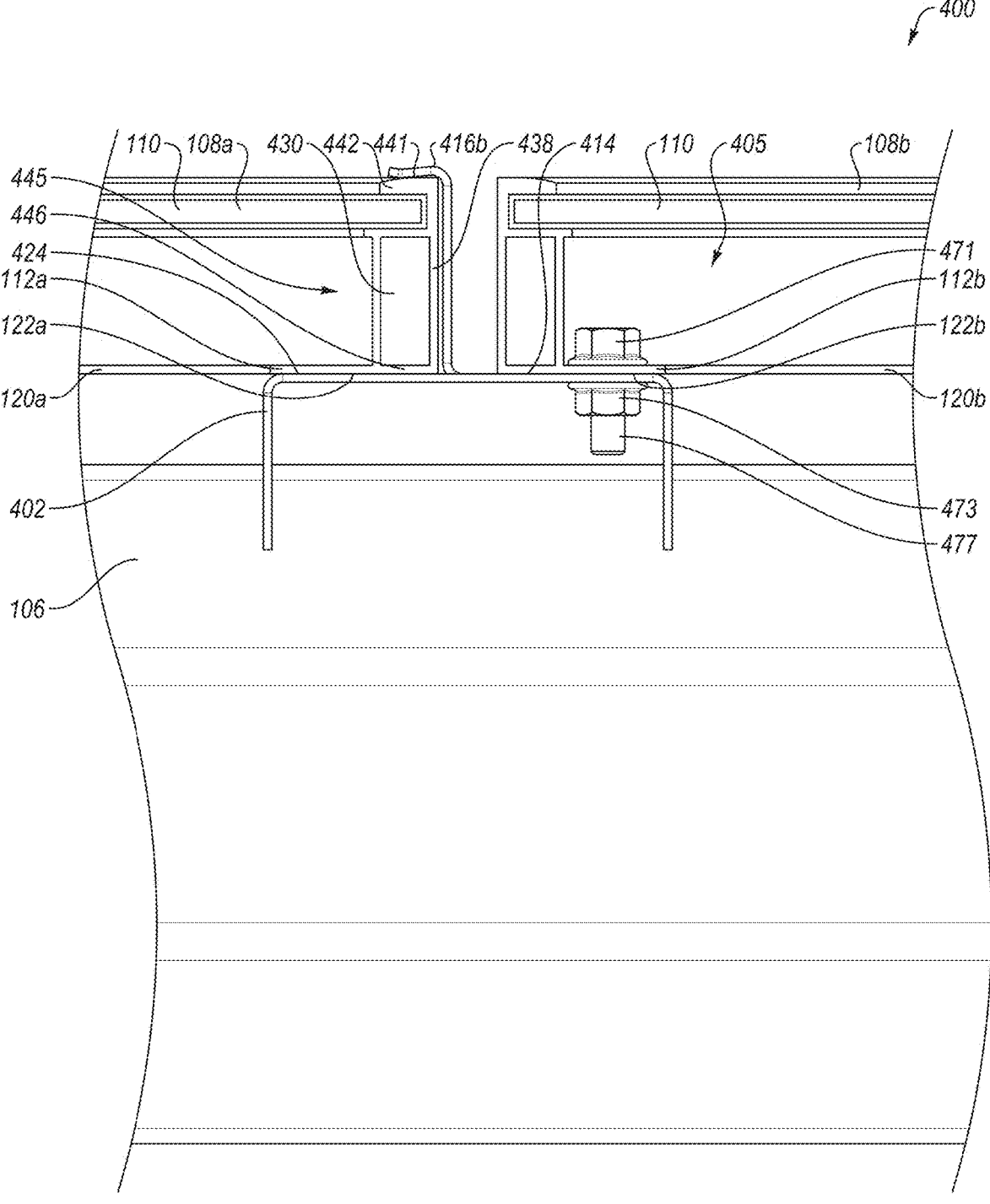
Figure 5A:
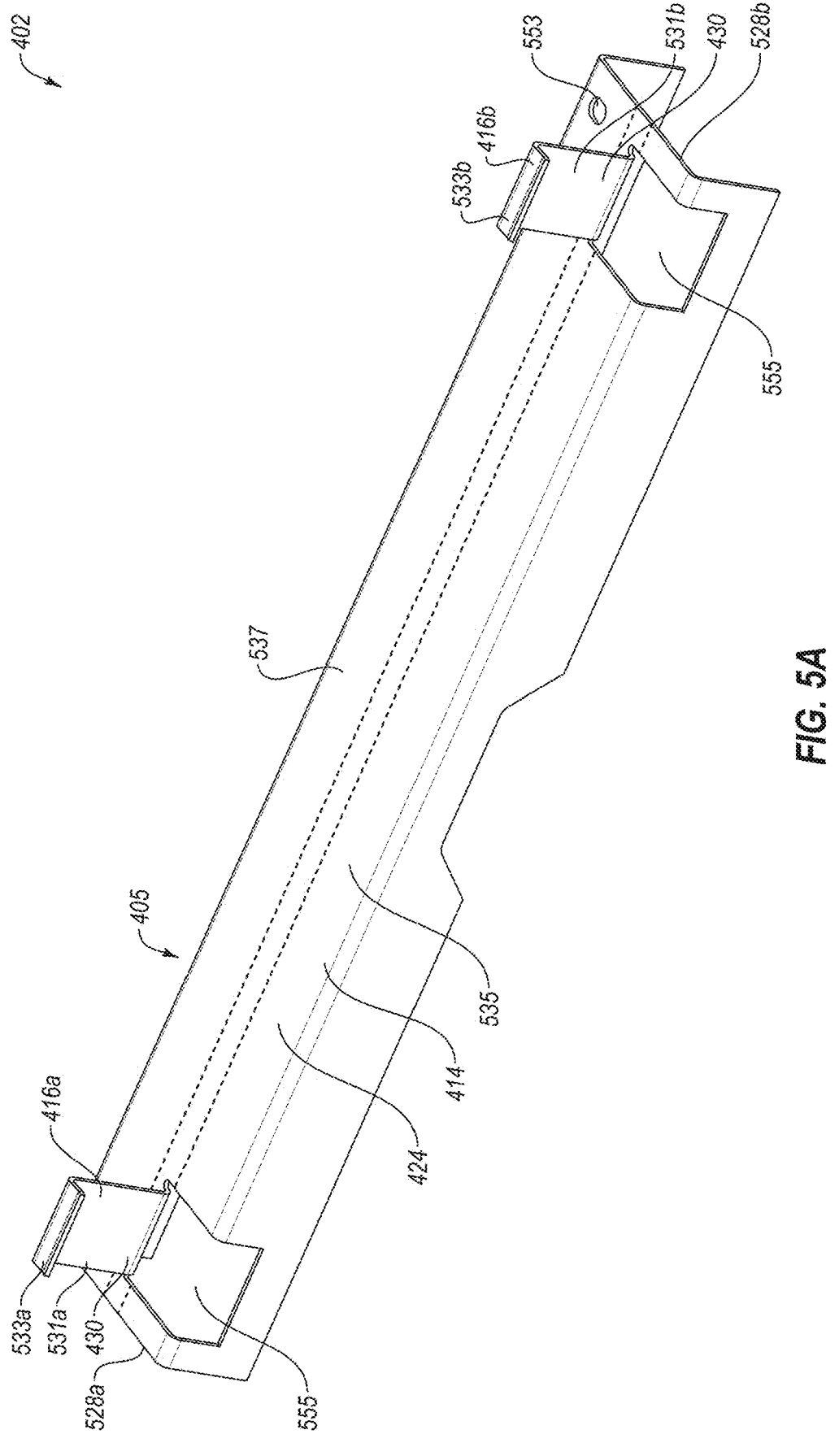
FIGS. 5A-5G illustrate a perspective view, a first side view, a second side view, a top view, a bottom view, a front view, and a back view of the example mounting rail of FIGS. 4A-4C.
Figure 5B:
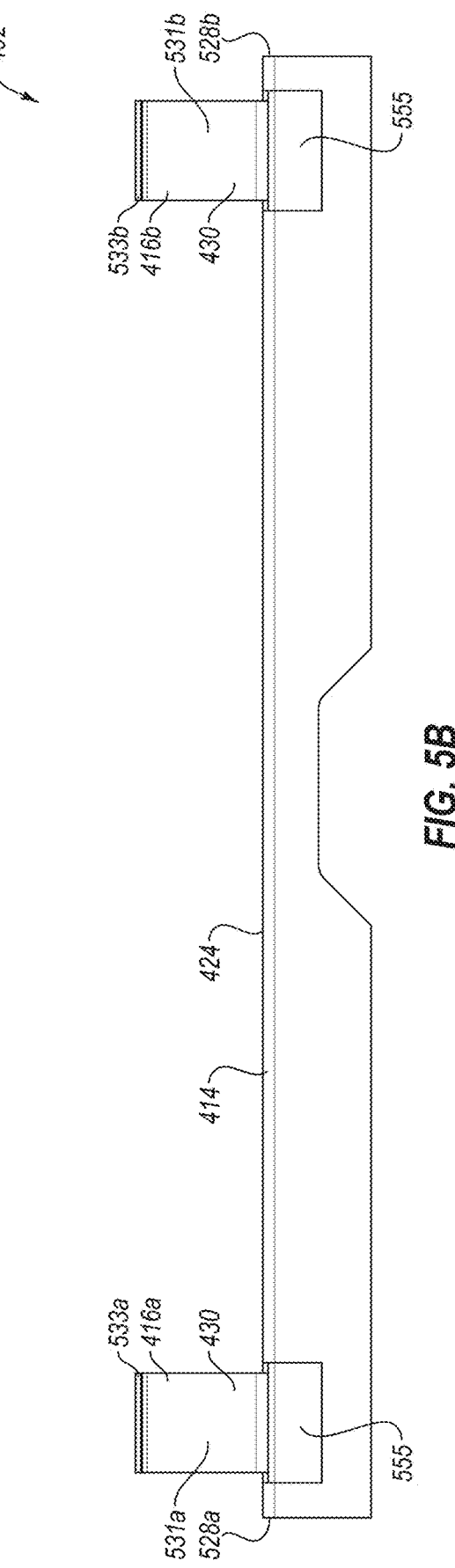
Figure 5C:
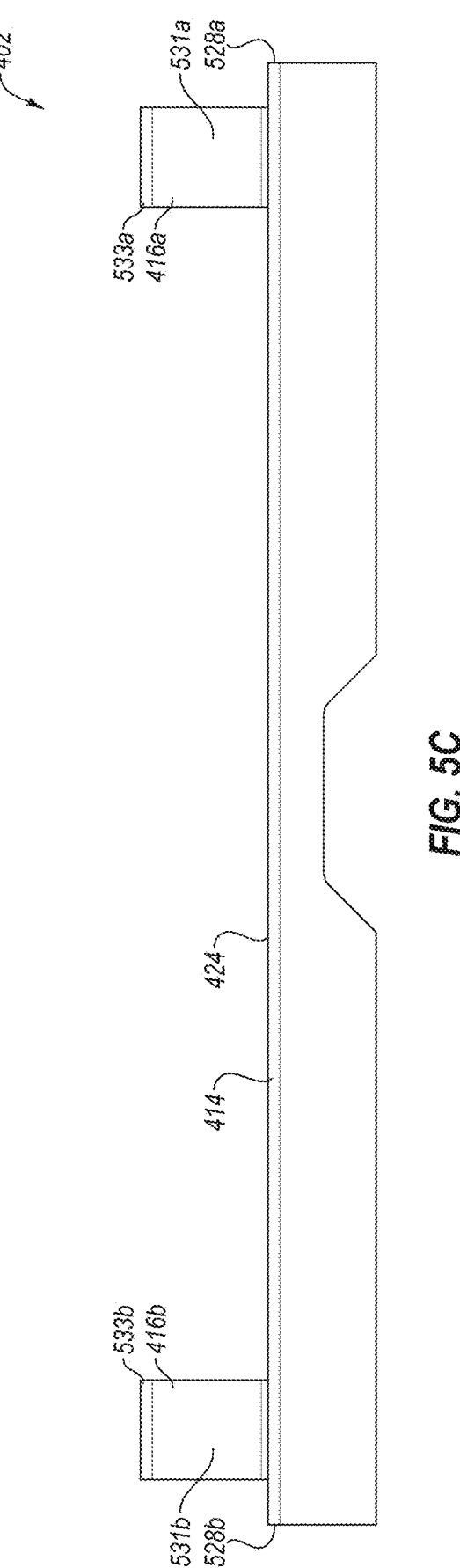
Figure 5D:
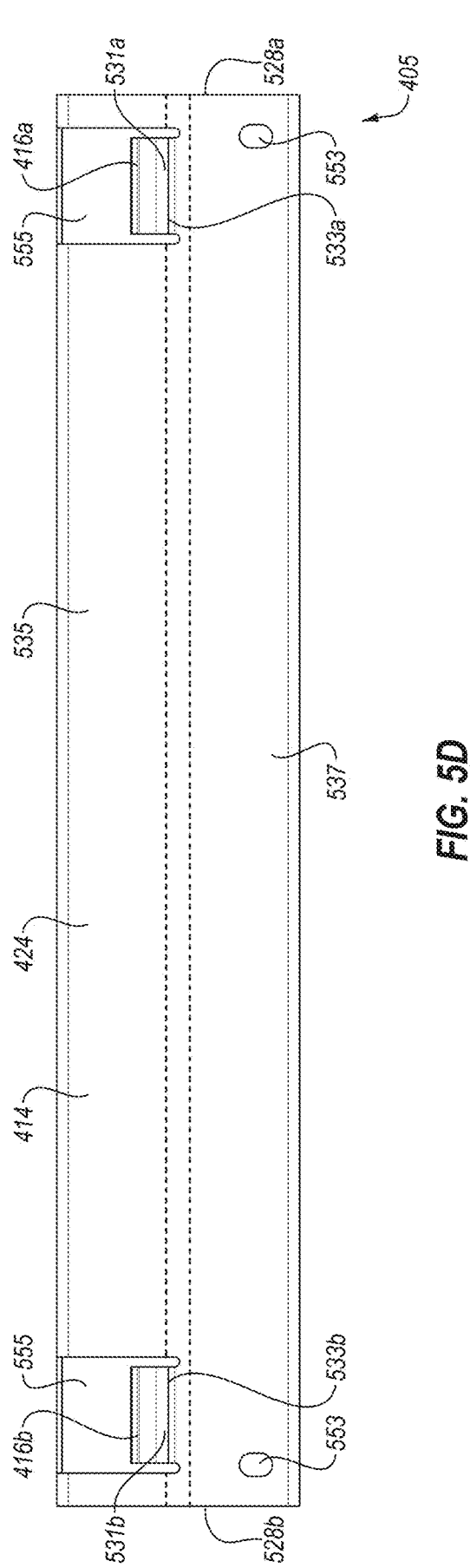
Figure 5E:
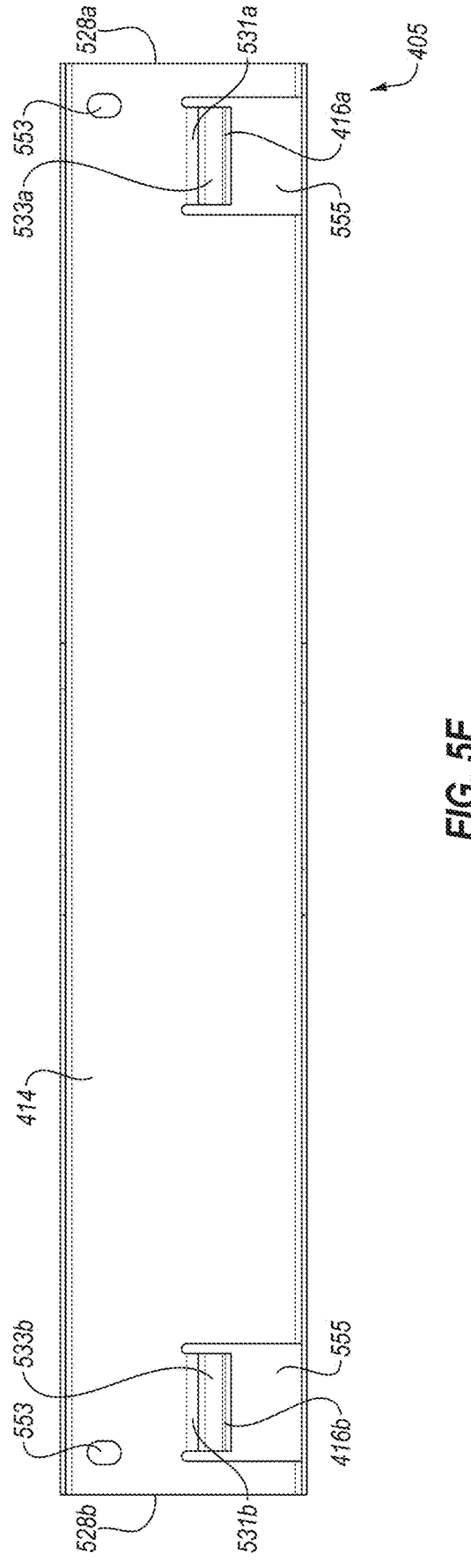
Figure 5F:
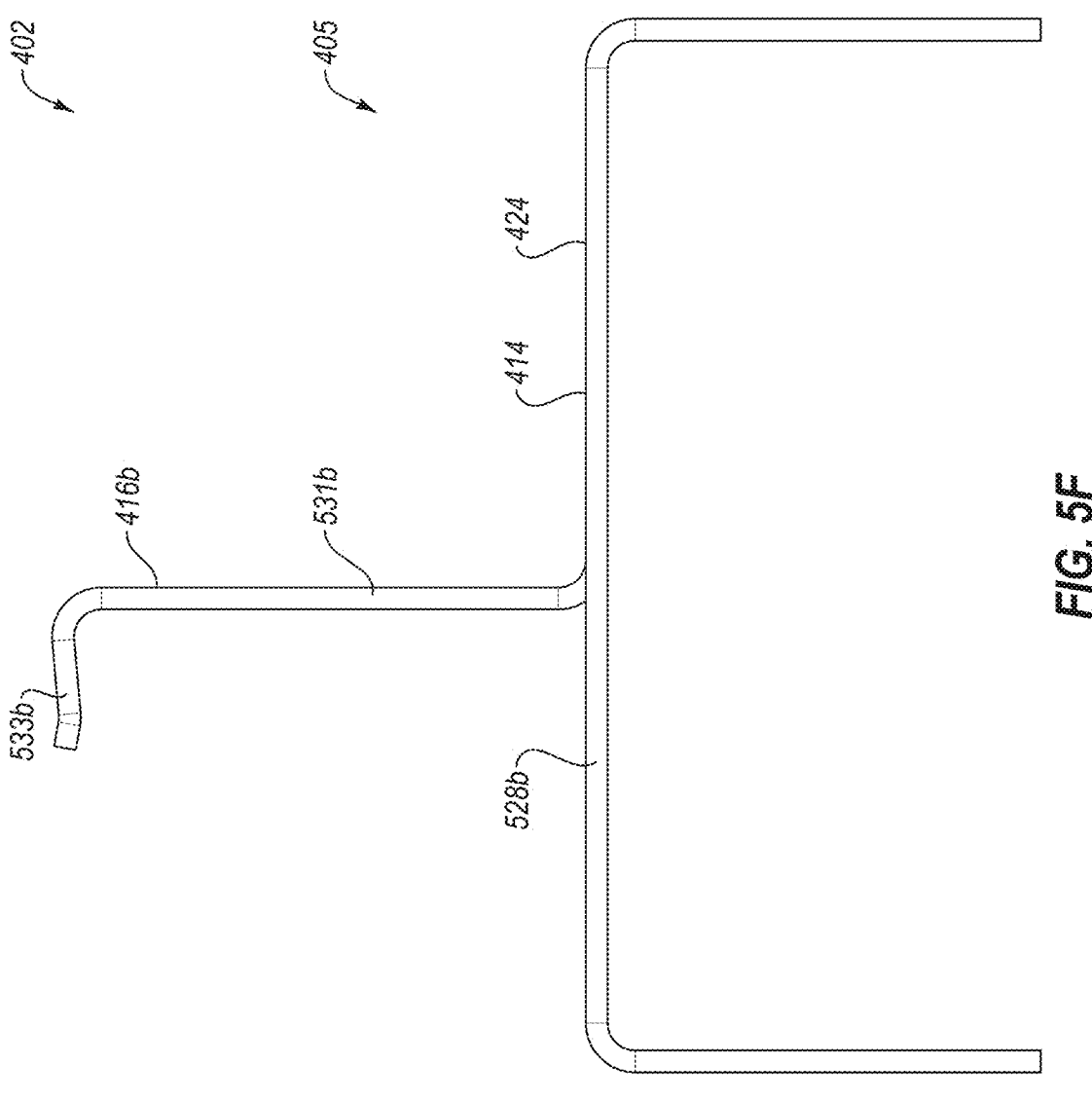
Figure 5G:
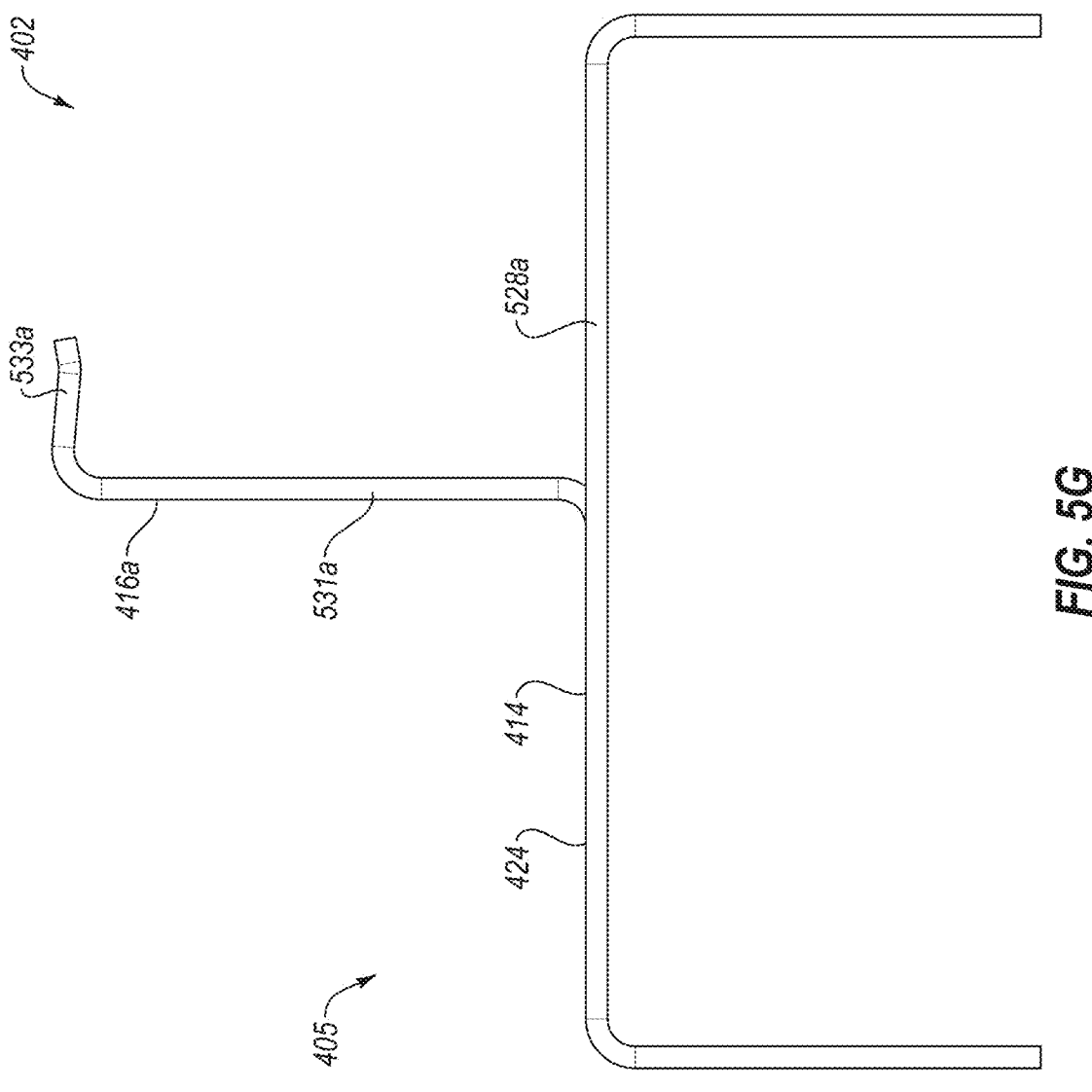

Referring to FIGS. 4A-4C, an example torque tube interface 400 including an example mounting rail 402 coupling the PV modules 108a-b to the torque tube 106 is shown. FIG. 4A illustrates a left perspective view of the mounting rail 402, the PV modules 108a-b, and the torque tube 106 with the PV panels 110 of the PV modules 108a-b omitted. FIG. 4B illustrates a right perspective view of the mounting rail 402, the PV modules 108a-b, and the torque tube 106 with the PV panels 110 of the PV modules 108a-b omitted. FIG. 4C illustrates a front view of the mounting rail 402, the PV modules 108a-b, and the torque tube 106 with sidewalls of the PV modules 108a-b omitted. Although the mounting rail 402 is illustrated and described as coupling the PV modules 108a-b to the torque tube 106, it is appreciated that the embodiments described in the present disclosure may be implemented to couple the PV modules 108a-b to any appropriate solar component.

In some embodiments, the mounting rail 402 may include an asymmetrical configuration to couple to the PV modules 108a-b in different ways. For example, as discussed in more detail below, the mounting rail 402 may couple to the module frame 112a of the PV module 108a via one or more hooked mechanisms 416a-b (generally referred to in the present disclosure as hooked mechanism 416). As another example, as discussed in more detail below, the mounting rail 402 may couple to the module frame 112*b* of the PV module 108*b* via an attachment feature 405.

The mounting rail 402 may include an upper portion 414. The upper portion 414 may engage with the bottom surface 122*a* of the module frame 112*a*. In addition, the hooked mechanism 416 may at least partially define one or more apertures 430 configured to receive a portion 445 of the module frame 112*a*. As shown, the portion 445 of the module frame 112*a* includes a sidewall 438, at least part of a panel portion 442, at least part of a base portion 446, or some combination thereof of the module frame 112*a*. The apertures 430 may receive the portion 445 of the module frame 112*a* to position at least part of the portion 445 of the module frame 112*a* between the hooked mechanism 416 and the upper portion 414.

The apertures 430 may receive the portion 445 of the module frame 112*a* to couple the module frame 112*a* to the mounting rail 402. In addition, the hooked mechanism 416 may physically engage with a top surface 441 of the panel portion 442 to couple the module frame 112*a* to the mounting rail 402. The apertures 430 may receive the portion 445 of the module frame 112*a* to prevent the bottom surface 122*a* from unintentionally disengaging from the upper portion 414. Further, the hooked mechanism 416 may engage with the top surface 441 of the panel portion 442 to maintain the engagement between the upper portion 414 and the bottom surface 122*a*. In other words, the hooked mechanism 416 and the upper portion 414 may sandwich part of the portion 445 of the module frame 112*a* between the hooked mechanism 416 and the upper portion 414 to prevent the module frame 112*a* from moving away from a surface 424 of the upper portion 414 (e.g., moving in an upward direction in FIG. 4C).

During installation, the PV module 108*a* may be positioned such that the bottom surface 122*a* physically engages with the upper portion 414. In addition, the PV module 108*a* may be positioned such that the portion 445 of the module frame 112*a* is proximate to the apertures 430. The PV module 108*a* may be moved such that the module frame 112*a* moves along a width of the mounting rail 402 (e.g., along a right direction in FIG. 4C) to cause the portion 445 of the module frame 112*a* to enter the apertures 430 and the hooked mechanism 416 to engage with the portion 445 of the module frame 112*a*. In particular, the hooked mechanism 416 may engage with the top surface 441 of the panel portion 442 to urge the module frame 112*a* towards the upper portion 414. In some embodiments, the hooked mechanism 416 may prevent the module frame 112*a* from moving too far along the width of the mounting rail 402 (e.g., moving too far right in FIG. 4C) to facilitate alignment of the PV module 108*a*. In this manner, the mounting rail 402 couples to the PV module 108*a* via the module frame 112*a* and the hooked mechanism 416 without the use of any fasteners or tools. (e.g. the toolless process). Sequences of movements to interface an example PV module with example mounting rails are described in more detail below in relation to FIG. 11.

As shown in FIGS. 4A-4C, the attachment feature 405 couples the PV module 108*b* to the mounting rail 402 using fasteners 471 (shown in FIGS. 4B and 4C) (e.g., the tooled process). As shown the fasteners 471 include bolts 477 and nuts 473. Additionally or alternatively, the fasteners 471 may include rivets, swage fasteners, or any other appropriate tooled attachment feature. In other words, the attachment feature 405 may couple the PV module 108*b* to the mounting rail 402 in a way that is different than how the hooked mechanism 416 couples the PV module 108*a* to the mounting rail 402.

With further reference to FIGS. 4A-4C and FIGS. 5A-5G, in some embodiments, the attachment feature 405 may include one or more openings 553 (shown in FIGS. 5A, 5D, and 5E) defined by the upper portion 414. The openings 553 may align with the openings 129 defined by the return flange 120*b* of the module frame 112*b*. The openings 553 of the attachment feature 405 and the openings 129 defined by the return flange 120*b* (examples of which are shown in FIG. 4A in relation to the return flange 120 of the module frame 112*a*) may receive the fasteners 471 to couple the PV module 108*b* to the mounting rail 402.

During installation, the PV module 108*b* may be positioned such that the bottom surface 122*b* of the module frame 112*b* physically engages with the upper portion 414. In addition, during installation, the PV module 108*b* may be positioned such that the openings 553 of the attachment feature 405 are aligned with the openings 129 defined by the return flange 120*b*. The openings 553 of the attachment feature 405 and the openings 129 defined by the return flange 120*b* may receive the fasteners 471. The fasteners 471 may draw the module frame 112*b* towards the upper portion 414 and couple the module frame 112*b* to the mounting rail 402. For example, the bolts 477 may interface with the nuts 473 to draw the module frame 112*b* towards the upper portion 414.

In this manner, the mounting rail 402 couples to the PV module 108*b* via the module frame 112*b* and the fasteners 471. The attachment feature 405 is illustrated and described as including the fasteners 471 and the openings 553 for example purposes. The attachment feature 405 may include any appropriate device to couple the PV module 108*b* to the mounting rail 402. For example, the attachment feature 405 may include bolts, nuts, threaded fasteners, thru-bolts, clips, top-down clamps, rivets, or some combination thereof.

The upper portion 414 includes the surface 424, that physically engages with the bottom surface 122*a* of the module frame 112*a* and the bottom surface 122*b* of the module frame 112*b*. In some embodiments, the surface 424 may include a first part 535 (shown in FIGS. 5A and 5D) and a second part 537 (shown in FIGS. 5A and 5D). The first part 535 may physically engage with the bottom surface 122*a* of the module frame 112*a*. The second part 537 may physically engage with the bottom surface 122*b* of the module frame 112*b*.

Each of the hooked mechanisms 416*a-b* may include a first component 531*a-b* (generally referred to in the present disclosure as the first component 531), a second component 533*a-b* (generally referred to in the present disclosure as the second component 533), or both. The first component 531 may extend from the surface 424 of the upper portion 414. The second component 533 may extend from the first component 531 and towards the upper portion 414 such that the second component 533 may include a radius of curvature. The first component 531, the second component 533, or both may define the apertures 430. The second component 533 may extend in a direction towards the upper portion 414 to apply a force on the top surface 441 of the panel portion 442 when engaged with the module frame 112*a*.

The apertures 430 may be defined to receive different sections of the module frame 112*a* to couple the module frame 112*a* to the mounting rail 402 as discussed above. The hooked mechanism 416, when engaged with the panel portion 442, may apply a force on the top surface 441 of the panel portion 442 to urge the module frame 112*a* towards the upper portion 414. For example, the portion 445 of the module frame 112a entering the apertures 430 may cause the hooked mechanism 416 to selectively deform or move to cause the hooked mechanism 416 to apply the force on the top surface 441 of the panel portion 442. In this way, the hooked mechanism 416 may prevent the bottom surface 122a from unintentionally disengaging from the upper portion 414.

In the example shown, the hooked mechanism 416 includes multiple hooked mechanisms 416a-b connected to the upper portion 414 and positioned at different locations on the upper portion 414. The hooked mechanisms 416a-b may be positioned at the different locations to interface with different sections of the portion 445 of the module frame 112a. In addition, in the example shown, the hooked mechanism 416 includes the hooked mechanism 416a positioned proximate a longitudinal end 528a of the upper portion 414 and the hooked mechanism 416b positioned proximate a longitudinal end 528b of the upper portion 414. Alternatively, one or more of the hooked mechanisms 416a or 416b may be positioned at the longitudinal ends 528a-b. For example, the hooked mechanism 416a may be at the longitudinal end 528a, the hooked mechanism 416b may be at the longitudinal end 528b, or both.

The hooked mechanism 416 is illustrated in FIGS. 4A-5G as including two hooked mechanisms 416a-b for example purposes. It is understood that the hooked mechanism 416 may include any appropriate number of hooked mechanisms. For example, the hooked mechanism 416 may include one, three, four, or more hooked mechanisms.

In some embodiments, the hooked mechanism 416 may align the PV module 108a relative to the upper portion 414. In addition, the hooked mechanism 416 may be sized to prevent the PV modules 108a-b from contacting each other. Further, the hooked mechanism 416 may physically engage with the portion 445 of the module frame 112a to prevent the module frame 112a from moving too far along the width of the mounting rail 402.

In some embodiments, the fasteners 471 may traverse the openings 553 to interface with the module frame 112b and/or the nuts 473 to couple the module frame 112b to the mounting rail 402. For example, the bolts 477 may traverse the openings 553 and the nuts 473 may thread onto ends of the bolts 477. Heads of the bolts 477 may be oversized compared to the openings 553 to prevent the bolts 477 from passing through the openings 553 and/or the openings 129 defined by the return flange 120b. In some embodiments, the openings 553 may include threaded portions configured to interface with threaded portions of the bolts 477.

In some embodiments, the mounting rail 402 may include one or more stopper devices (not shown in FIGS. 4A-5G). The stopper devices may be connected to and extend from the upper portion 414. In some embodiments, the stopper devices may be positioned proximate to and extend generally parallel to the hooked mechanism 416. The stopper devices may interface with the hooked mechanism 416 during installation of the PV module 108a to prevent the hooked mechanism 416 from selectively deforming beyond a pre-determined threshold. In some embodiments, the pre-determined threshold may be equal to or greater than eight degrees from an equilibrium position of the hooked mechanism 416. The hooked mechanism 416 is illustrated in FIGS. 4A-5G in the equilibrium position.

In some embodiments, the mounting rail 402 may include the retention member 118. In other embodiments, the retention member 118 may be omitted.

In some embodiments, the mounting rail 402 may include a single unitary piece of material in which the hooked mechanism 416 is punched or otherwise formed from. For example, the hooked mechanism 416 may be punched or otherwise formed from the unitary piece of material such that one or more openings 555 are formed. In other embodiments, the mounting rail 402 may include multiple pieces of material. The hooked mechanism 416 may be connected to the mounting rail 402 via a weld, a rivet, a threaded fastener, an adhesive, a clinch joint, or a snap-in feature. In these and other embodiments, the mounting rail 402 may include aluminum, steel, or any other appropriate material. In some embodiments, the mounting rail 402 may be formed using an extrusion process.

Figure 6A:
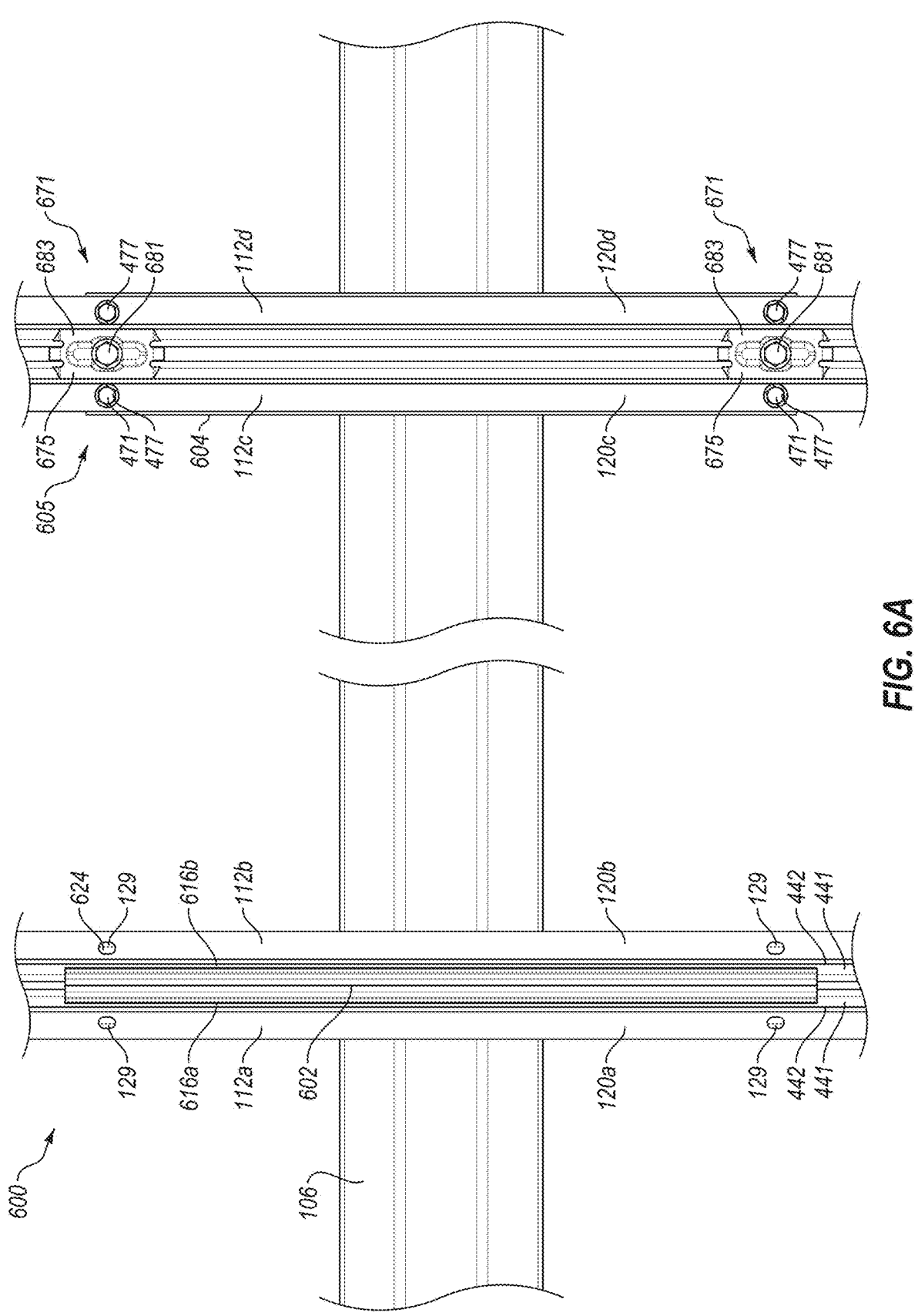
FIGS. 6A and 6B illustrate a top view and a front view of an example torque tube interface that includes an example hooked mounting rail and an example attachment mounting rail positioned in an asymmetrical arrangement to couple example PV modules to a torque tube.
Figure 6B:
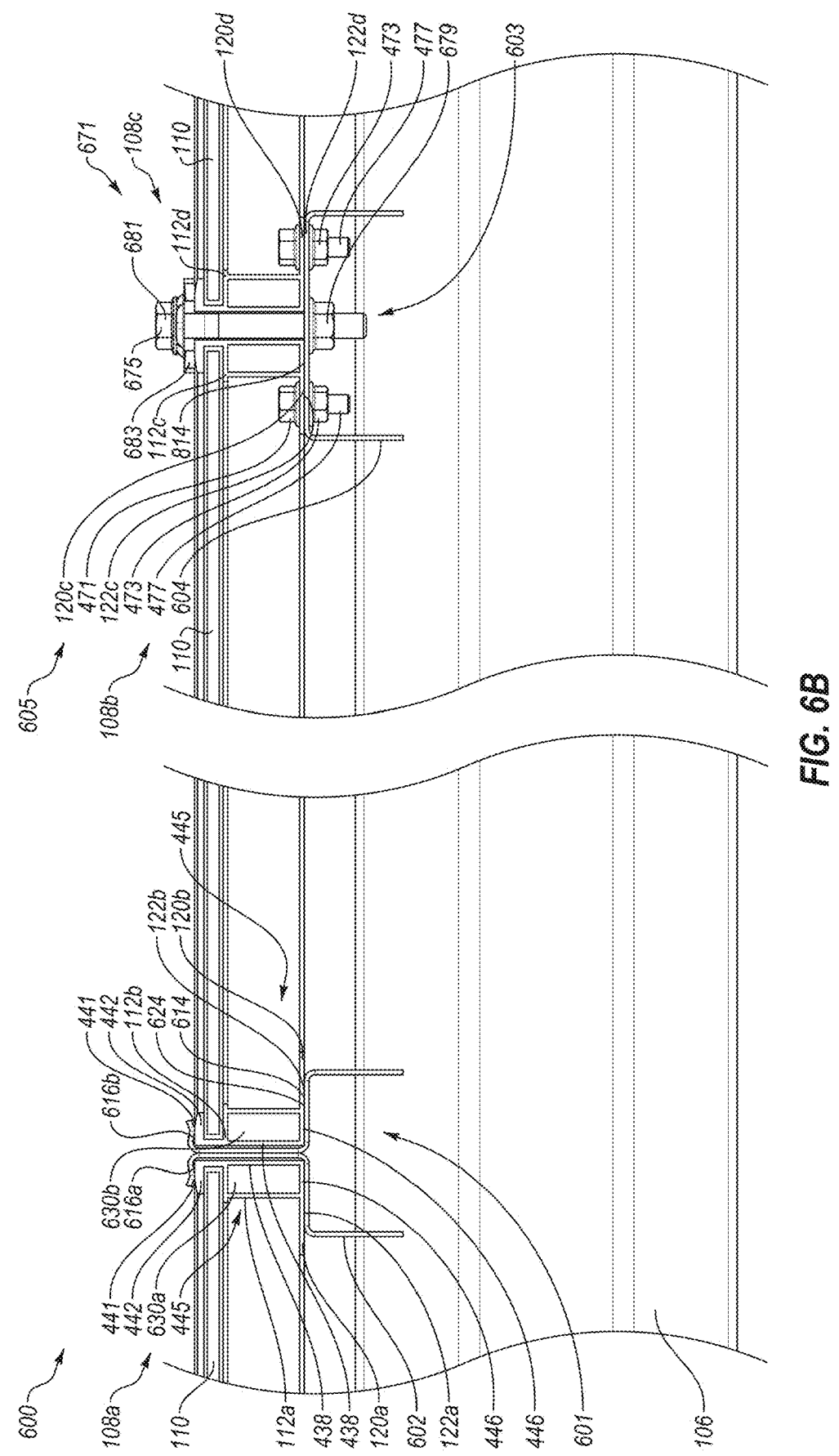
Figure 7A:
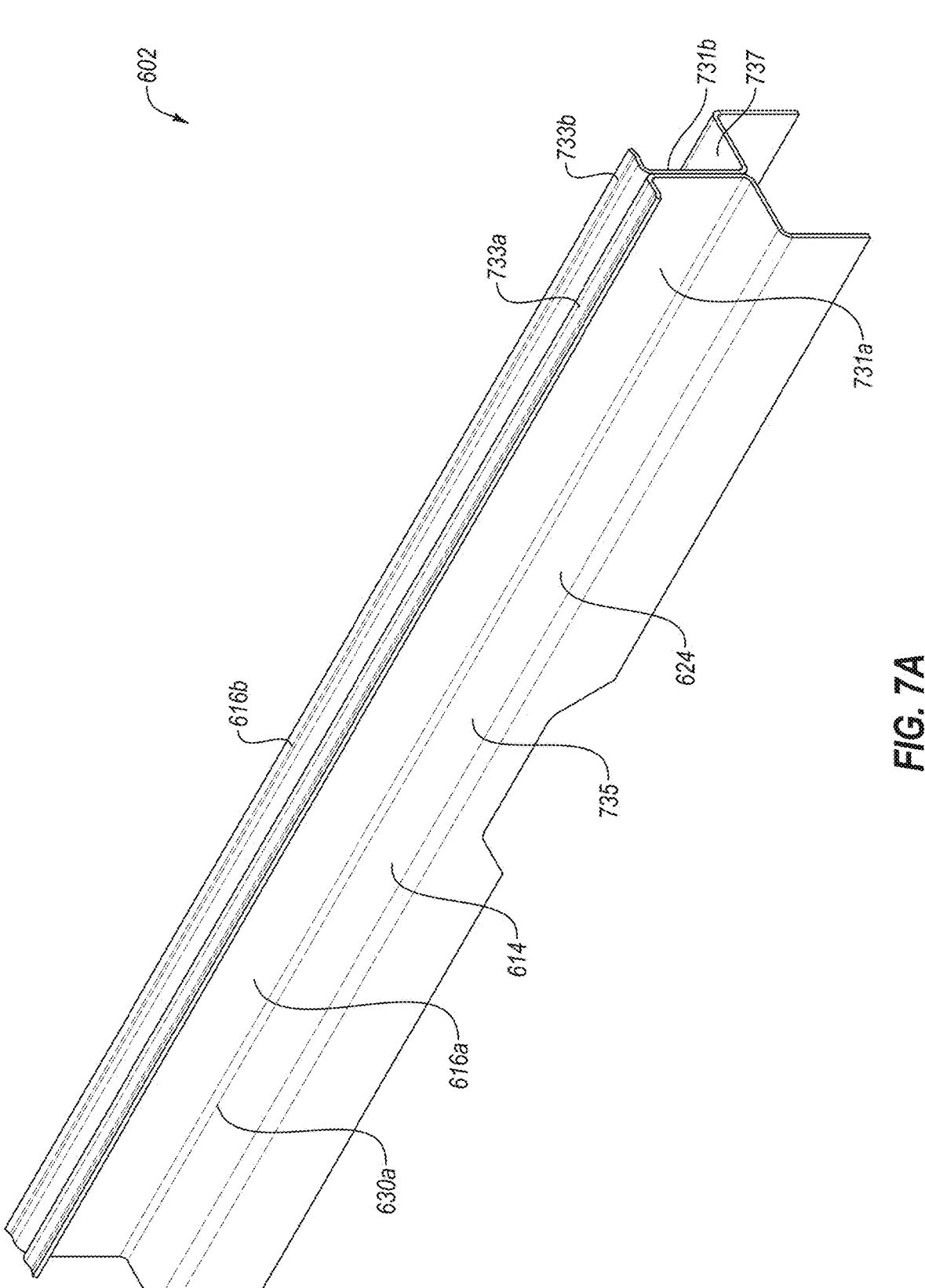
FIGS. 7A-7E illustrate a perspective view, a side view, a top view, a bottom view, and a front view of the example hooked mounting rail of FIGS. 6A and 6B.
Figure 7B:
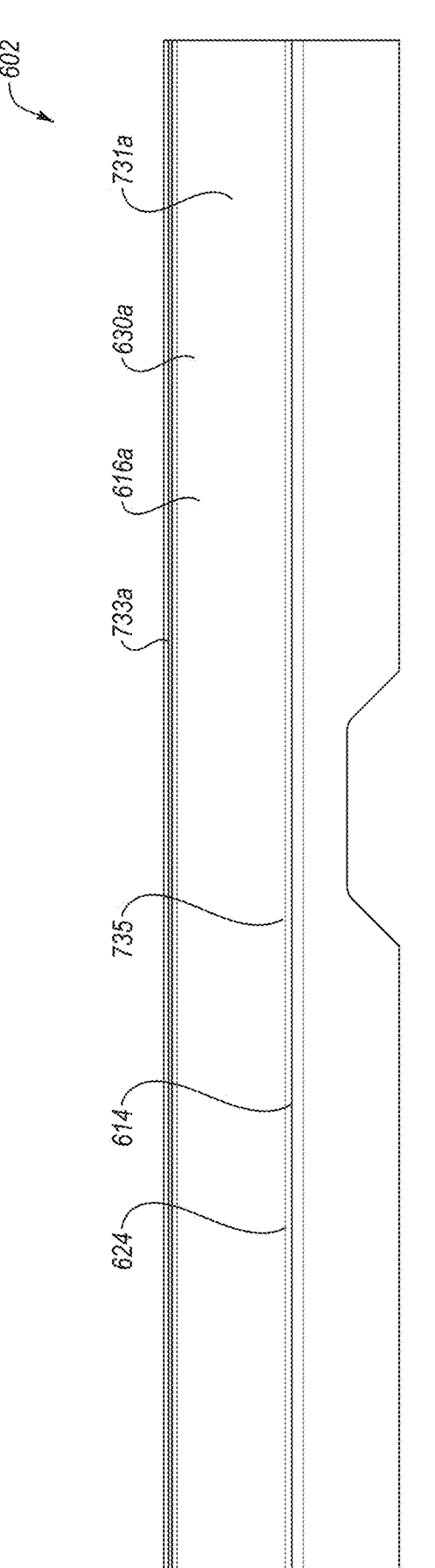
Figure 7C:
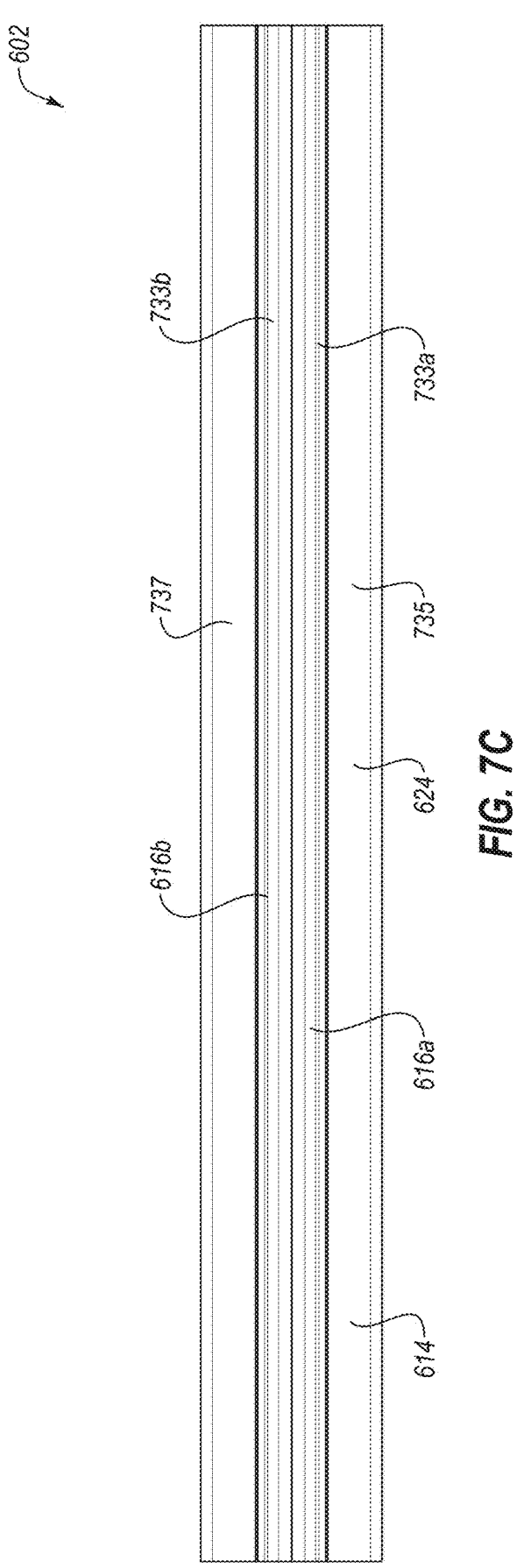
Figure 7D:
Figure 7D:
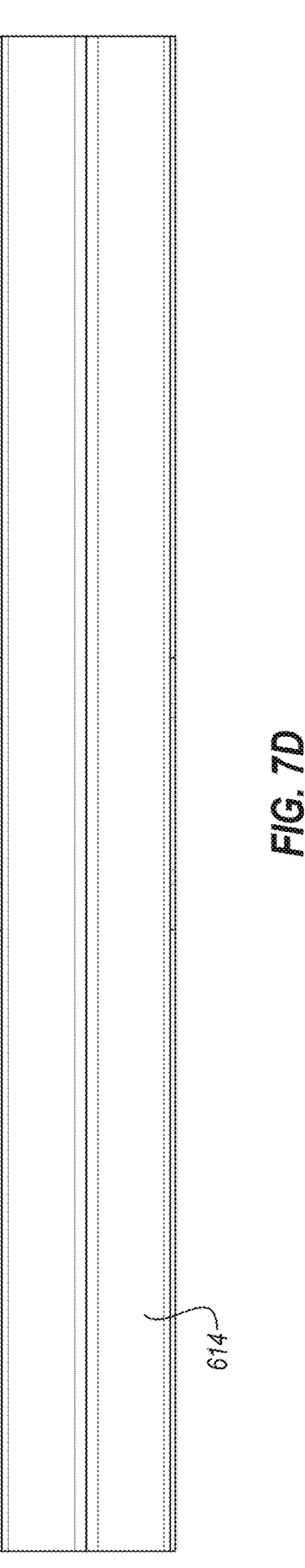
Figure 7E:
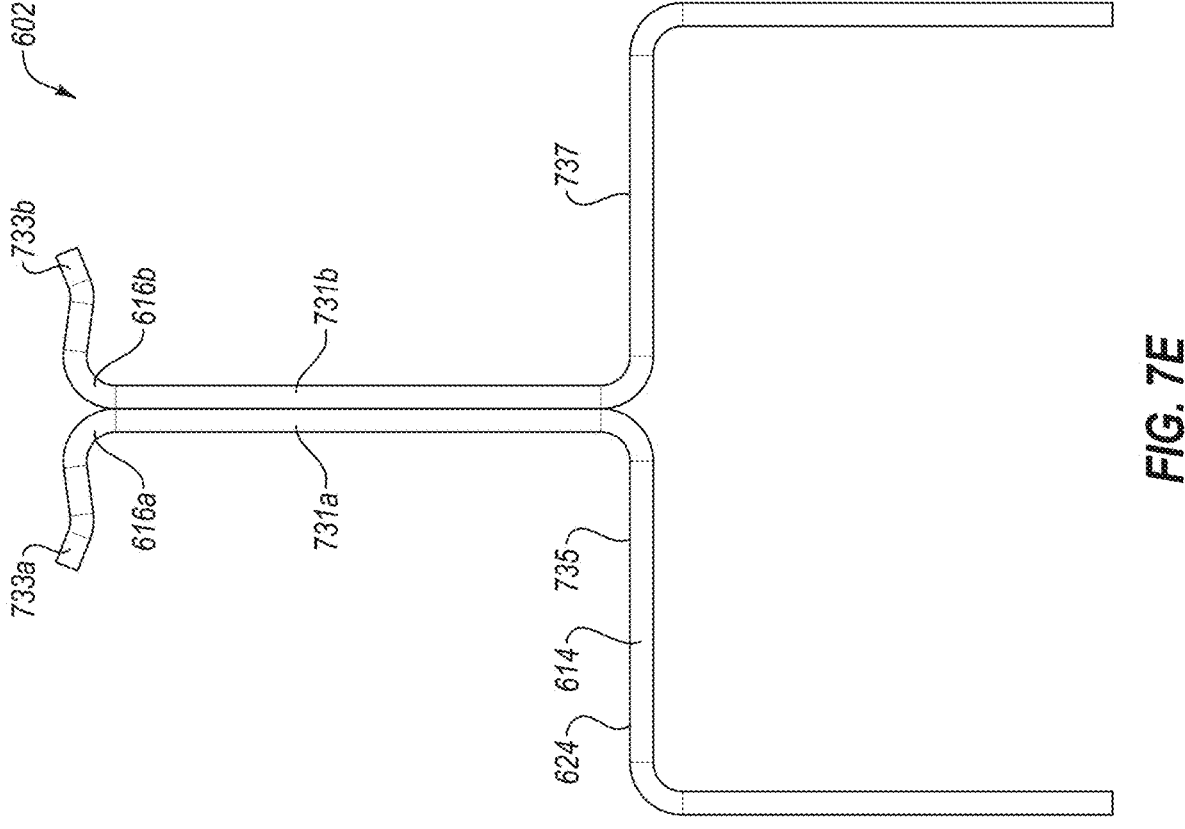

Referring to FIGS. 6A and 6B, an example torque tube interface 600 that includes an example hooked mounting rail 602 and an example attachment mounting rail 604 positioned in an asymmetrical arrangement to couple PV modules 108a-c to the torque tube 106 is shown. FIG. 6A illustrates a top view of the torque tube interface 600, the PV modules 108a-c, and the torque tube 106 with the PV panels 110 of the PV modules 108a-c omitted. FIG. 6B illustrates a front view of the torque tube interface 600, the PV modules 108a-c, and the torque tube 106 with sidewalls of the PV modules 108a-c omitted. Although the torque tube interface 600 is illustrated and described as coupling the PV modules 108a-c to the torque tube 106, it is appreciated that the embodiments described in the present disclosure may be implemented to couple the PV modules 108a-c to any appropriate solar component.

In some embodiments, the hooked mounting rail 602 and the attachment mounting rail 604 may couple to the PV modules 108a-c in different ways. For example, as discussed in more detail below, the hooked mounting rail 602 may couple to the PV modules 108a-b via hooked mechanisms 616a-b. As another example, as discussed in more detail below, the attachment mounting rail 604 may couple to the PV modules 108b-c via an attachment feature 605.

The torque tube interface 600 may include multiple instances of the hooked mounting rail 602 and multiple instances of the attachment mounting rail 604 that are alternatingly positioned on the torque tube 106 in the asymmetrical arrangement. As shown in FIGS. 6A and 6B, the hooked mounting rail 602 interfaces with the torque tube 106 at a first location 601 and the attachment mounting rail 604 interfaces with the torque tube 106 at a second location 603. In addition, an additional attachment mounting rail (not shown in FIGS. 6A and 6B) may interface with the torque tube 106 at a third location (not shown in FIGS. 6A and 6B) and an additional hooked mounting rail (not shown in FIGS. 6A and 6B) may interface with the torque tube 106 at a fourth location (not shown in FIGS. 6A and 6B). In some embodiments, the third location may be located on an opposite side of the first location 601 (e.g., the hooked mounting rail 602) as the second location 603 (e.g., the attachment mounting rail 604). In these and other embodiments, the fourth location may be located on an opposite side of the second location 603 as the first location 601.

A distance between the locations that the hooked mounting rail 602 and the attachment mounting rail 604 interface with the torque tube 106 may correspond to a width of the PV modules 108a-c. In other words, a distance between the hooked mounting rail 602 and the attachment mounting rail 604 may be based on the width of the PV modules 108a-c. For example, the distance between the first location 601 and the second location 603 may be based on the width of the PV module 108b. As another example, the distance between the first location 601 and the third location may be based on the width of the PV module 108*a* and the distance between the second location 603 and the fourth location may be based on the width of the PV module 108*c*.

As shown in FIGS. 6A and 6B, the hooked mounting rail 602 is coupled to a left side of the PV module 108*b* and the attachment mounting rail 604 is coupled to a right side of the PV module 108*b*. In addition, the hooked mounting rail 602 is attached to a right side of the PV module 108*a* and the additional attachment mounting rail is coupled to a left side (not shown in FIGS. 6A and 6B) of the PV module 108*a*. Further, the attachment mounting rail 604 is attached to a left side of the PV module 108*c* and the additional hooked mounting rail is coupled to a right side (not shown in FIGS. 6A and 6B) of the PV module 108*c*.

With combined reference to FIGS. 6A-7E, the hooked mounting rail 602 includes hooked mechanisms 616*a*-*b* and an upper portion 614. The upper portion 614 may engage with the bottom surfaces 122*a*-*b* of the module frames 112*a*-*b*. In addition, the hooked mechanisms 616*a*-*b* may overlap portions of a surface 624 of the upper portion 614 to at least partially define apertures 630*a*-*b*. The apertures 630*a*-*b* may be defined to receive the portions 445 of the corresponding module frames 112*a*-*b*. The apertures 630*a*-*b* may receive the portions 445 of the corresponding module frames 112*a*-*b* to position at least part of the portions 445 between the corresponding hooked mechanisms 616*a*-*b* and the upper portion 614.

The apertures 630*a*-*b* may receive the portions 445 of the module frames 112*a*-*b* to couple the corresponding module frames 112*a*-*b* to the hooked mounting rail 602. In addition, the hooked mechanisms 616*a*-*b* may physically engage with the top surfaces 441 of the panel portions 442 to couple the corresponding module frames 112*a*-*b* to the hooked mounting rail 602. The apertures 630*a*-*b* may receive the portions 445 of the module frames 112*a*-*b* to prevent the corresponding bottom surfaces 122*a*-*b* from unintentionally disengaging from the upper portion 614. Further, the hooked mechanisms 616*a*-*b* may engage with the top surfaces 441 of the panel portions 442 to maintain the engagement between the upper portion 614 and the corresponding bottom surfaces 122*a*-*b*. In other words, the hooked mechanisms 616*a*-*b* and the upper portion 614 may sandwich part of the module frames 112*a*-*b* between the hooked mechanisms 616*a*-*b* and the upper portion 614 to prevent the corresponding module frames 112*a*-*b* from moving away from the surface 624 of the upper portion 614 (e.g., moving in an upward direction in FIG. 6B).

During installation of the PV module 108*a*, the PV module 108*a* may be positioned such that the bottom surface 122*a* physically engages with the upper portion 614. In addition, the PV module 108*a* may be positioned such that the portion 445 of the module frame 112*a* is proximate to the aperture 630*a*. The PV module 108*a* may be moved such that the module frame 112*a* moves along a width of the hooked mounting rail 602 (e.g., along a right direction in FIG. 6B) to cause the portion 445 of the module frame 112*a* to enter the aperture 630*a* and the hooked mechanism 616*a* to engage with the portion 445 of the module frame 112*a*. In particular, the hooked mechanism 616*a* may engage with the top surface 441 of the panel portion 442 to urge the module frame 112*a* towards the upper portion 614. In addition, the portion 445 may be sandwiched between the hooked mechanism 616*a* and the upper portion 614. In some embodiments, the hooked mechanism 616*a* may prevent the module frame 112*a* from moving too far along the width of the hooked mounting rail 602 (e.g., moving too far right in FIG. 6B) to facilitate alignment of the PV module 108*a*. The process to couple the PV module 108*a* to the additional attachment mounting rail is discussed in more detail below.

During installation of the PV module 108*b*, the PV module 108*b* may be positioned such that the bottom surface 122*b* physically engages with the upper portion 614. In addition, the PV module 108*b* may be positioned such that the portion 445 of the module frame 112*b* is proximate to the aperture 630*b*. The PV module 108*b* may be moved such that the module frame 112*b* moves along the width of the hooked mounting rail 602 (e.g., along a left direction in FIG. 6B) to cause the portion 445 of the module frame 112*b* to enter the aperture 630*b* and the hooked mechanism 616*b* to engage with the portion 445 of the module frame 112*b*. In particular, the hooked mechanism 616*b* may engage with the top surface 441 of the panel portion 442 to urge the module frame 112*b* towards the upper portion 614. In some embodiments, the hooked mechanism 616*b* may prevent the module frame 112*b* from moving too far along the width of the hooked mounting rail 602 (e.g., moving too far left in FIG. 6B) to facilitate alignment of the PV module 108*b*. The process to couple the PV module 108*b* to the attachment mounting rail 604 is discussed in more detail below.

In this manner, the hooked mounting rail 602 couples to the PV modules 108*a*-*b* via the module frames 112*a*-*b* and the hooked mechanisms 616*a*-*b* without the use of any fasteners or tools (e.g. the toolless process). Sequences of movements to interface an example PV module with example mounting rails are described in more detail below in relation to FIG. 11.

During installation of the PV module 108*c*, a similar process may be followed to couple the PV module 108*c* to the additional hooked mounting rail as followed to couple the PV module 108*a* to the hooked mounting rail 602 except with relation to the PV module 108*c* and the additional hooked mounting rail.

The upper portion 614 includes the surface 624, that physically engages with the bottom surfaces 122*a*-*b* of the module frames 112*a*-*b*. In some embodiments, the surface 624 may include a first part 735 (shown in FIGS. 7A and 7C) and a second part 737 (shown in FIGS. 7A and 7C). The first part 735 may physically engage with the bottom surface 122*a* of the module frame 112*a*. The second part 737 may physically engage with the bottom surface 122*b* of the module frame 112*b*.

Each of the hooked mechanisms 616*a*-*b* may include a first component 731*a*-*b* (generally referred to in the present disclosure as the first component 731), a second component 733*a*-*b* (generally referred to in the present disclosure as the second component 733), or both. The first component 731 may extend from the surface 624 of the upper portion 614. The second component 733 may extend from the first component 731 and towards the upper portion 614 such that the second component 733 includes a radius of curvature. The first component 731, the second component 733, or both may at least partially define the apertures 630*a*-*b*. The second component 733 may extend in a direction towards the upper portion 614 to apply a force on the top surface 441 of the corresponding panel portion 442 when engaged with the module frames 112*a*-*b*.

The hooked mechanisms 616*a*-*b*, when engaged with the panel portions 442, may apply force on the top surface 441 to urge the corresponding module frames 112*a*-*b* towards the upper portion 614. For example, the portion 445 of the module frame 112*a* entering the aperture 630*a* may cause the hooked mechanism 616*a* to selectively deform or move to cause the hooked mechanism 616*a* to apply the force on the top surface 441 of the panel portion 442. As another example, the portion 445 of the module frame 112*b* entering the aperture 630*b* may cause the hooked mechanism 616*b* to selectively deform or move to cause the hooked mechanism 616*b* to apply the force on the top surface 441 of the panel portion 442. In this way, the hooked mechanisms 616*a-b* may prevent the bottom surfaces 122*a-b* from unintentionally disengaging from the upper portion 614.

The hooked mechanisms 616*a-b* are illustrated in FIGS. 6A-7E as extending along an entire length of the hooked mounting rail 602 for example purposes. It is understood that the hooked mechanisms 616*a-b* may be separated into any appropriate number of separate portions. For example, the hooked mechanisms 616*a-b* may be separated into two, three, four, or more separate portions.

In some embodiments, the hooked mechanisms 616*a-b* may align the PV modules 108*a-b* relative to the upper portion 614. In addition, the hooked mechanisms 616*a-b* may be sized to prevent the PV modules 108*a-b* from contacting each other. Further, the hooked mechanism 616*a-b* may physically engage with the portions 445 of the corresponding module frames 112*a-b* to prevent the module frames 112*a-b* from moving too far along the width of the hooked mounting rail 602.

In some embodiments, the mounting rail 402 may include the retention member 118. In other embodiments, the retention member 118 may be omitted.

In some embodiments, the hooked mounting rail 602 may include a single unitary piece of material in which the hooked mechanisms 616*a-b* are punched or otherwise formed from. In other embodiments, the hooked mounting rail 602 may include multiple pieces of material. The hooked mechanism 616*a-b* may be connected to the hooked mounting rail 602 via a weld, a rivet, a threaded fastener, an adhesive, a clinch joint, or a snap-in feature. In these and other embodiments, the hooked mounting rail 602 may include aluminum, steel, or any other appropriate material. In some embodiments, the hooked mounting rail 602 may be formed using an extrusion process.

Figure 8:
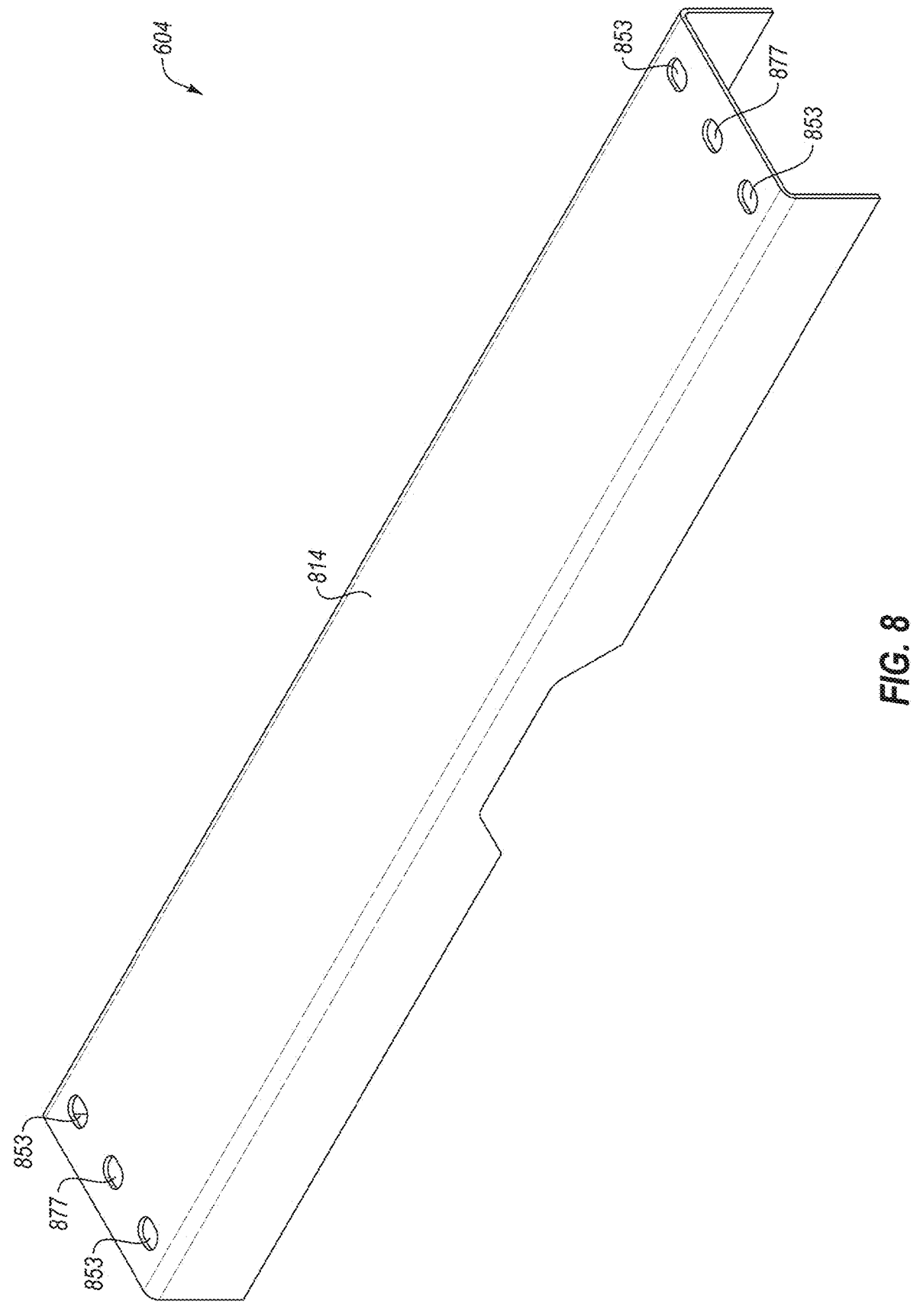
FIG. 8 illustrates a perspective view of the example attachment mounting rail of FIGS. 6A and 6B.

With combined reference to FIGS. 6A and 6B and FIG. 8, the attachment feature 605 may couple the PV modules 108*b-c* to the attachment mounting rail 604 using fasteners 671 (shown in FIGS. 6A and 6B) (e.g., a tooled process). In some embodiments, the attachment feature 605 may couple the PV modules 108*b-c* to the attachment mounting rail 604 in a way that is different than how the hooked mechanisms 616*a-b* couple the PV module 108*a-b* to the hooked mounting rail 602.

In some embodiments, the attachment feature 605 may include one or more openings 853 and/or 877 defined by an upper portion 814 (shown in FIG. 8) of the attachment mounting rail 604. Additionally or alternatively, the fasteners 671 may include the bolts 477, the nuts 473, clamps 675, or some combination thereof. The openings 853 may align with the openings 129 defined by the return flanges 120*c-d* of the module frames 112*c-d*. Additionally or alternatively, the openings 877 may be positioned between the PV modules 108*c-d* when they are engaged with the attachment mounting rail 604.

The openings 853 of the attachment feature 605 and the openings 129 defined by the return flanges 120*c-d* (examples of which are shown in FIG. 6A in relation to the return flanges 120*a-b* of the module frames 112*a-b*) may receive the fasteners 671 to couple the PV modules 108*c-d* to the attachment mounting rail 604. Additionally or alternatively, the openings 877 may receive the fasteners 671 to couple the PV modules 108*c-d* to the attachment mounting rail 604.

During installation of the PV modules 108*c-d*, the PV modules 108*c-d* may be positioned such that the bottom surfaces 122*c-d* of the module frames 112*c-d* physically engage with the upper portion 814. In addition, during installation, the PV modules 108*c-d* may be positioned such that the openings 853 of the attachment feature 605 are aligned with the openings 129 defined by the return flanges 120*c-d*. Further, during installation, the PV modules 108*c-d* may be positioned such that the openings 877 are between the PV module 108*c-d*. The openings 853 and/or 877 of the attachment feature 605 and the openings 129 defined by the return flanges 120*c-d* may receive the fasteners 671. The fasteners 671 may draw the module frames 112*c-d* towards the upper portion 814 and couple the module frames 112*c-d* to the attachment mounting rail 604. For example, as shown, the fasteners 671 include the bolts 477 and the nuts 473, which interface with each other to draw the module frames 112*a-b* towards the upper portion 814. As another example, as shown, the clamps 675 include top-down clamps configured to draw the module frames 112*a-b* towards the upper portion 814 and couple the PV modules 108*c-d* to the attachment mounting rail 604. The clamps 675 as shown include bolts 681 that are received by the openings 877 and that interface with washer portions 683 and nuts 679 (single instance of the nuts is shown in FIG. 6B). The bolts 681 may interface with the washer portions 683 and the nuts 679 to draw the washer portions 683 towards the PV modules 108*c-d* and subsequently the module frames 112*c-d* towards the upper portion 814. In some embodiments, the openings 853 and/or 877 may include threaded portions configured to interface with threaded portions of the bolts 477 or the bolts 681.

In this manner, the attachment mounting rail 604 couples to the PV modules 108*c-d* via the module frames 112*c-d* and the fasteners 671. The attachment feature 605 is illustrated and described as including the openings 853, the openings 877, and the fasteners 671 for example purposes. It is understood that one or more parts of the attachment feature 605 may be omitted. For example, the openings 877 and the clamps 675 may be omitted. As another example, the openings 853, the bolts 477, and the nuts 473 may be omitted. It is also understood that the attachment feature 605 may include any appropriate device to couple the PV modules 108*c-d* to the attachment mounting rail 604. For example, the attachment feature 605 may include bolts, nuts, threaded fasteners, thru-bolts, clips, top-down clamps, rivets, or some combination thereof.

During installation of the PV module 108*a*, a similar process may be followed to couple the PV module 108*a* to the additional attachment mounting rail as followed to couple the PV module 108*b* to the attachment mounting rail 604 except with relation to the PV module 108*a* and the additional attachment mounting rail.

In some embodiments, the hooked mounting rail 602 may include multiple instances of the hooked mechanism 116 discussed above in relation to FIGS. 1A-2G instead of the hooked mechanisms 616*a-b*.

Figure 9:
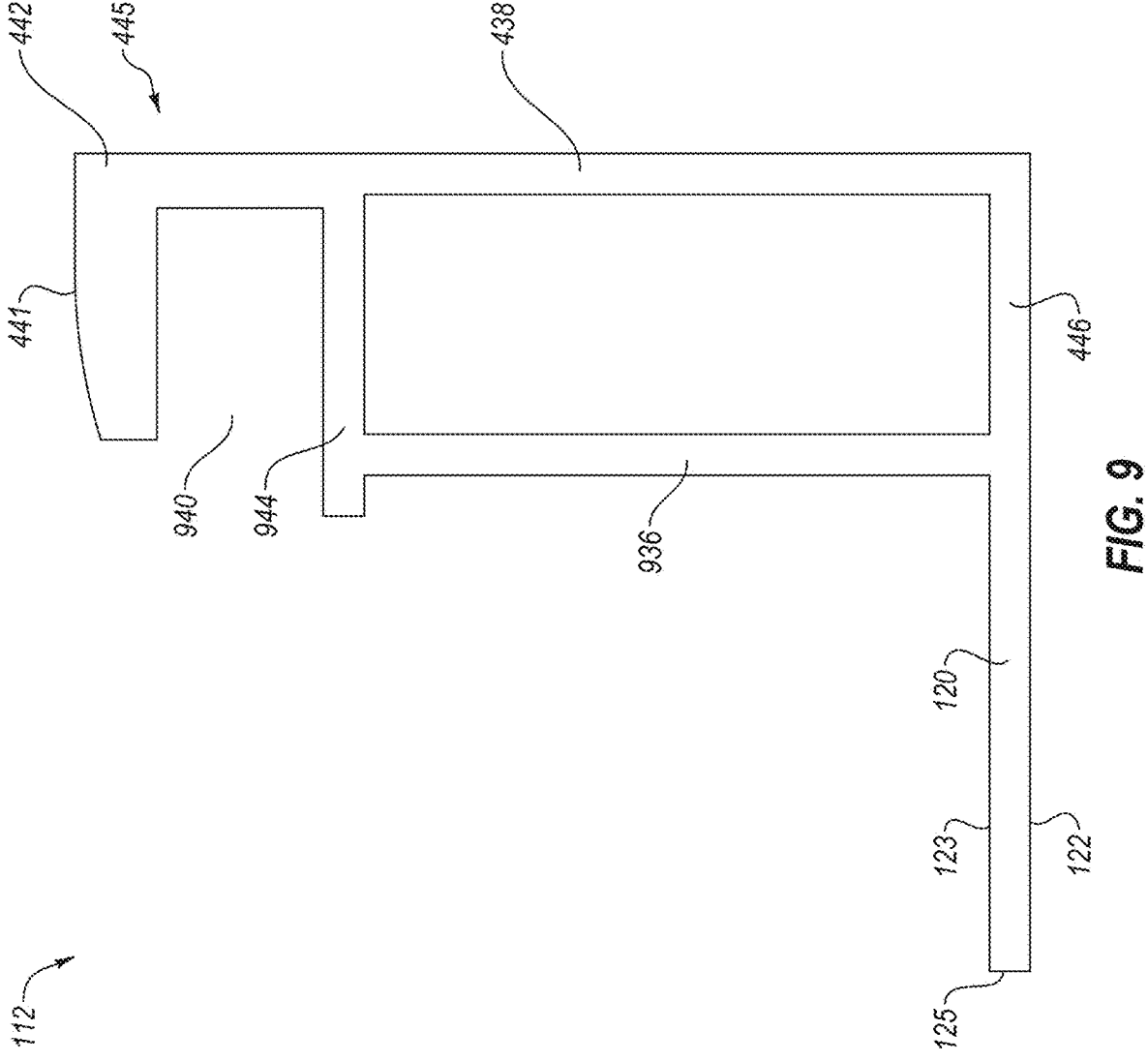
FIG. 9 illustrates one example of a module frame.

FIG. 9 illustrates an example module frame 112. The module frame 112 may correspond to the module frames 112*a-b* of FIGS. 1A-1C, 3, 4A-4C, and 6A-6C. The module frame 112 may include a sidewall 936 that is connected to the return flange 120. The return flange 120 may extend from the sidewall 936 and include the top surface 123 and the bottom surface 122. In addition, the module frame 112 may include the sidewall 438 that is connected to the panel portion 442, an upper portion 944, and a base portion 446. The upper portion 944 and the base portion 446 may be connected to the sidewall 936 to connect the sidewall 438 to the sidewall 936. In addition, the sidewall 438, the panel portion 442, and the upper portion 944 may define a panel opening 940 configured to receive the PV panels 110.

Figure 10:
FIG. 10 illustrates a front view of another torque tube interface including example mounting rails to couple an example PV module to a torque tube.
Figure 10:
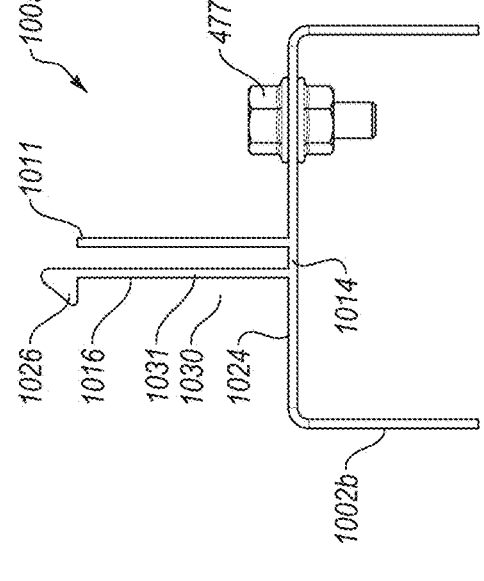
Figure 10:
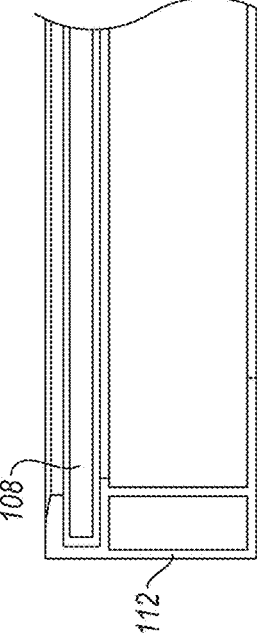
Figure 10:
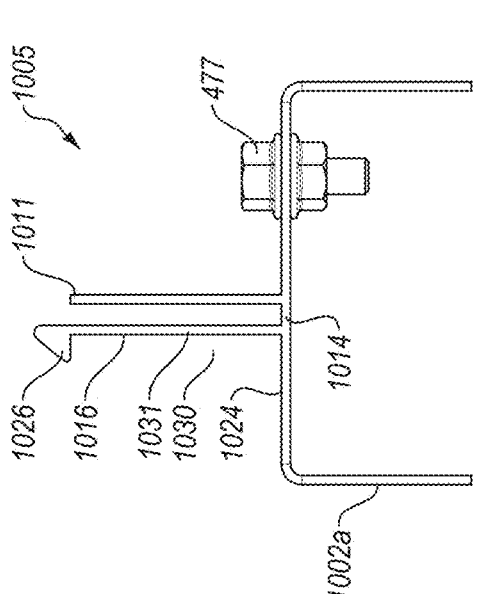

Referring to FIG. 10, an example torque tube interface 1000 including example mounting rails 1002a-b to couple an example PV module 108 is shown. The torque tube interface 1000 may include the mounting rails 1002a-b (generally referred to in the present disclosure as mounting rail 1002) that couple to different sides of the PV module 108. The torque tube interface 1000 may be implemented to couple the PV module 108 to any appropriate solar component such as the torque tube 106 (not shown in FIG. 10).

In some embodiments, the mounting rail 1002 may include an asymmetrical configuration to couple to different PV modules 108 in different ways. For example, as discussed in more detail below, the mounting rail 1002a may couple to the PV module 108 via an attachment feature 1005 and the mounting rail 1002b may couple to the PV module 108 via a hooked mechanism 1016.

The mounting rail 1002 may include an upper portion 1014. The upper portion 1014 may engage with the PV module 108. For example, the upper portion 1014 may interface with the bottom surface 122 of the module frame 112 as described elsewhere. In addition, the hooked mechanism 1016 may at least partially define one or more apertures 1030 configured to receive a portion of the PV module 108. For example, the portion 445 of the module frame 112a described elsewhere. The aperture 1030 may receive the PV module 108 to position at least part PV module 108 between the hooked mechanism 1016 and the upper portion 1014.

The aperture 1030 may receive the PV module 108 to couple the PV module 108 to the mounting rail 1002. In addition, the hooked mechanism 1016 may physically engage with the PV module 108 to couple the PV module 108 to the mounting rail 1002. For example, the hooked mechanism 1016 may physically engage with the top surface 441 of the panel portion 442 as described elsewhere. The aperture 1030 may receive the PV module 108 to prevent the PV module 108 from unintentionally disengaging from the upper portion 1014. Further, the hooked mechanism 1016 may engage with the PV module 108 to maintain the engagement between the upper portion 1014 and the PV module 108. In other words, the hooked mechanism 1016 and the upper portion 1014 may sandwich part of the PV module 108 between the hooked mechanism 1016 and the upper portion 1014 to prevent the PV module 108 from moving away from a surface 1024 of the upper portion 1014 (e.g., moving in an upward direction in FIG. 10).

The hooked mechanism 1016 may selectively deform to permit the part of the PV module 108 to enter the aperture 1030. The hooked mechanism 1016 may include a first component 1031 connected to the upper portion 1014 and a second component 1026. The second component 1026 may interface with the PV module 108 during installation to cause the hooked mechanism 1016 to selectively deform.

During installation, the PV module 108 may be positioned proximate to the second component 1026. The PV module 108 may be moved toward the second component 1026 (e.g., a downward direction in FIG. 10) to cause the PV module 108 to interface with the second component 1026. The PV module 108 may continue to be moved to cause the hooked mechanism 1016 to selectively deform. The hooked mechanism 1016 may selectively deform and move to transition from a first position (e.g., an equilibrium position as shown in FIG. 10) to a second position. In the second position, the PV module 108 may move along a surface of the second component 1026 and be received by and be at least partially disposed in the aperture 1030. In other words, the PV module 108 engaging with the second component 1026 may cause the second component 1026 to move out of the way of the PV module 108 and permit the PV module 108 to be received by the aperture 1030.

When the PV module 108 is disposed within the aperture 1030, the hooked mechanism 1016 may return to the first position or transition to a third position such that a portion of the PV module 108 is positioned between the hooked mechanism 1016 and the upper portion 1014 to interlock the PV module 108 and the mounting rail 1002. For example, the second component 1026 and the upper portion 1014 may sandwich part of the PV module 108.

As shown in FIG. 10, the attachment feature 1005 includes the bolts 477. The attachment feature 1005 may also include the nuts 473 (not shown in FIG. 10) or any other appropriate device to interface with the bolts 477. The attachment feature 1005 couples the PV module 108 to the mounting rail 1002 in the tooled process. In other words, the attachment feature 1005 may couple the PV module 108 to the mounting rail 1002 in a way that is different than how the hooked mechanism 1016 couples the PV module 108 to the mounting rail 1002.

In some embodiments, the attachment feature 1005 may include one or more openings (not shown in FIG. 10) defined by the upper portion 1014. The openings defined by the upper portion 1014 may align with openings (not shown in FIG. 10) defined by the PV module 108 (e.g., the openings 129 defined by the return flange 120 of the module frame 112). The openings of the attachment feature 1005 and the openings defined by the PV module 108 may receive the bolts 477 to couple the PV module 108 to the mounting rail 1002.

As discussed above, during installation, the PV module 108 may be moved such that a portion of the PV module 108 is received by the aperture 1030. When the portion of the PV module 108 is positioned within the aperture 1030, the PV module 108 may physically engage with the upper portion 1014 (e.g., the bottom surface 122b of the module frame 112b physically engages with the upper portion 1014). In addition, the PV module 108 may be positioned such that the openings of the attachment feature 1005 are aligned with the openings 129 defined by the PV module 108. The openings of the attachment feature 1005 and the openings 129 defined by the PV module 108 may receive the bolts 477. The bolts 477 may interface with the nuts 473 to draw the PV module 108 towards the upper portion 1014 and couple the PV module 108 to the mounting rail 1002.

In this manner, the mounting rail 1002 couples to the PV module 108 via the attachment feature 1005. The attachment feature 1005 is illustrated and described as including the bolts 477, the nuts 473, and the openings for example purposes. The attachment feature 1005 may include any appropriate device to couple the PV module 108 to the mounting rail 1002. For example, the attachment feature 1005 may include bolts, nuts, threaded fasteners, thru-bolts, clips, top-down clamps, rivets, or some combination thereof.

The hooked mechanism 1016 may include a single portion or multiple portions that are connected to the upper portion 1014 and positioned at different locations on the upper portion 1014. For example, the hooked mechanism 1016 may include one, two, three, or more separate portions. In some embodiments, the hooked mechanism 1016 may align the PV module 108 relative to the upper portion 1014.

In some embodiments, the mounting rail 1002 may include one or more stopper devices 1011. The stopper devices 1011 may be connected to and extend from the upper portion 1014. In some embodiments, the stopper devices 1011 may be positioned proximate to and extend generally parallel to the hooked mechanism 1016. The stopper devices 1011 may interface with the hooked mechanism 1016 during installation of the PV module 108 to prevent the hooked mechanism 1016 from selectively deforming beyond a pre-determined threshold. In some embodiments, the pre-determined threshold may be equal to or greater than eight degrees from an equilibrium position of the hooked mechanism 1016. The hooked mechanism 1016 is illustrated in FIG. 10 in the equilibrium position.

In some embodiments, the mounting rail 1002 may include the retention member 118. In other embodiments, the retention member 118 may be omitted.

In some embodiments, the mounting rail 1002 may include a single unitary piece of material in which the hooked mechanism 1016, the stopper devices 1011, or both are punched or otherwise formed from. In other embodiments, the mounting rail 1002 may include multiple pieces of material. The hooked mechanism 1016, the stopper devices 1011, or both may be connected to the mounting rail 1002 via a weld, a rivet, a threaded fastener, an adhesive, a clinch joint, or a snap-in feature In these and other embodiments, the mounting rail 1002 may include aluminum, steel, or any other appropriate material. In some embodiments, the mounting rail 1002 may be formed using an extrusion process.

Figure 11:
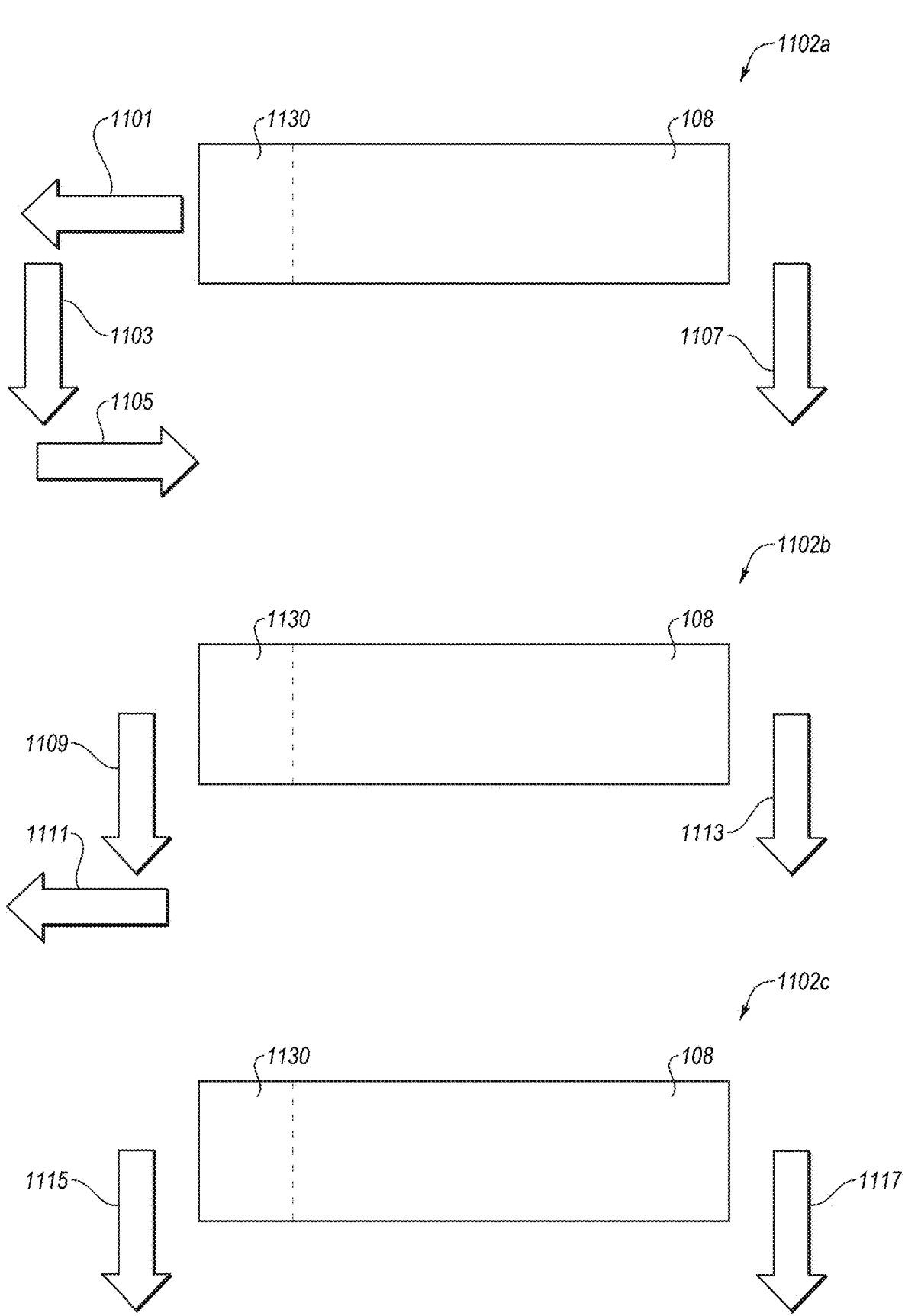
FIG. 11 illustrates graphical representations of sequences of movements to interface an example PV module with different mounting rails described in the present disclosure.

FIG. 11 illustrates graphical representations 1102*a-c* of sequences of movements to interface an example PV module 108 with different mounting rails described in the present disclosure. The example PV module 108 may correspond to the PV modules 108*a-c* described elsewhere. The graphical representation 1102*a* illustrates a sequence of movements to interface the PV module 108 with the mounting rail 102 of FIGS. 1A-2G or the mounting rail 302 of FIG. 3. The graphical representation 1102*b* illustrates a sequence of movements to interface the PV module 108 with the mounting rail 402 of FIGS. 4A-5G or the torque tube interface 600 of FIGS. 6A-8. The graphical representation 1102*c* illustrates a sequence of movements to interface the PV module 108 with the torque tube interface 1000 of FIG. 10.

With reference to the graphical representation 1102*a*, a first movement represented by arrow 1101 includes moving the PV module 108 to the side. As shown in FIG. 11, the first movement 1101 may include moving the PV module 108 to the left. The first movement 1101 may allow a portion 1130 of the PV module 108 (e.g., the return flange 120) that interfaces with a hooked mechanism (e.g., hooked mechanism 116 and/or hooked mechanism 316) to clear the hooked mechanism. In some embodiments, the first movement may be omitted. A second movement represented by arrow 1103 includes moving the PV module 108 down. The second movement 1103 may occur until the PV module 108 engages with an upper portion (e.g., upper portion 114) of a mounting rail (e.g., mounting rail 102 and/or 302).

A third movement represented by arrow 1105 includes moving the PV module 108 to the side in a direction that is different than the first movement 1101. As shown in FIG. 11, the third movement 1105 may include moving the PV module 108 to the right. The third movement 1105 may cause the portion 1130 of the PV module 108 to interface with the hooked mechanism. A fourth movement represented by arrow 1107 may include coupling the PV module 108 to the mounting rail via an attachment feature (e.g., the attachment feature 105). The directions of the first movement 1101 and the third movement 1105 may be reversed (e.g., the first movement 1101 may be to the right and the third movement 1105 may be to the left) to permit the PV module 108 to interface with an inverted arrangement of the hooked mechanism and the attachment feature.

With reference to graphical representation 1102*b*, a first movement represented by arrow 1109 includes moving the PV module 108 down. The first movement 1109 may occur until the PV module 108 engages with an upper portion (e.g., upper portion 414, 614, and/or 814) of the mounting rail (e.g., mounting rail 402, 602, and/or 604).

A second movement represented by arrow 1111 includes moving the PV module 108 to a side. As shown in FIG. 11, the second movement 1111 may include moving the PV module 108 to the left. The second movement 1111 may cause the portion 1130 (e.g., the portion 445 of the module frame 112) of the PV module 108 to interface with the hooked mechanism (e.g., hooked mechanism 416 and/or 616). A third movement represented by arrow 1113 may include coupling the PV module 108 to the mounting rail via an attachment feature (e.g., the attachment feature 405 and/or 605). The direction of the second movement 1111 may be reversed (e.g., the second movement 1111 may be to the right) to permit the PV module 108 to interface with an inverted arrangement of the hooked mechanism and the attachment feature.

With reference to graphical representation 1102*c*, a first movement represented by arrow 1115 includes moving the PV module 108 down. The first movement 1115 may occur until the PV module 108 engages with the hooked mechanism (e.g., hooked mechanism 1016) and causes the hooked mechanism to selectively deform and permit the portion 1130 to enter an aperture (e.g., aperture 1030) defined by the hooked mechanism and an upper portion (e.g., upper portion 1014) of a mounting rail (e.g., mounting rail 1002). A second movement represented by arrow 1117 may include coupling the PV module 108 to the mounting rail via an attachment feature (e.g., the attachment feature 1005).

Embodiment 1 includes a mounting rail configured to couple to a first photovoltaic (PV) module and a second PV module, the mounting rail comprising: a hooked mechanism configured to: at least partially define an aperture configured to receive a portion of a first module frame associated with the first PV module; and physically engage with a surface of the first module frame to couple the first module frame to the mounting rail and to prevent the first module frame from unintentionally uncoupling from the mounting rail; and an attachment feature configured to interface with a second module frame associated with the second PV module to couple the second module frame to the mounting rail.

Embodiment 2 includes the mounting rail of embodiment 1, wherein the surface of the first module frame comprises at least one of: a top surface of a return flange of the first module frame and the portion of the first module frame comprises an edge of the return flange; or a top surface of a panel portion of the first module frame and the portion of the first module frame comprises at least one of a sidewall of the first module frame, at least part of the panel portion, or at least part of a base portion of the first module frame.

Embodiment 3 includes the mounting rail of embodiment 1, wherein the attachment feature: is configured to prevent the second module frame from unintentionally uncoupling from the mounting rail; and comprises at least one of: a fastener; a bolt; a nut; a clip; a threaded fastener; a thru-bolt; a top-down clamp; or a rivet.

Embodiment 4 includes the mounting rail of embodiment 1, wherein the attachment feature comprises another hooked mechanism.

Embodiment 5 includes the mounting rail of embodiment 1, wherein the hooked mechanism is configured to couple the first PV module to the mounting rail in a toolless process and the attachment feature is configured to couple the second PV module to the mounting rail using a tooled process.

Embodiment 6 includes the mounting rail of embodiment 1, wherein the attachment feature is configured to couple the second PV module to the mounting rail via a way that is different than how the hooked mechanism couples the first PV module to the mounting rail.

Embodiment 7 includes the mounting rail of embodiment 1, wherein the hooked mechanism is connected to at least one of: an edge of the mounting rail; or an upper portion of the mounting rail.

Embodiment 8 includes the mounting rail of embodiment 1, further comprising a stopper device configured to interface with the hooked mechanism to prevent the hooked mechanism from selectively deforming beyond a pre-determined threshold.

Embodiment 9 includes the mounting rail of embodiment 1, further comprising a retention member configured to interface with the first module frame, during installation, to cause the retention member to selectively deform to permit the portion of the first module frame to be received by and be at least partially disposed within the aperture.

Embodiment 10 includes the mounting rail of embodiment 9, wherein the retention member is configured to be received by an opening defined by the first module frame to facilitate a position of the first module frame relative to the mounting rail and to prevent the portion of the first module frame from unintentionally exiting the aperture.

Embodiment 11 includes the mounting rail of embodiment 1, wherein: the hooked mechanism comprises a first hooked mechanism; the mounting rail further comprises a second hooked mechanism; the first hooked mechanism is positioned proximate a first longitudinal end of the mounting rail; and the second hooked mechanism is positioned proximate a second longitudinal end of the mounting rail.

Embodiment 12 includes the mounting rail of embodiment 1 further comprising an upper portion comprising a surface configured to physically engage with a first bottom surface of the first module frame and a second bottom surface of the second module frame, wherein the hooked mechanism and the upper portion together at least partially define the aperture.

Embodiment 13 includes the mounting rail of embodiment 12, wherein: the hooked mechanism overlaps a portion of the surface of the upper portion to at least partially define the aperture; and the hooked mechanism and the upper portion together are configured to sandwich part of the first module frame between the hooked mechanism and the upper portion.

Embodiment 14 includes the mounting rail of embodiment 12, wherein: the surface of the upper portion comprises a first part and a second part; the first part is configured to physically engage with the first bottom surface; and the second part is configured to physically engage with the second bottom surface to permit the second PV module to be positioned proximate to the first PV module.

Embodiment 15 includes the mounting rail of embodiment 1, wherein the hooked mechanism is positioned at a longitudinal end of the mounting rail.

Embodiment 16 includes the mounting rail of embodiment 1, wherein the hooked mechanism is positioned a distance from a longitudinal end of the mounting rail.

Embodiment 17 includes the mounting rail of embodiment 1, wherein the hooked mechanism extends continuously along at least part of a length of the mounting rail.

Embodiment 18 includes the mounting rail of embodiment 1, wherein the hooked mechanism comprises a plurality of hooked mechanisms positioned at different locations of the mounting rail.

Embodiment 19 includes the mounting rail of embodiment 18, further comprising a plurality of retention members, wherein each retention member of the plurality of retention members is positioned between two hooked mechanisms of the plurality of hooked mechanisms.

Embodiment 20 includes the mounting rail of embodiment 1, wherein the mounting rail comprises a single unitary piece of material.

Embodiment 21 includes a mounting rail configured to couple to a first photovoltaic (PV) module and a second PV module, the mounting rail comprising: a first hooked mechanism configured to: at least partially define a first aperture configured to receive a portion of a first module frame associated with the first PV module; and physically engage with a surface of the first module frame to couple the first module frame to the mounting rail and to prevent the first module frame from unintentionally uncoupling from the mounting rail; and a second hooked mechanism configured to: at least partially define a second aperture configured to receive a portion of a second module frame associated with the second module frame to couple the second module frame to the mounting rail; and physically engage with a surface of the second module frame to prevent the second module frame from unintentionally uncoupling from the mounting rail.

Embodiment 22 includes the mounting rail of embodiment 21, wherein: the surface of the first module frame comprises at least one of: a top surface of a return flange of the first module frame and the portion of the first module frame comprises an edge of the return flange; or a top surface of a panel portion of the first module frame and the portion of the first module frame comprises at least one of a sidewall of the first module frame, at least part of the panel portion of the first module frame, or at least part of a base portion of the first module frame; and the surface of the second module frame comprises at least one of: a top surface of a return flange of the second module frame and the portion of the second module frame comprises an edge of the return flange; or a top surface of a panel portion of the second module frame and the portion of the second module frame comprises at least one of a sidewall of the second module frame, at least part of the panel portion of the second module frame, or at least part of a base portion of the second module frame.

Embodiment 23 includes the mounting rail of embodiment 21, wherein at least one of: the first hooked mechanism is connected to an edge of the mounting rail and the second hooked mechanism is connected to an upper portion of the mounting rail; the first hooked mechanism is connected to the upper portion of the mounting rail and the second hooked mechanism is connected to the edge of the mounting rail; the first hooked mechanism is connected to a first edge of the mounting rail and the second hooked mechanism is connected to a second edge of the mounting rail; or the first hooked mechanism is connected to the upper portion of the mounting rail and the second hooked mechanism is connected to the upper portion of the mounting rail.

Embodiment 24 includes the mounting rail of embodiment 21, further comprising a stopper device configured to interface with the first hooked mechanism to prevent the first hooked mechanism from selectively deforming beyond a pre-determined threshold.

Embodiment 25 includes the mounting rail of embodiment 21 further comprising a retention member configured to interface with the first module frame, during installation, to cause the retention member to selectively deform to permit the portion of the first module frame to be received by and be at least partially disposed within the first aperture.

Embodiment 26 includes the mounting rail of embodiment 25, wherein the retention member is configured to be received by an opening defined by the first module frame to facilitate a position of the first module frame relative to the mounting rail and to prevent the portion of the first module frame from unintentionally exiting the first aperture.

Embodiment 27 includes the mounting rail of embodiment 21, wherein: the first hooked mechanism is positioned proximate a first longitudinal end of the mounting rail; and the second hooked mechanism is positioned proximate a second longitudinal end of the mounting rail.

Embodiment 28 includes the mounting rail of embodiment 21 further comprising an upper portion comprising a surface configured to physically engage with a first bottom surface of the first module frame and a second bottom surface of the second module frame, wherein the first hooked mechanism and the upper portion together at least partially define the first aperture and the second hooked mechanism and the upper portion at least partially define the second aperture.

Embodiment 29 includes the mounting rail of embodiment 28, wherein: the first hooked mechanism overlaps a portion of the surface of the upper portion to at least partially define the first aperture; and the first hooked mechanism and the upper portion together are configured to sandwich part of the first module frame between the first hooked mechanism and the upper portion.

Embodiment 30 includes the mounting rail of embodiment 28, wherein: the surface of the upper portion comprises a first part and a second part; the first part is configured to physically engage with the first bottom surface; and the second part is configured to physically engage with the second bottom surface to permit the second PV module to be positioned proximate to the first PV module.

Embodiment 31 includes the mounting rail of embodiment 21, wherein the first hooked mechanism is positioned at a longitudinal end of the mounting rail.

Embodiment 32 includes the mounting rail of embodiment 21, wherein the first hooked mechanism is positioned a distance from a longitudinal end of the mounting rail.

Embodiment 33 includes the mounting rail of embodiment 21, wherein the first hooked mechanism extends continuously along at least part of a length of the mounting rail.

Embodiment 34 includes the mounting rail of embodiment 21, wherein the first hooked mechanism comprises a plurality of hooked mechanisms positioned at different locations of the mounting rail.

Embodiment 35 includes the mounting rail of embodiment 34, further comprising a plurality of retention members, wherein each retention member of the plurality of retention members is positioned between two hooked mechanisms of the plurality of hooked mechanisms.

Embodiment 36 includes the mounting rail of embodiment 21, wherein the mounting rail comprises a single unitary piece of material.

Embodiment 37 includes a system configured to couple to a photovoltaic (PV) module, the system comprising: a torque tube; a hooked mounting rail configured to interface with the torque tube at a first location, the hooked mounting rail comprising a hooked mechanism configured to: at least partially define an aperture configured to receive a portion of a first part of a module frame associated with the PV module to couple the module frame to the hooked mounting rail; and physically engage with a surface of the first part of the module frame to prevent the module frame from unintentionally uncoupling from the hooked mounting rail; and an attachment mounting rail configured to interface with the torque tube at a second location, a distance between the first location and the second location corresponding to a width of the PV module, the attachment mounting rail comprising an attachment feature configured to interface with a second part of the module frame to couple the module frame to the attachment mounting rail, the second part of the module frame being positioned on an opposite side of the module frame as the first part.

Embodiment 38 includes the system of embodiment 37, wherein: the PV module comprises a first PV module, the hooked mechanism comprises a first hooked mechanism, and the attachment feature comprises a first attachment feature; the hooked mounting rail comprises a second hooked mechanism configured to: at least partially define an aperture configured to receive a portion of a first part of a module frame associated with a second PV module to couple the module frame associated with the second PV module to the hooked mounting rail; and physically engage with a surface of the first part of the module frame associated with the second PV module to prevent the module frame associated with the second PV module from unintentionally uncoupling from the hooked mounting rail; and the system further comprises an additional attachment mounting rail configured to interface with the torque tube at a third location, the third location being located on an opposite side of the hooked mounting rail as the second location, the additional attachment mounting rail comprising a second attachment feature configured to interface with a second part of the module frame associated with the second PV module to couple the module frame associated with the second PV module to the additional attachment mounting rail.

Embodiment 39 includes the system of embodiment 37, wherein the surface of the module frame associated with the PV module comprises at least one of: a top surface of a return flange of the module frame and the portion of the module frame comprises an edge of the return flange; or a top surface of a panel portion of the module frame and the portion of the module frame comprises at least one of a sidewall of the module frame, at least part of the panel portion, or at least part of a base portion of the module frame.

Embodiment 40 includes the system of embodiment 37, wherein the attachment feature: is configured to prevent the second module frame from unintentionally uncoupling from the mounting rail; and comprises at least one of: a fastener; a bolt; a nut; a clip; a threaded fastener; a thru-bolt; a top-down clamp; or a rivet.

Embodiment 41 includes the system of embodiment 37, wherein the attachment feature comprises another hooked mechanism.

Embodiment 42 includes the system of embodiment 38, wherein the hooked mechanism is configured to couple the first PV module to the mounting rail in a toolless process and the attachment feature is configured to couple the second PV module to the mounting rail using a tooled process.

Embodiment 43 includes the system of embodiment 38, wherein the attachment feature is configured to couple the second PV module to the mounting rail via a way that is different than how the hooked mechanism couples the first PV module to the mounting rail.

Embodiment 44 includes the system of embodiment 37, further comprising a stopper device configured to interface with the hooked mechanism to prevent the hooked mechanism from selectively deforming beyond a pre-determined threshold.

Embodiment 45 includes the system of embodiment 37, wherein the hooked mounting rail further comprises a retention member configured to interface with the module frame, during installation, to cause the retention member to selectively deform to permit the portion of the module frame to be received by and be at least partially disposed within the aperture.

Embodiment 46 includes the system of embodiment 45, wherein the retention member is configured to be received by an opening defined by the module frame to facilitate a position of the module frame relative to the hooked mounting rail and to prevent the portion of the module frame from unintentionally exiting the aperture.

Embodiment 47 includes the system of embodiment 37, wherein the hooked mounting rail further comprises an upper portion comprising a surface configured to physically engage with a bottom surface of the module frame and the hooked mechanism and the upper portion together at least partially define the aperture.

Embodiment 48 includes the system of embodiment 47, wherein: the hooked mechanism overlaps a portion of the surface of the upper portion to at least partially define the aperture; and the hooked mechanism and the upper portion together are configured to sandwich part of the module frame between the hooked mechanism and the upper portion.

Embodiment 49 includes a mounting rail configured to couple to a first photovoltaic (PV) module and a second PV module, the mounting rail comprising: a hooked mechanism configured to: at least partially define an aperture configured to receive a portion of a first module frame associated with the first PV module to couple the first module frame to the mounting rail; interface with the first module frame during installation of the first PV module to cause the hooked mechanism to selectively deform and permit at least a portion of the first module frame to be received by and be at least partially disposed in the aperture to interlock the first module frame with the mounting rail; and physically engage with a top surface of a panel portion of the first module frame to prevent the first module frame from unintentionally uncoupling from the mounting rail; and an attachment feature configured to interface with a second module frame associated with the second PV module to couple the second module frame to the mounting rail.

Embodiment 50 includes the mounting rail of embodiment 49, wherein the attachment feature: is configured to prevent the second module frame from unintentionally uncoupling from the mounting rail; and comprises at least one of: a fastener; a bolt; a nut; a clip; a threaded fastener; a thru-bolt; a top-down clamp; or a rivet.

Embodiment 51 includes the mounting rail of embodiment 49, wherein the attachment feature comprises another hooked mechanism.

Embodiment 52 includes the mounting rail of embodiment 49, wherein the hooked mechanism is configured to couple the first PV module to the mounting rail in a toolless process and the attachment feature is configured to couple the second PV module to the mounting rail using a tooled process.

Embodiment 53 includes the mounting rail of embodiment 49, wherein the attachment feature is configured to couple the second PV module to the mounting rail via a way that is different than how the hooked mechanism couples the first PV module to the mounting rail.

Embodiment 54 includes the mounting rail of embodiment 49 comprising a stopper device configured to prevent movement of the second module frame along a width of the mounting rail.

Embodiment 55 includes the mounting rail of embodiment 49 comprising a stopper device configured to interface with the hooked mechanism to prevent the hooked mechanism from selectively deforming beyond a pre-determined threshold.

What is claimed is:

1. A mounting rail configured to couple to a first photovoltaic (PV) module and a second PV module, the mounting rail comprising:
    a hooked mechanism configured to:
        at least partially define an aperture configured to receive a portion of a first module frame associated with the first PV module; and
        physically engage with a surface of the first module frame to couple the first module frame to the mounting rail and to prevent the first module frame from unintentionally uncoupling from the mounting rail; and
    an attachment feature configured to interface with a second module frame associated with the second PV module to couple the second module frame to the mounting rail.

2. The mounting rail of claim 1, wherein the surface of the first module frame comprises at least one of:
    a top surface of a return flange of the first module frame and the portion of the first module frame comprises an edge of the return flange; or
    a top surface of a panel portion of the first module frame and the portion of the first module frame comprises at least one of a sidewall of the first module frame, at least part of the panel portion, or at least part of a base portion of the first module frame.

3. The mounting rail of claim 1, wherein the attachment feature:
    is configured to prevent the second module frame from unintentionally uncoupling from the mounting rail; and
    comprises at least one of:
        a fastener;
        a bolt;
        a nut;
        a clip;
        a threaded fastener;
        a thru-bolt;
        a top-down clamp; or
        a rivet.

4. The mounting rail of claim 1, wherein the attachment feature comprises another hooked mechanism.

5. The mounting rail of claim 1, wherein the hooked mechanism is configured to couple the first PV module to the mounting rail in a toolless process and the attachment feature is configured to couple the second PV module to the mounting rail using a tooled process.

6. The mounting rail of claim 1, wherein the attachment feature is configured to couple the second PV module to the mounting rail via a way that is different than how the hooked mechanism couples the first PV module to the mounting rail.

7. The mounting rail of claim 1, wherein the hooked mechanism is connected to at least one of:

an edge of the mounting rail; or an upper portion of the mounting rail.

8. The mounting rail of claim 1, further comprising a stopper device configured to interface with the hooked mechanism to prevent the hooked mechanism from selectively deforming beyond a pre-determined threshold.

9. The mounting rail of claim 1, further comprising a retention member configured to interface with the first module frame, during installation, to cause the retention member to selectively deform to permit the portion of the first module frame to be received by and be at least partially disposed within the aperture.

10. The mounting rail of claim 9, wherein the retention member is configured to be received by an opening defined by the first module frame to facilitate a position of the first module frame relative to the mounting rail and to prevent the portion of the first module frame from unintentionally exiting the aperture.

11. The mounting rail of claim 1, wherein:

the hooked mechanism comprises a first hooked mechanism;

the mounting rail further comprises a second hooked mechanism;

the first hooked mechanism is positioned proximate a first longitudinal end of the mounting rail; and the second hooked mechanism is positioned proximate a second longitudinal end of the mounting rail.

12. The mounting rail of claim 1 further comprising an upper portion comprising a surface configured to physically engage with a first bottom surface of the first module frame and a second bottom surface of the second module frame, wherein the hooked mechanism and the upper portion together at least partially define the aperture.

13. The mounting rail of claim 12, wherein:

the hooked mechanism overlaps a portion of the surface of the upper portion to at least partially define the aperture; and the hooked mechanism and the upper portion together are configured to sandwich part of the first module frame between the hooked mechanism and the upper portion.

14. The mounting rail of claim 12, wherein:

the surface of the upper portion comprises a first part and a second part;

the first part is configured to physically engage with the first bottom surface; and the second part is configured to physically engage with the second bottom surface to permit the second PV module to be positioned proximate to the first PV module.

15. The mounting rail of claim 1, wherein the hooked mechanism is positioned at a longitudinal end of the mounting rail.

16. The mounting rail of claim 1, wherein the hooked mechanism is positioned a distance from a longitudinal end of the mounting rail.

17. The mounting rail of claim 1, wherein the hooked mechanism extends continuously along at least part of a length of the mounting rail.

18. The mounting rail of claim 1, wherein the hooked mechanism comprises a plurality of hooked mechanisms positioned at different locations of the mounting rail.

19. The mounting rail of claim 18, further comprising a plurality of retention members, wherein each retention member of the plurality of retention members is positioned between two hooked mechanisms of the plurality of hooked mechanisms.

20. A system comprising:

a first photovoltaic (PV) module;

a second PV module;

a torque tube; and a torque tube interface comprising:

a mounting clamp coupled to the torque tube; and a mounting rail coupled to the first PV module, the second PV module, and the mounting clamp, the mounting rail comprising:

a hooked mechanism:

at least partially defining an aperture receiving a portion of a first module frame associated with the first PV module; and physically engaged with a surface of the first module frame to couple the first module frame to the mounting rail and to prevent the first module frame from unintentionally uncoupling from the mounting rail; and an attachment feature interfaced with a second module frame associated with the second PV module to couple the second module frame to the mounting rail.

* * * * *